US008718544B2

(12) United States Patent
Kawasaki et al.

(10) Patent No.: US 8,718,544 B2
(45) Date of Patent: May 6, 2014

(54) SIGNAL TRANSMISSION DEVICE, ELECTRONIC DEVICE, AND SIGNAL TRANSMISSION METHOD

(75) Inventors: Kenichi Kawasaki, Tokyo (JP); Norihito Mihota, Tokyo (JP); Hidenori Takeuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 64 days.

(21) Appl. No.: 13/391,643

(22) PCT Filed: Aug. 31, 2010

(86) PCT No.: PCT/JP2010/064793
§ 371 (c)(1), (2), (4) Date: Apr. 26, 2012

(87) PCT Pub. No.: WO2011/025027
PCT Pub. Date: Mar. 3, 2011

(65) Prior Publication Data
US 2012/0207195 A1  Aug. 16, 2012

(30) Foreign Application Priority Data

Aug. 31, 2009  (JP) ................................. 2009-199403
Aug. 31, 2009  (JP) ................................. 2009-199404
Aug. 31, 2009  (JP) ................................. 2009-200118
Sep. 29, 2009  (JP) ................................. 2009-223682
Sep. 29, 2009  (JP) ................................. 2009-223683
Oct. 22, 2009  (JP) ................................. 2009-243107
Jan. 21, 2010  (JP) ................................. 2010-011360
Jun. 7, 2010   (JP) ................................. 2010-130276
Aug. 19, 2010  (JP) ................................. 2010-183805

(51) Int. Cl.
*H04B 7/24* (2006.01)

(52) U.S. Cl.
USPC .......... 455/39; 455/67.11; 455/517; 370/223; 370/224

(58) Field of Classification Search
USPC ............................................................ 455/39
See application file for complete search history.

(56) References Cited

U.S. PATENT DOCUMENTS 5,754,948 A   5/1998   Metze
(Continued)

FOREIGN PATENT DOCUMENTS

JP   10-256478   9/1998
(Continued)

OTHER PUBLICATIONS

Japanese Office Action issued in connection with related Japanese Patent Application No. JP 2009-200118 dated Aug. 13, 2013.
(Continued)

*Primary Examiner* — Ajibola Akinyemi
(74) *Attorney, Agent, or Firm* — Dentons US LLP

(57) ABSTRACT

A signal generation unit 107 and a first set value processing unit 7100 are included in a preceding stage of a transmission path connection unit 108 at a transmission side, and a signal generation unit 207 and a second set value processing unit 7200 are included in a subsequent stage of a transmission path connection unit 208 at a receiving side. The signal generation unit 107 or the signal generation unit 207 performs prescribed signal processing based on a set value. The first set value processing unit 7100 inputs a set value, that has been prescribed for the signal generation unit 107, to the signal generation unit 107, and the second set value processing unit 7200 inputs a set value, that has been prescribed for the signal generation unit 207, to the signal generation unit 207. Since the set value is not dynamically changed according to an environment change, or the like, simplification of a parameter operation circuit or reduction of power consumption is realized, and the parameter operation circuit does not unnecessarily operate even when it is used under the state without environment change.

15 Claims, 39 Drawing Sheets

(56) References Cited

U.S. PATENT DOCUMENTS

| | | | |
|---|---|---|---|
| 2003/0012134 A1* | 1/2003 | Ikawa | 370/227 |
| 2005/0226355 A1 | 10/2005 | Kibune | |
| 2006/0171396 A1* | 8/2006 | Singh et al. | 370/394 |
| 2011/0117858 A1* | 5/2011 | Lee | 455/67.11 |
| 2012/0190396 A1* | 7/2012 | Oyama | 455/517 |

FOREIGN PATENT DOCUMENTS

| | | |
|---|---|---|
| JP | 2003-179516 | 6/2003 |
| JP | 2003-244016 | 8/2003 |
| JP | 2005-204221 | 7/2005 |
| JP | 2005-223411 | 8/2005 |
| JP | 2005-303607 | 10/2005 |
| JP | 2007-228499 | 9/2007 |
| JP | 2008-535272 | 8/2008 |
| JP | 2008-252566 | 10/2008 |
| JP | 2008-271188 | 11/2008 |
| JP | 2008-541639 | 11/2008 |
| JP | 2009-105847 | 5/2009 |
| JP | 2009-182894 | 8/2009 |
| JP | 2009-246764 | 10/2009 |
| JP | 4708241 | 3/2011 |
| WO | WO 2009/026400 | 2/2009 |
| WO | WO 2009/017230 A1 | 5/2009 |

OTHER PUBLICATIONS

Christian Marcu et al.; A 90nm CMOS Low-Power 60GHz Transceiver with Integrated Baseband Circuitry; 2009 IEEE International Solid-State Circuits Conference.

H.M. Greenhouse; Design of Planar rectangular Microelectronic Inductors; Chapter 4, Characteristics of Passive IC Components; IEEE Trans. Parts, Hybrids and Packaging; v. 10, No. 2, Jun. 1974; pp. 101-109.

Syed B. Hug and John Goldie; An Overview of LVDS Technology; National Semiconductor Application Note 971; National Semiconductor Corporation; 1998.

L. J. Paciorek; Injection Locking of Oscillators; Proceedings of the IEEE; vol. 53, No. 11; Nov. 1965.

Peter J. Edmonson, Peter M. Smith, and C. K. Campbell; Injection Locking Techniques for a 1-GHz Digital Receiver Using Acoustic-Wave Devices; IEE Transactions on Ultrasonics, Ferroelectrics, and Frequency Control; vol. 39, No. 5; Sep. 1992.

A. Niknejad; mm-Wave Silicon Technology 60GHz and Beyond.

Japanese Office Action with English translation issued in connection with related Japanese Patent Application No. 2010-011360 dated Oct. 22, 2013.

Japanese Office Action issued in connection with related Japanese Patent Application No. 2009-200118 dated Nov. 26, 2013.

Chinese Office Action issued in connection with related Chinese Patent Application No. 201080048039.0 dated Dec. 4, 2013.

\* cited by examiner

FIG.5
<embodiment 1: modulation FUNCTION UNIT and demodulation FUNCTION UNIT (1st Ex.)>
(A) modulation FUNCTION UNIT
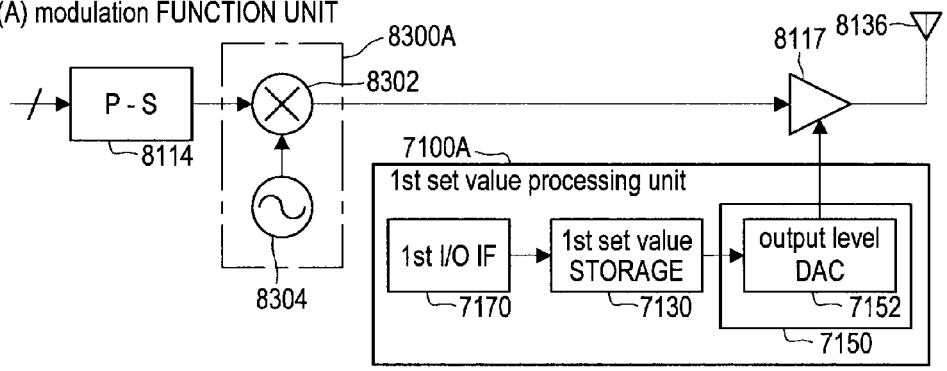
(B) demodulation FUNCTION UNIT
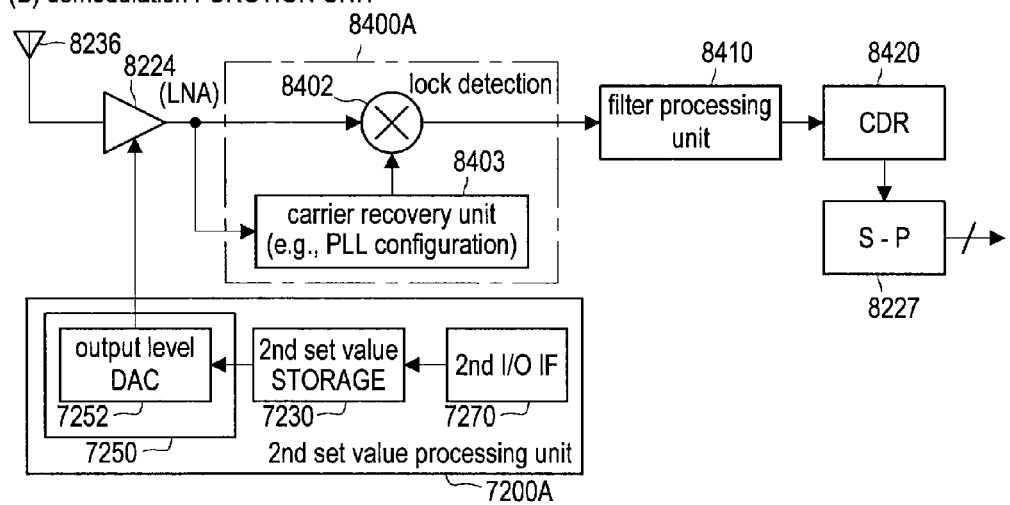
(C)
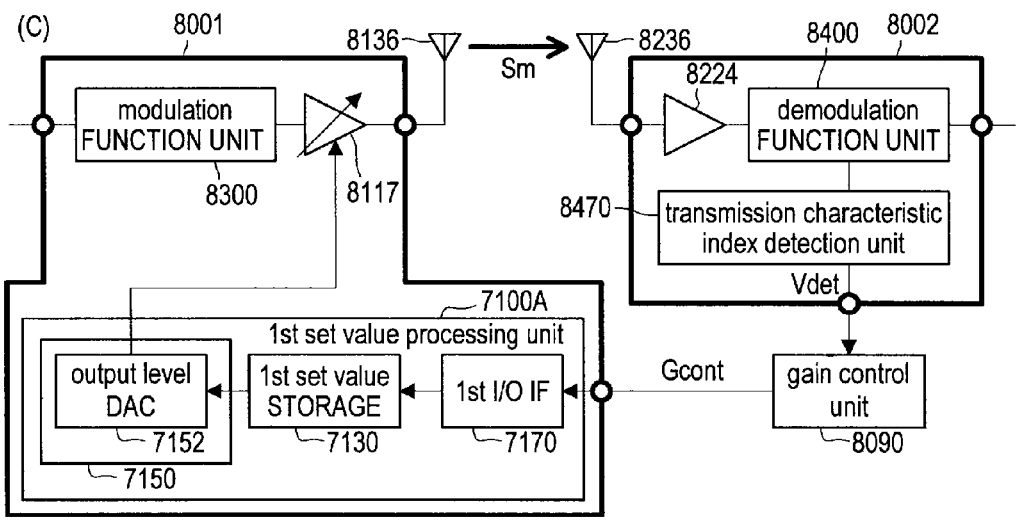

FIG.10
<embodiment 5: operation scheme of mimo process applied to receiving side>
(A) channel matrix
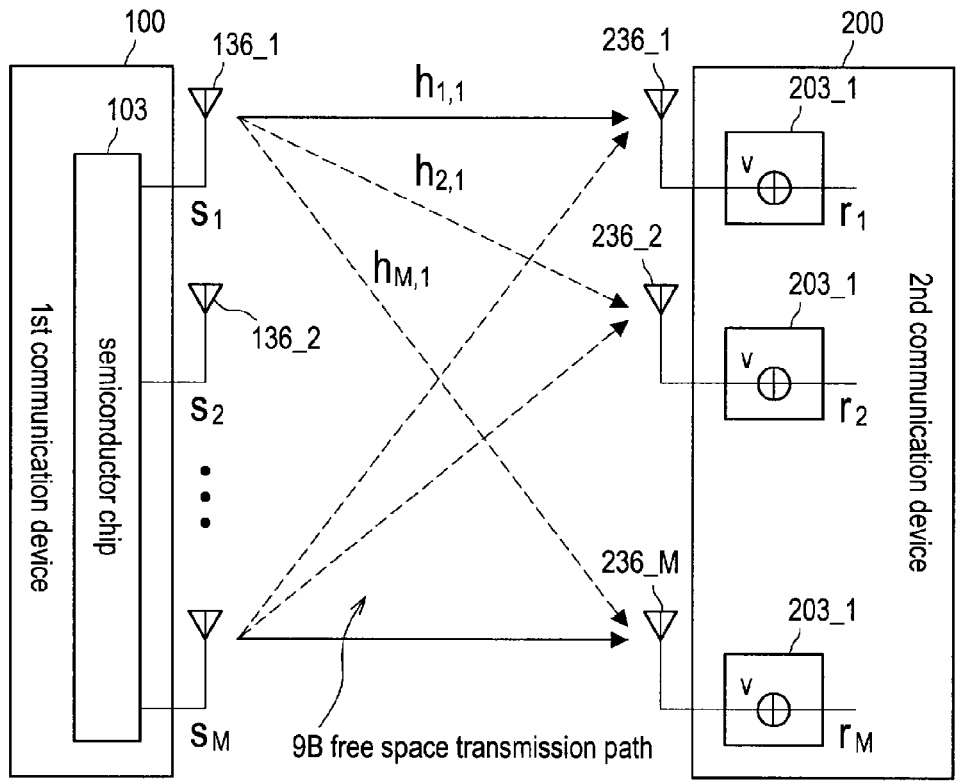
(B) relationship between transmission and reception signals
$$\hat{s} = H^{-1}r = H^{-1}Hs + H^{-1}v = \underline{s} + H^{-1}v$$
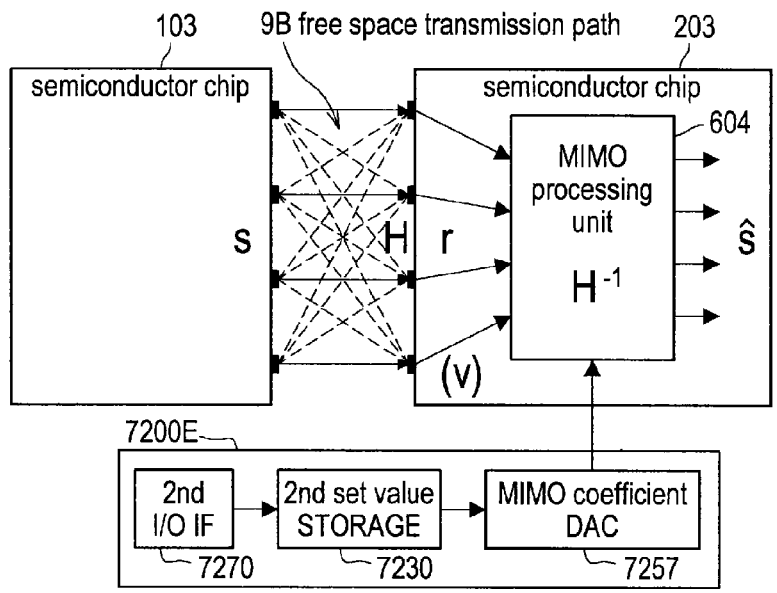

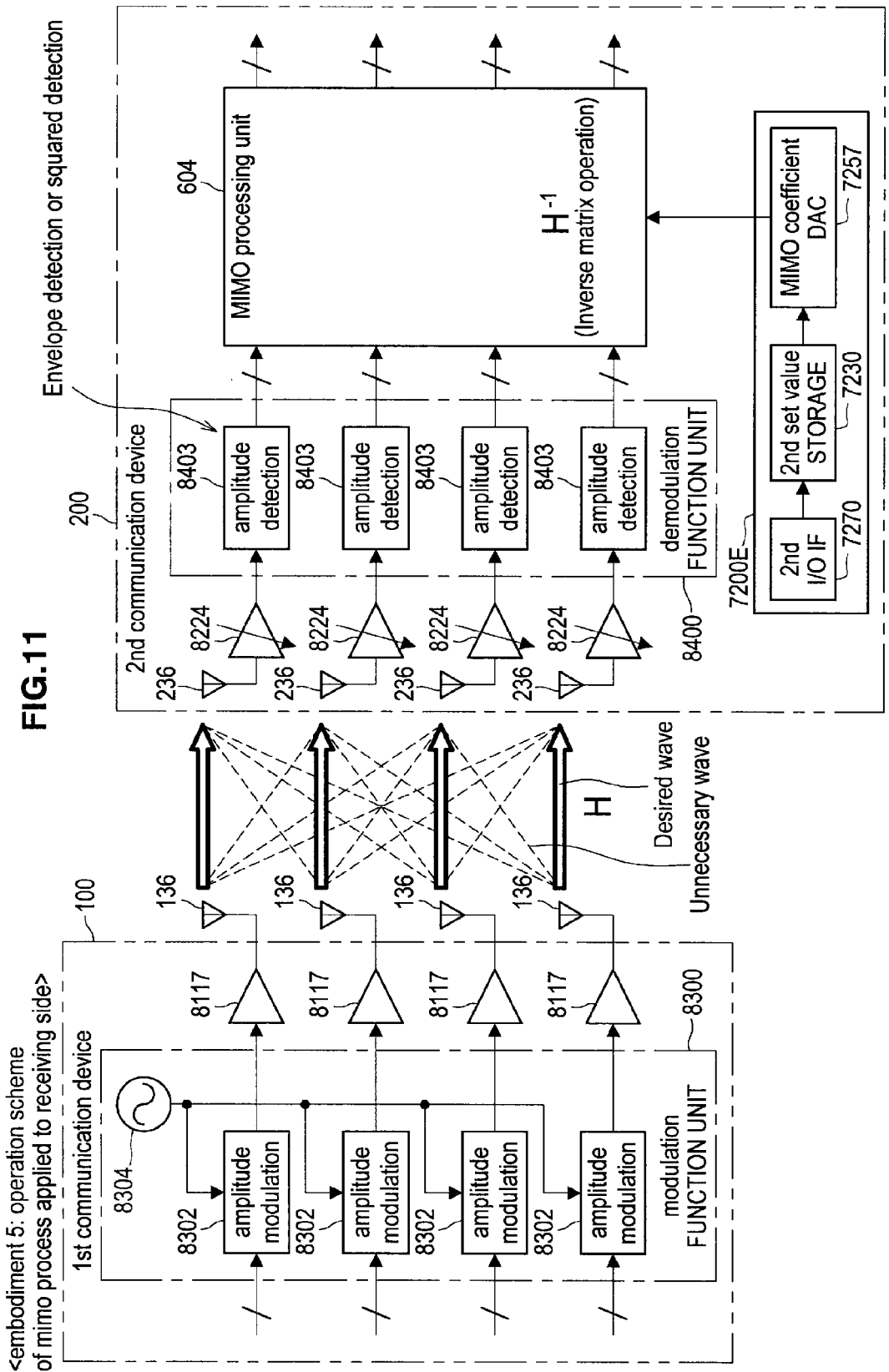

FIG.12

<mimo process in two channels: Relationship between constraint of antenna arrangement and MIMO processing amount>

(A)

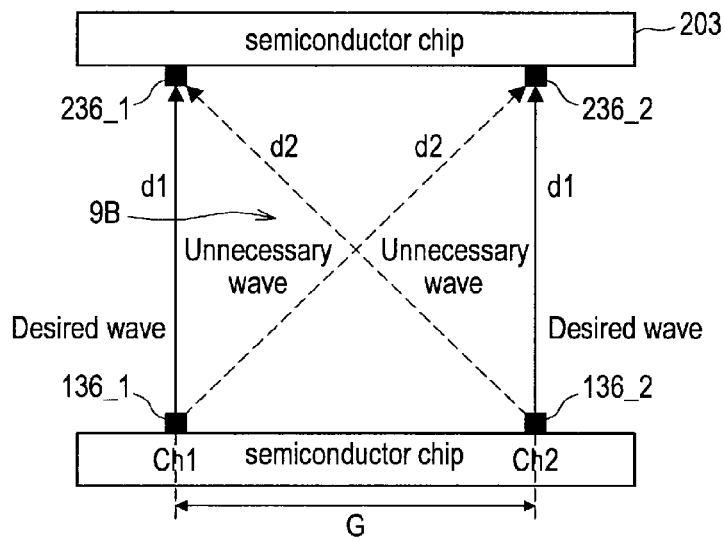

(B) pass condition 1: pass difference $\Delta d = (n/2 + 1/4)\lambda_c$
(B-1) channel matrix and inverse matrix  (B-2) reception signal on phase plane (BPSK)

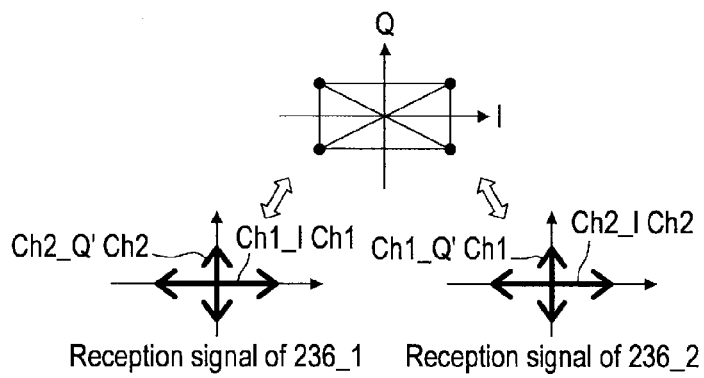

(C) pass condition 2: pass difference $\Delta d = (n/2)\lambda_c$
(C-1) channel matrix and inverse matrix  (C-2) reception signal on phase plane (ASK)

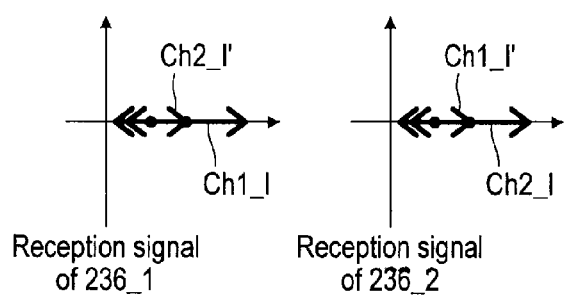

FIG.14
<embodiment 6: operation scheme of mimo process applied to transmission side>
(A) channel matrix
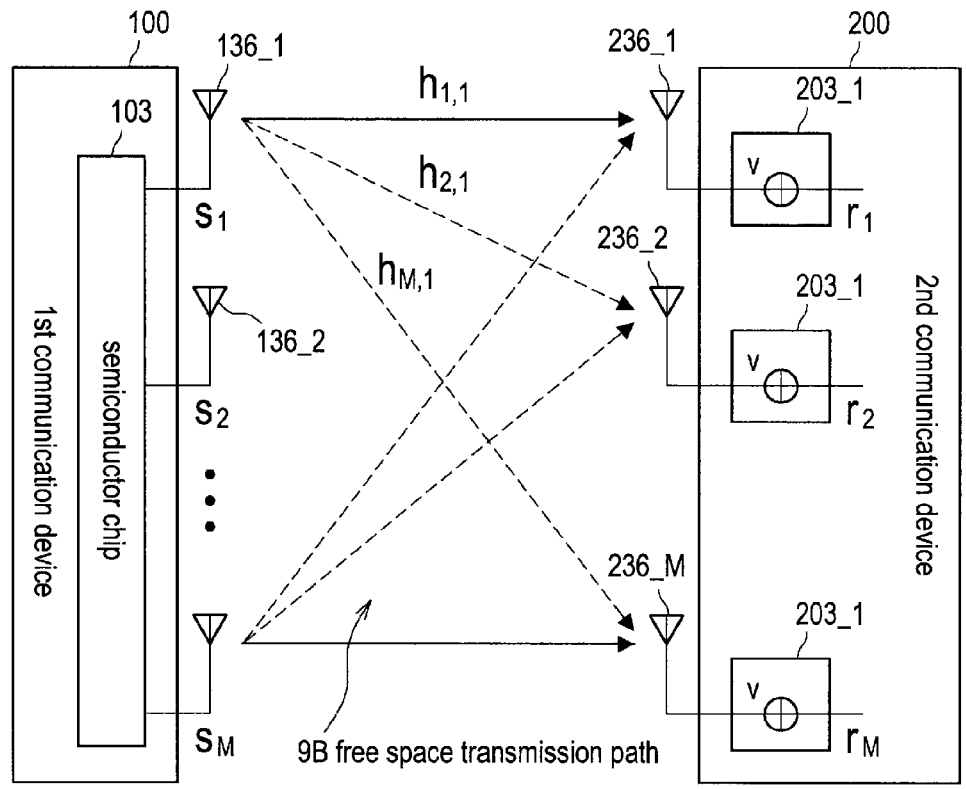
(B) relationship between transmission and reception signals
$$r = Hs + v = H(H^{-1}\hat{s}) + v = \underline{\hat{s}} + v$$
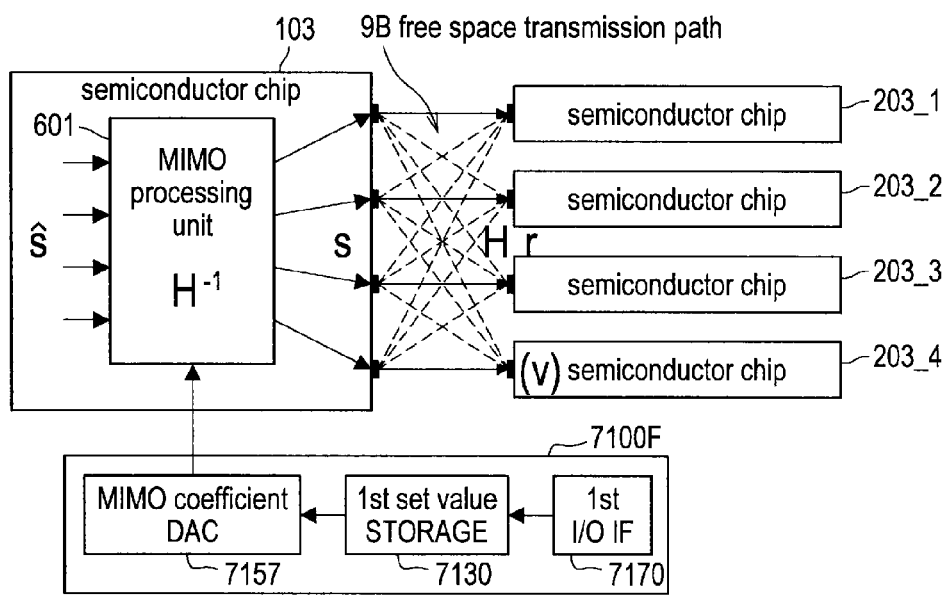

FIG.16
<embodiment 7: 3rd Ex. and peripheral circuit of modulation FUNCTION UNIT>
(A) basic configuration 1
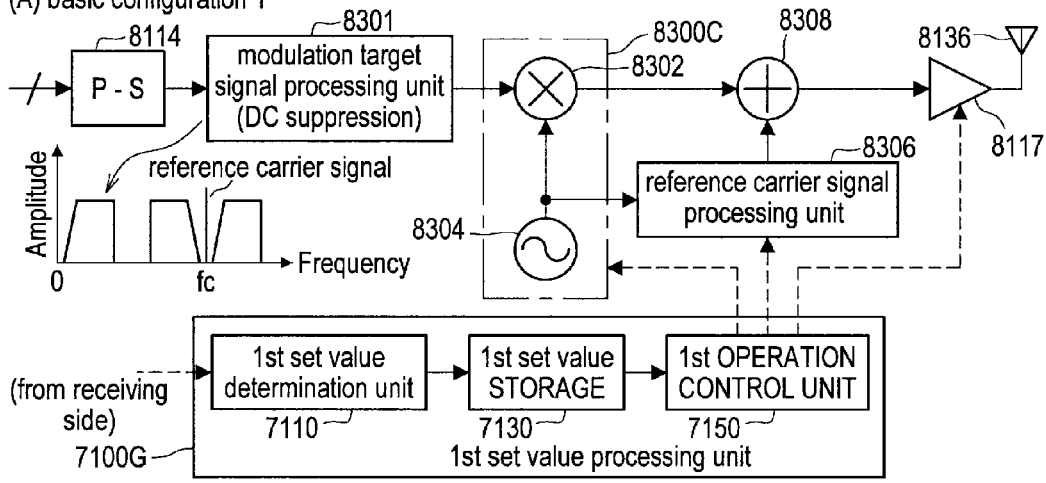
(B) basic configuration 2
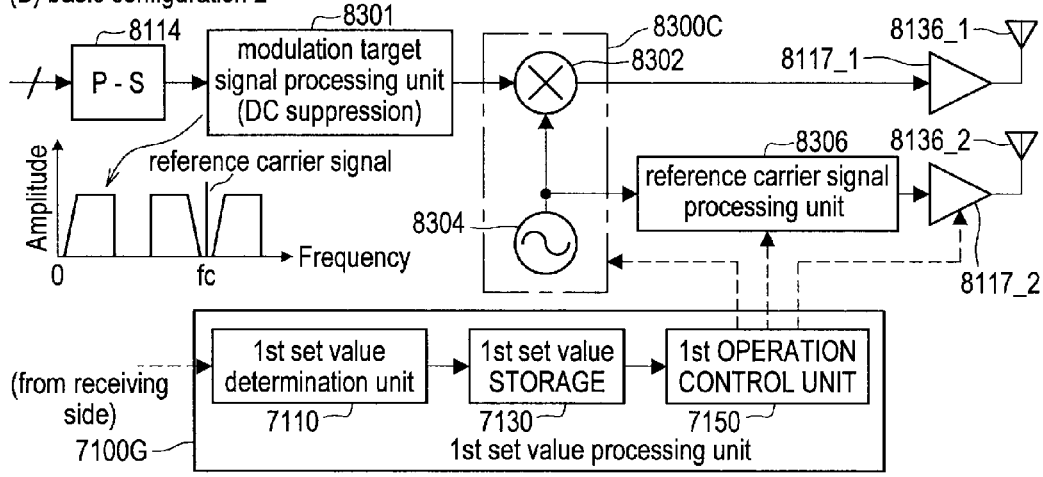
(C) basic configuration 3 (application to amplitude modulation scheme)
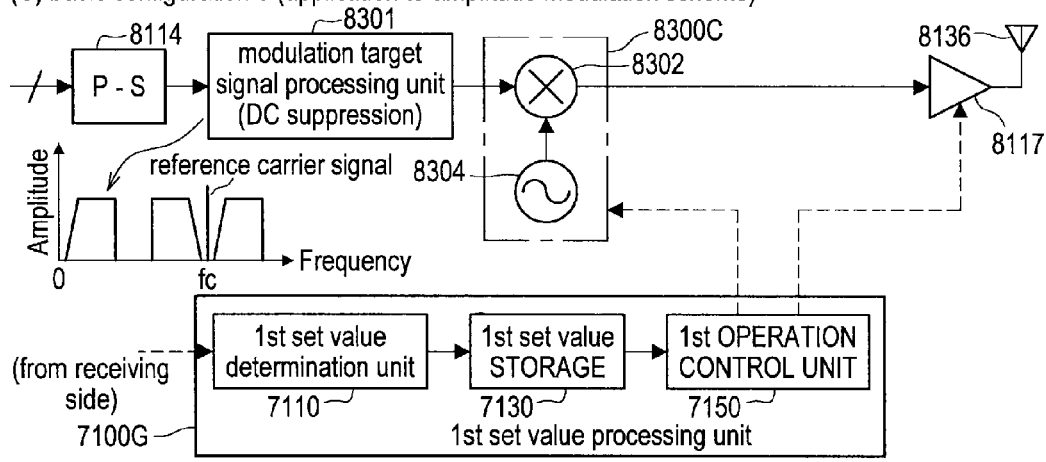

FIG.17
<embodiment 7: 3rd Ex. and peripheral circuit of demodulation FUNCTION UNIT>
(A) basic configuration 1
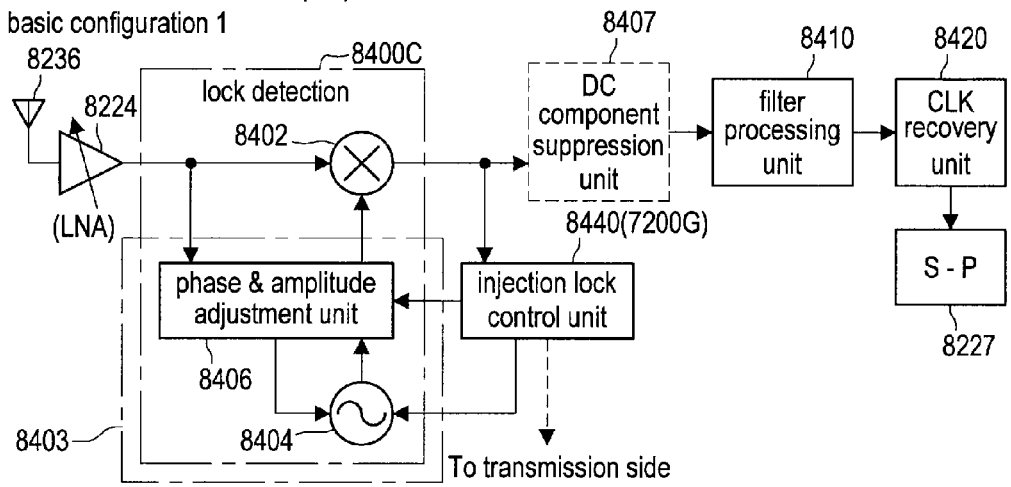
(B) basic configuration 2
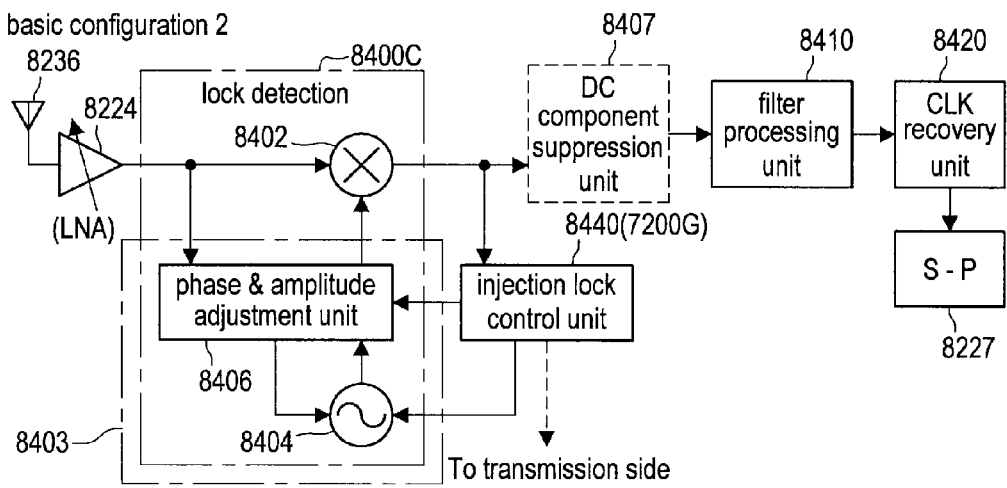
(C) basic configuration 2
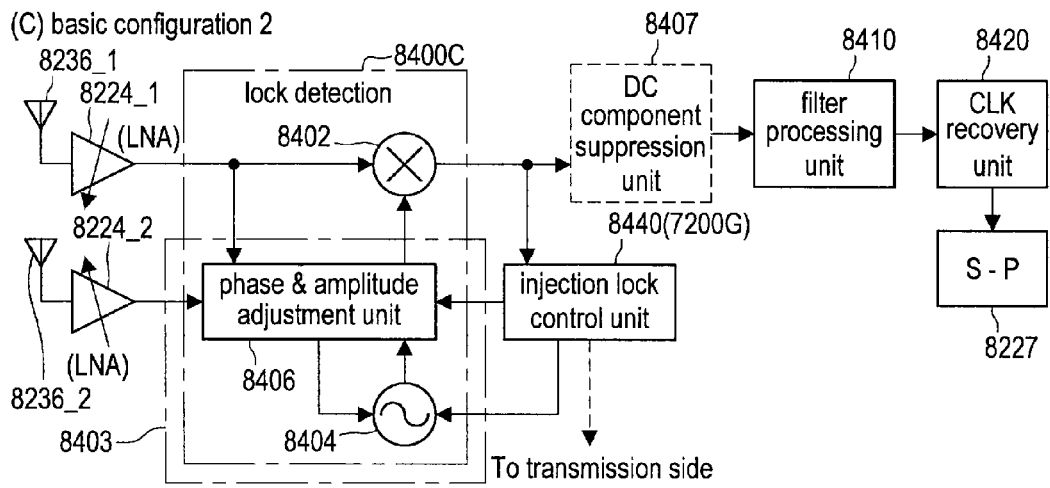

FIG. 18
<when transmission information is orthogonal to reference carrier signal>
※ Basic circuit configuration of receiving side
(A) 1st Ex.
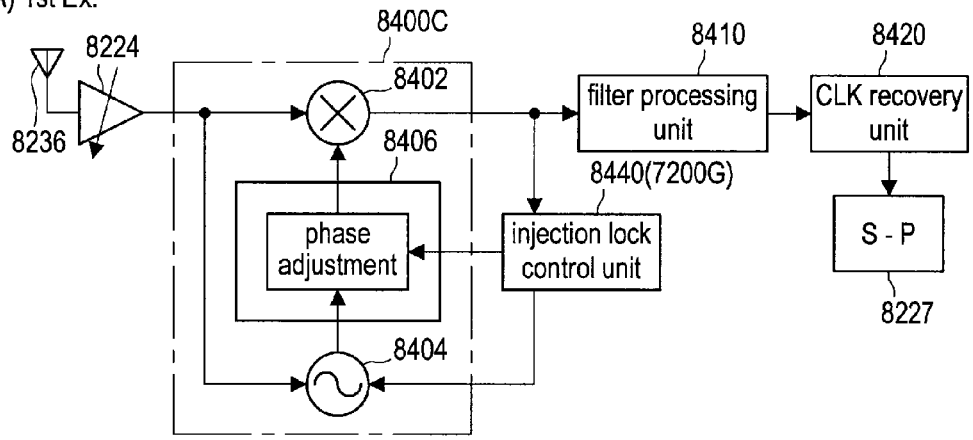
(B) 2nd Ex.
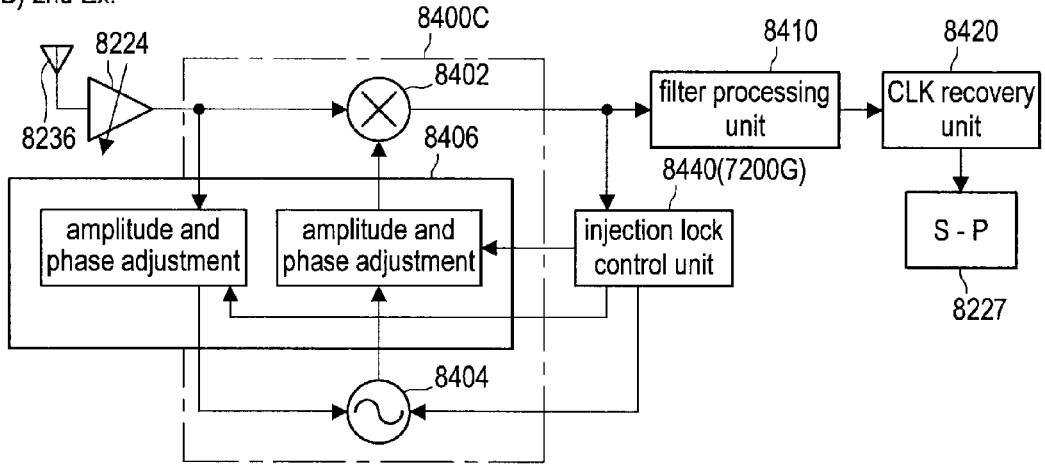
(C) 3rd Ex.
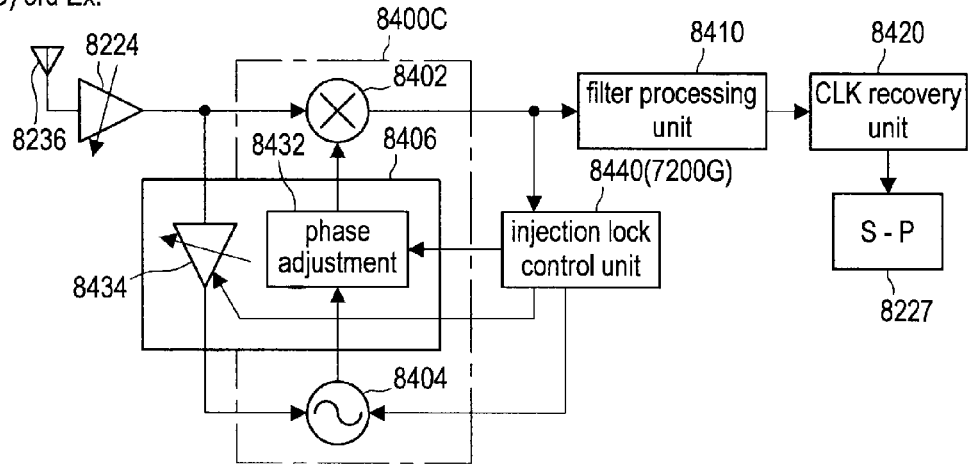

FIG.25

<embodiment 7: phase relationship in injection lock>

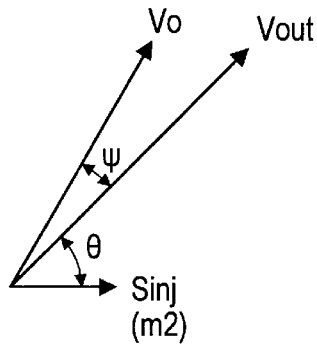

Vo: output signal of receiving-side local oscillation unit 8404
  ※free-running Output
Vout: output signal of receiving-side local oscillation unit 8404
  ※Injection lock output
Sinj: injection signal
θ: phase shift amount for lock detection
  (when modulation axis and reference carrier axis are in phase)

FIG.26

<embodiment 7: Optimization of injection lock amount>

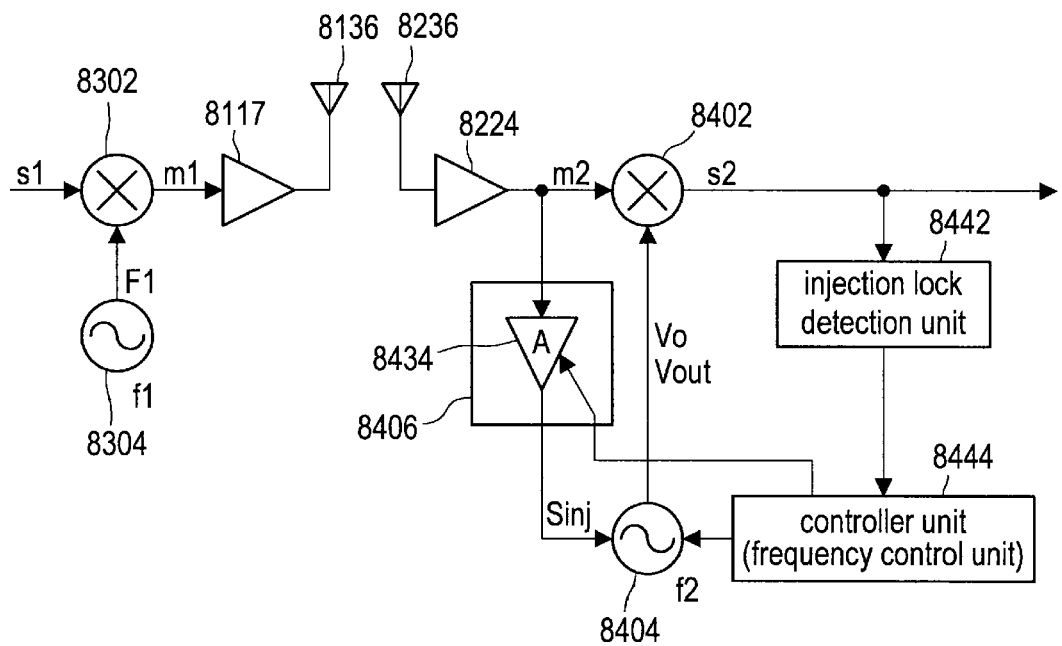

FIG.30
<embodiment 8>
(A)
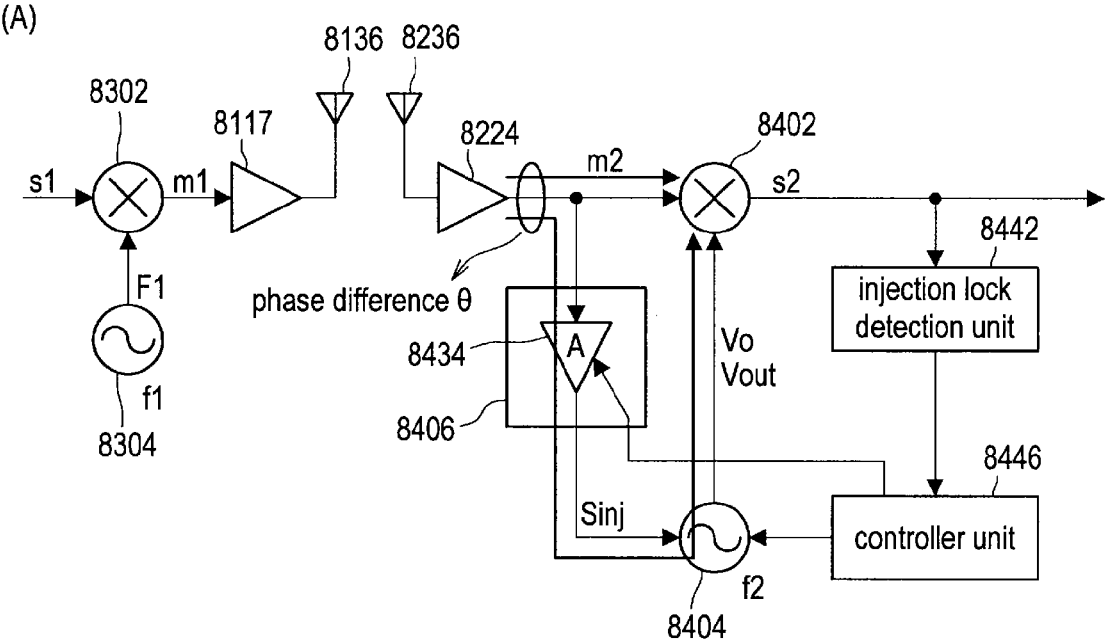
(B)
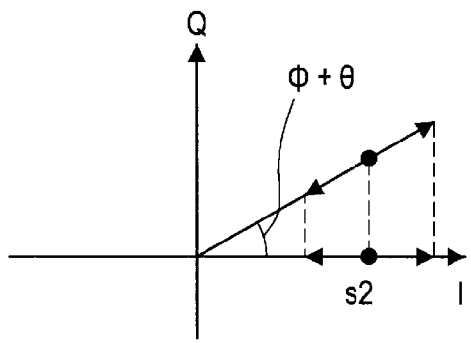
θ is phase difference between m2 and f2

FIG.31
<embodiment 8>
(A)
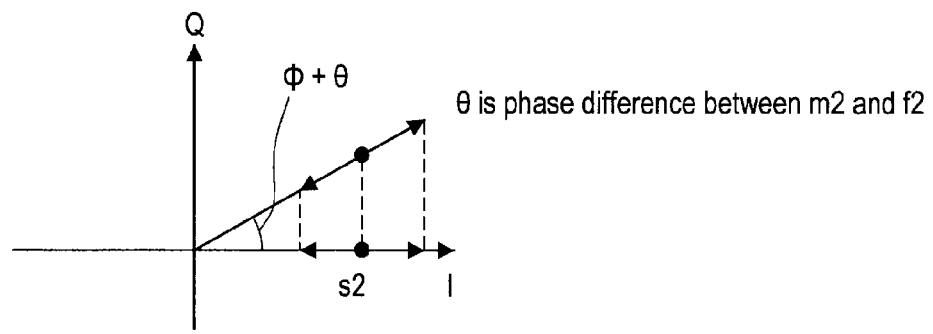
θ is phase difference between m2 and f2
(B)
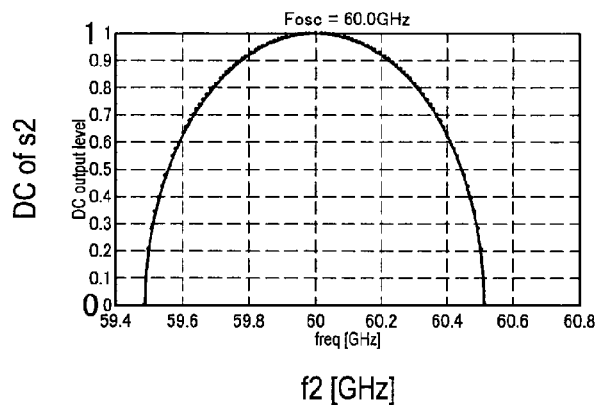
f2 [GHz]
(C)
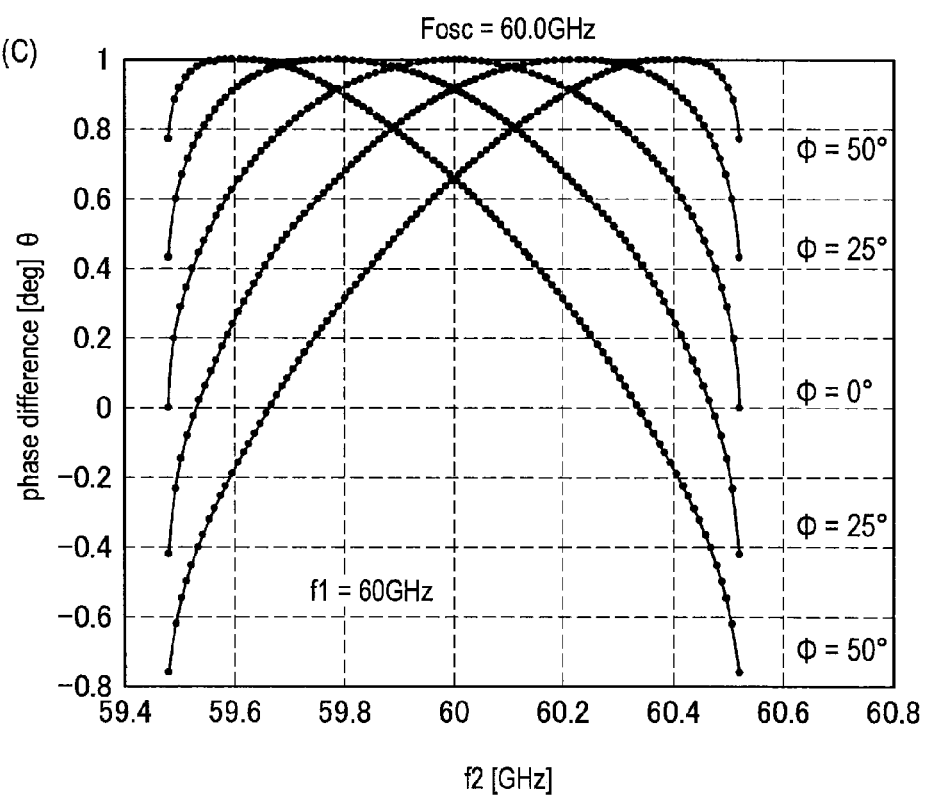

FIG.32
<embodiment 8>
(A)
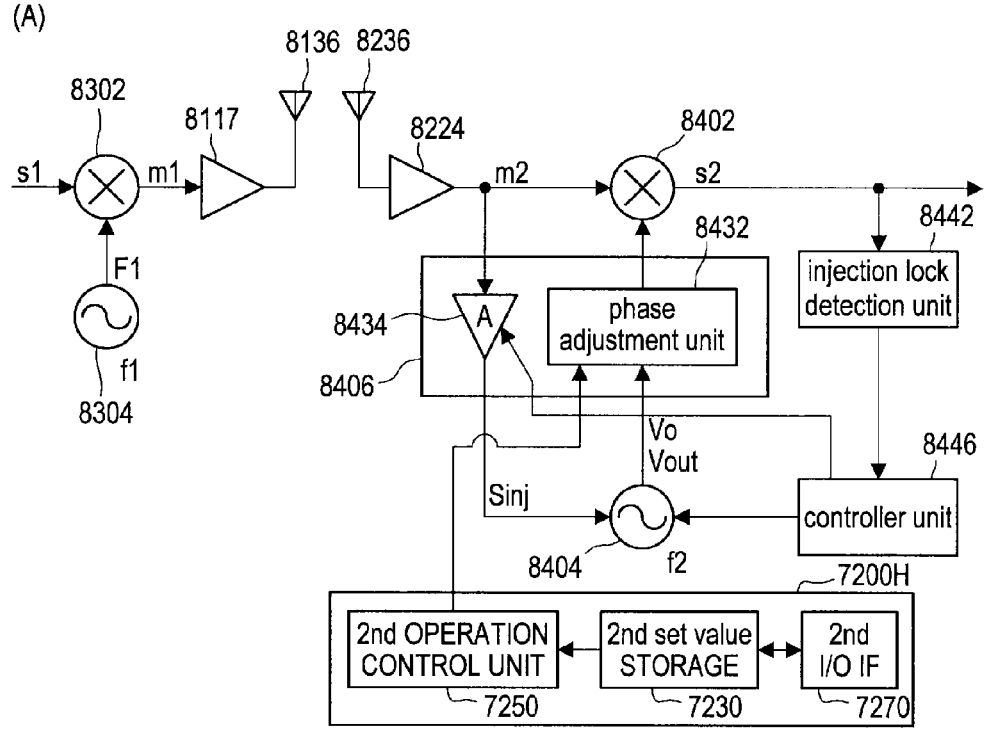
(B)
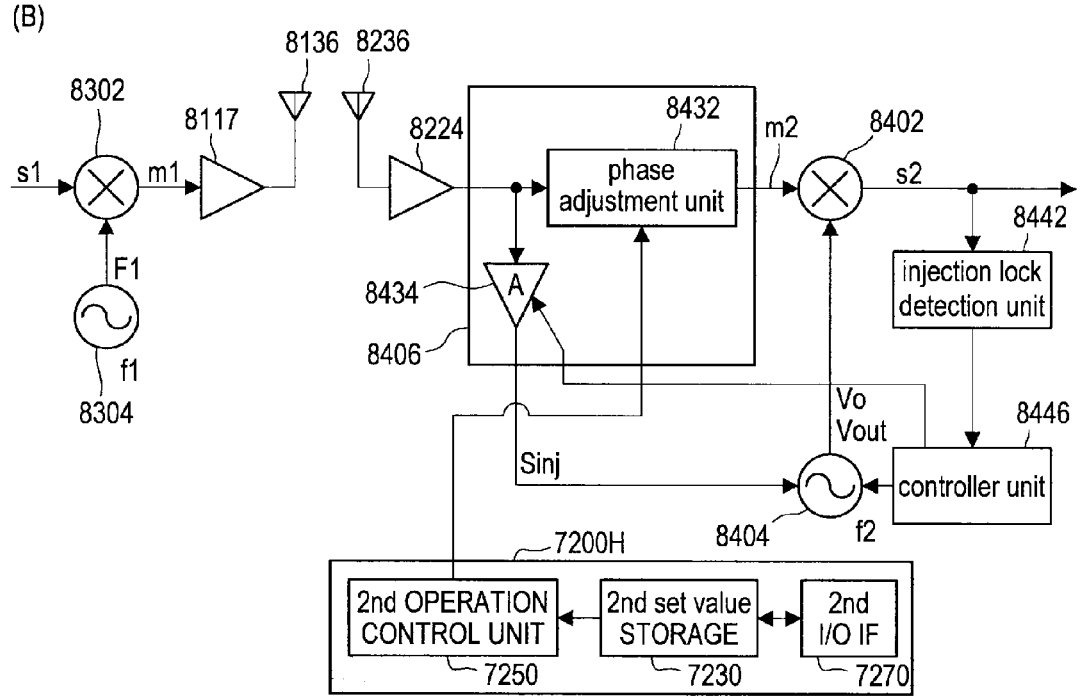

FIG.37
<embodiment 10: shift from carrier of Tx and Rx>
(A) comparative Ex.: no frequency shift
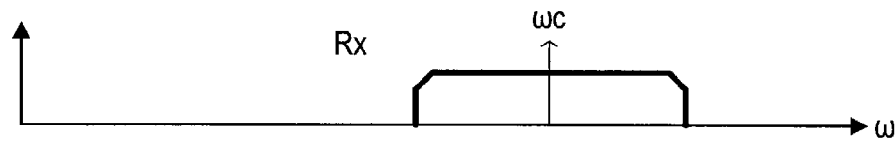
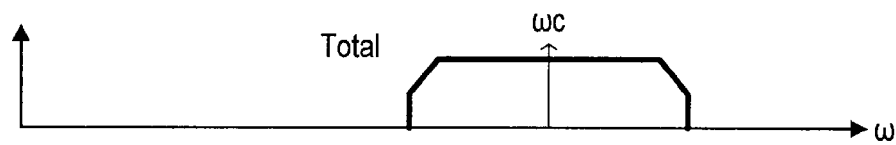
(B) embodiment 10: 1st basic Ex. (frequency shift of only one of Tx and Rx)
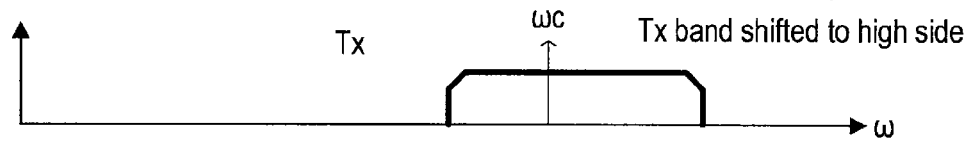
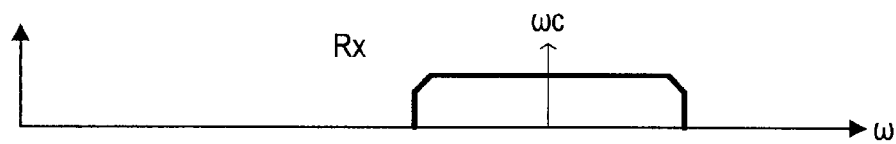
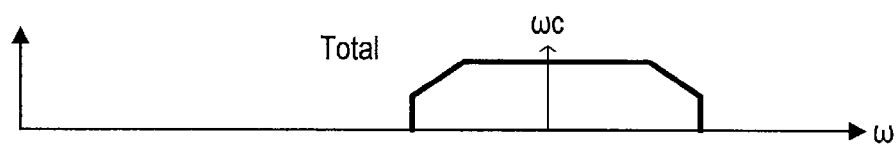
(C) embodiment 10: 2nd basic Ex. (frequency shift of both Tx and Rx)
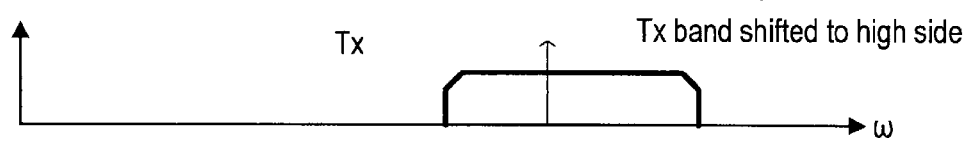
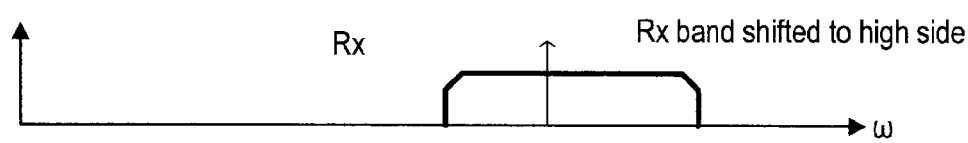
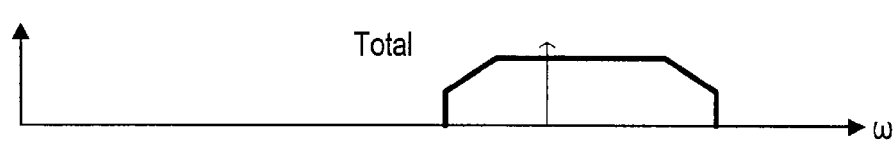

FIG.38
<embodiment 11: electronic device (1st Ex.)>
(A)
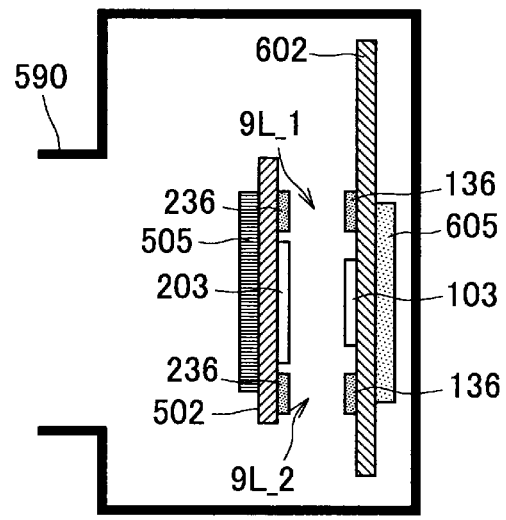
(B)
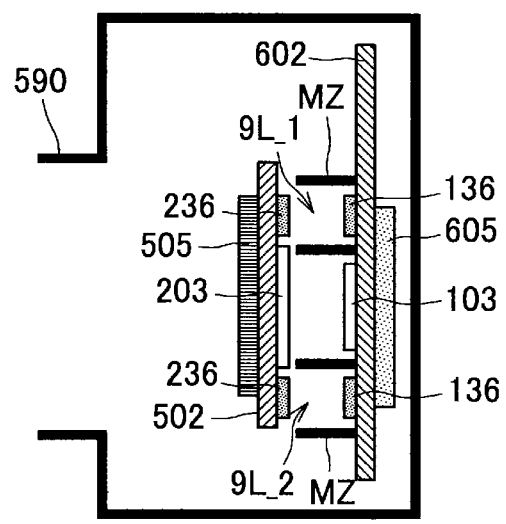

FIG. 39
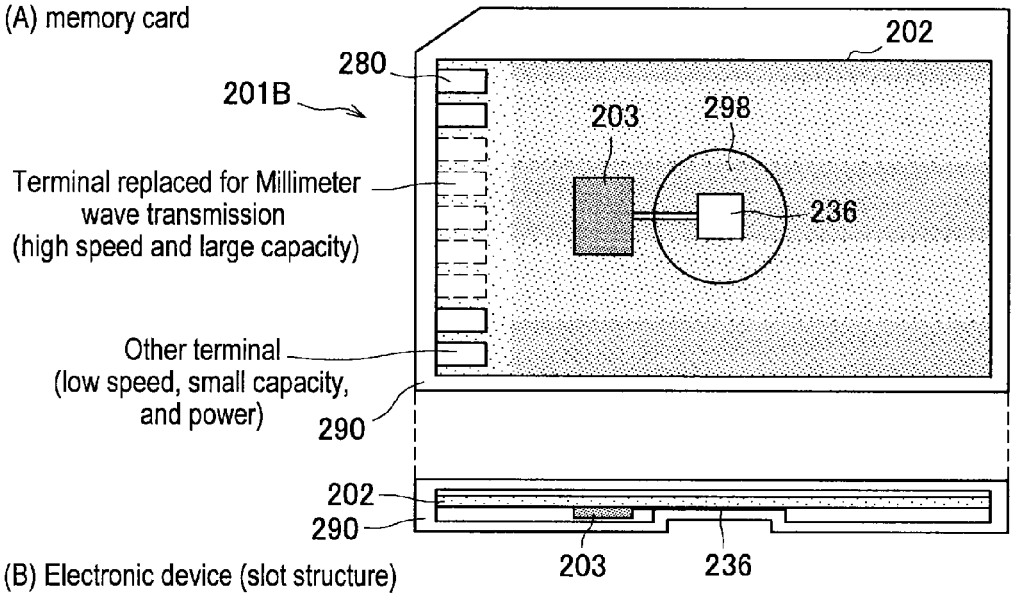
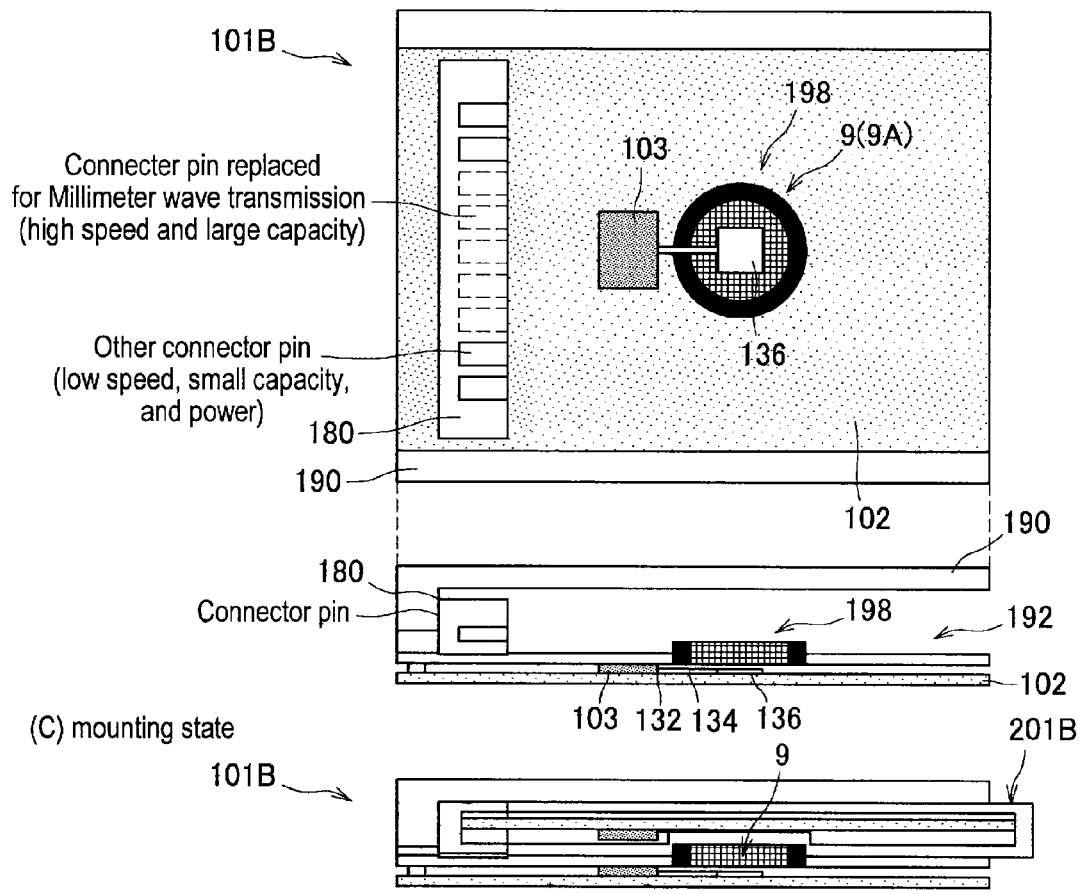

FIG. 40
<embodiment 11: electronic device (3rd Ex.)>
(A) image reproduction device 201K
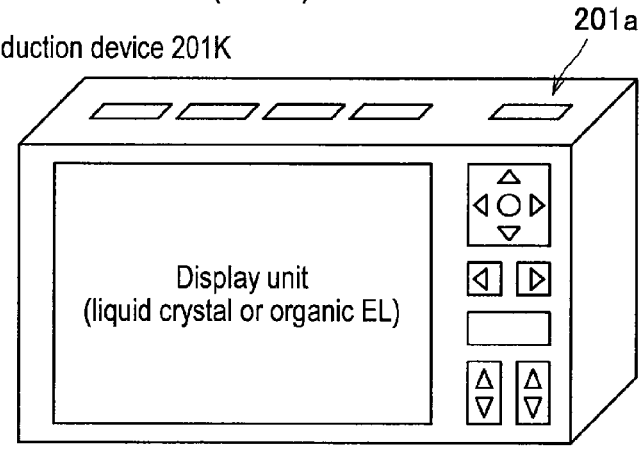
(B) image acquisition device 101K
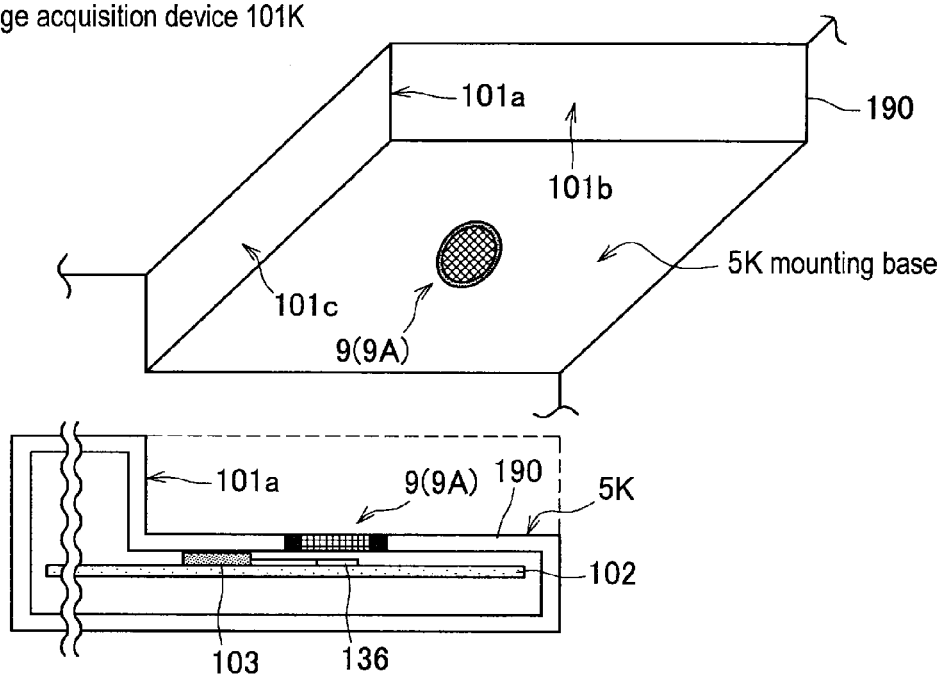
(C) mounting state
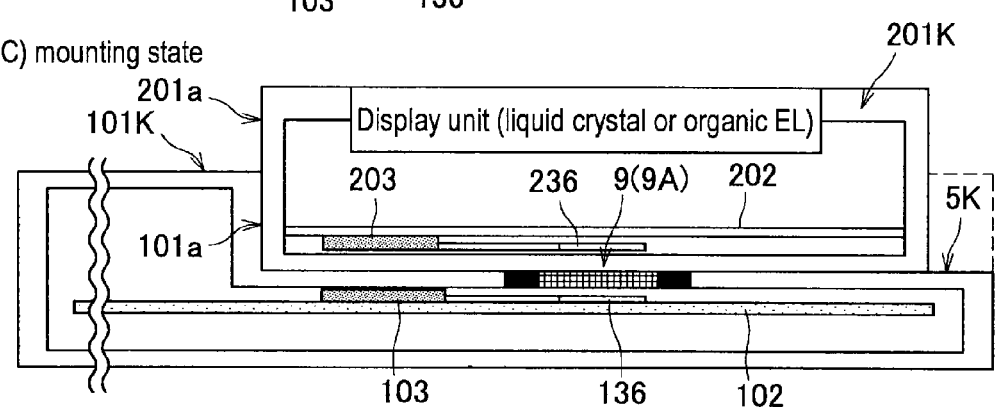

SIGNAL TRANSMISSION DEVICE, ELECTRONIC DEVICE, AND SIGNAL TRANSMISSION METHOD

TECHNICAL FIELD

The present invention relates to a signal transmission device, an electronic device, and a signal transmission method. More specifically, the present invention relates to a scheme for supplying a parameter (set value) for signal processing to a signal processing unit.

BACKGROUND ART

For example, as a scheme for realizing high speed signal transmission within one electronic device or between electronic devices arranged at a relatively short distance (e.g., within a few cm to 10 or more cm), for example, LVDS (Low Voltage Differential Signaling) is known. However, with the large capacity and high speed of recent new transmission data, problems such as increase in power consumption, increase in influence of signal distortion due to, for example, reflection, increase in unnecessary radiation, and the like have arisen. For example, when a signal such as an image signal (including a capture signal) or a computer image is transmitted at a high speed (in real time) within a device, the LVDS reaches its limit.

There is a scheme of reducing a transmission speed of each signal line through signal parallelization due to an increased number of lines in order to cope with the problem of the high speed of transmission data. However, in this scheme, the number of I/O terminals increases. As a result, a printed board or cable lines become complex or a large size of a semiconductor chip is necessary. In addition, high speed and large capacity data is along a line, which causes a problem known as electromagnetic interference.

Problems associated with the LVDS or the scheme of increasing the number of lines are caused by signal transmission using electrical lines. As a scheme for resolving the problems caused by the signal transmission using the electrical lines, a transmission scheme without electrical lines has been proposed.

For example, a technique for wirelessly performing in-housing signal transmission and applying a UWB (Ultra Wide Band) communication scheme has been proposed in Japanese Patent Laid-open Publication No. 2005-204221 or 2005-223411. In the UWB communication scheme disclosed in the two Patent Literatures, there are problems in that a carrier frequency is low, the UWB communication scheme is not suitable for high-speed communication such as image signal transmission, and an antenna is large. Further, since a frequency used for transmission is close to another frequency of baseband signal processing, there is a problem in that it is easy for interference to occur between a radio signal and a baseband signal. In addition, when the carrier frequency is low, it is easy to receive influence of a driving system noise in a device, and a solution becomes necessary.

On the other hand, use of a carrier frequency in a millimeter wave band is disclosed in Japanese Patent Laid-open Publication No. Hei10-256478 or U.S. Pat. No. 5,754,948. When the carrier frequency in a millimeter wave band with a shorter wavelength is used as in the two Patent Literatures, problems of an antenna size, interference, or influence of a driving system noise can be resolved.

CITATION LIST

Patent Literature

[Patent Literature 1] Japanese Patent Laid-open Publication No. 2005-204221
[Patent Literature 2] Japanese Patent Laid-open Publication No. 2005-223411
[Patent Literature 3] Japanese Patent Laid-open Publication No. Hei 10-256478
[Patent Literature 4] U.S. Pat. No. 5,754,948

SUMMARY OF INVENTION

Technical Problem

When various signal processing units are operated in order to perform radio communication, generally, a set value defining the operation is given to a signal processing unit, that is, parameter setting is performed. In this case, a dynamic adjustment mechanism including a control circuit or an operational circuit is generally provided so that the set value (parameter) corresponds to a change in an environment surrounding the signal processing unit. For example, it is necessary to provide a dynamic adjustment mechanism in a dynamic environment in which a change in the environment surrounding the signal processing unit, such as outdoor radio communication, is great.

However, such a dynamic adjustment mechanism increases a scale of a circuit and power consumption. In a static environment, such as radio communication within a device or between devices, in which a change in the environment surrounding the signal processing unit is small or there is substantially no environment change (in other words, influence of the environment change is negligible), it is unnecessary to provide the dynamic adjustment mechanism.

An object of the present invention is to provide an invention capable of executing parameter setting for radio communication while suppressing increase in a circuit scale or power consumption.

Solution to Problem

A signal transmission device according to a first aspect of the present invention includes at least one of a transmission unit for transmitting a signal-processed signal for a transmission target signal as a radio signal, and a reception unit for receiving the radio signal transmitted from the transmission unit. Here, a transmission characteristic between the transmission unit and the reception unit is known. Further, a signal processing unit for performing prescribed signal processing based on a set value, and a set value processing unit for inputting the set value for prescribed signal processing to the signal processing unit are included in at least one of a preceding stage of the transmission unit and a subsequent stage of the reception unit. Each signal transmission device defined in dependent claims relating to the signal transmission device according to the first aspect of the present invention defines a new advantageous concrete example of the signal transmission device according to the first aspect of the present invention.

An electronic device according to the second aspect of the present invention relates to so-called signal transmission within a device, in which a transmission unit for transmitting a signal-processed signal for a transmission target signal as a radio signal, a reception unit for receiving the radio signal transmitted from the transmission unit, and a radio signal transmission path for enabling radio transmission between the transmission unit and the reception unit are arranged in prescribed positions in one housing. Here, a transmission characteristic between the transmission unit and the reception unit is known. Further, a signal processing unit for performing prescribed signal processing based on a set value, and a set value processing unit for inputting a set value for prescribed signal processing (preferably corresponding to a transmission characteristic between the transmission unit and the reception unit) to the signal processing unit are included in at least one of a preceding stage of the transmission unit and a subsequent stage of the reception unit.

An electronic device according to a third aspect of the present invention relates to so-called signal transmission between devices, and includes a first electronic device in which a transmission unit for transmitting a signal-processed signal for a transmission target signal as a radio signal is arranged in a prescribed transmission position in one housing, and a second electronic device in which a reception unit for receiving the radio signal transmitted from the transmission unit is arranged in a prescribed reception position in one housing, thus constituting one entire electronic device. When the first electronic device and the second electronic device are arranged in determined positions, a radio signal transmission path enabling radio transmission between the transmission unit and the reception unit is formed, and a transmission characteristic between a transmission unit and a reception unit is known. Further, a signal processing unit for performing prescribed signal processing based on a set value, and a set value processing unit for inputting a set value for prescribed signal processing (preferably corresponding to a transmission characteristic between the transmission unit and the reception unit) to the signal processing unit are included in at least one of a preceding stage of the transmission unit and a subsequent stage of the reception unit.

A signal transmission method according to a fourth aspect of the present invention includes transmitting a signal-processed signal for a transmission target signal as a radio signal from a transmission unit, and receiving, in a reception unit, the radio signal transmitted from the transmission unit. In this case, a transmission characteristic between a transmission unit and a reception unit is known, and a set value for prescribed signal processing (preferably corresponding to a transmission characteristic between the transmission unit and the reception unit) is input to a signal processing unit. Further, in at least one of a preceding stage of the transmission unit and a subsequent stage of the reception unit, prescribed signal processing is performed based on the input set value in the signal processing unit.

Various techniques and schemes (techniques and schemes of the respective signal transmission devices defined in dependent claims relating to the signal transmission device according to the first aspect of the present invention) applied to the signal transmission device according to the first aspect of the present invention may be similarly applied to each of the electronic device according to the second aspect of the present invention, the electronic device according to the third aspect of the present invention, and the signal transmission method according to the fourth aspect of the present invention.

In each of the first to fourth aspects of the present invention, the transmission characteristic between the transmission unit and the reception unit is known, and each signal processing unit at the transmission side or the receiving side performs prescribed signal processing according to the set value (parameter), but in this case, the set value processing unit inputs the set value for prescribed signal processing to the signal processing unit. In brief, the set value for signal processing is a prescribed value (i.e., a fixed value). Since the set value is not dynamically changed according to, for example, an environment change, a parameter operation circuit can be simplified or power consumption can be reduced. Since a dynamic adjustment mechanism is not provided, a parameter operation circuit is not unnecessarily operated even in a static environment in which influence of the environment change is negligible.

Advantageous Effects of Invention

According to the present invention, it is possible to execute parameter setting for radio communication while suppressing increase in circuit scale or power consumption.

BRIEF DESCRIPTION OF DRAWINGS

FIGS. 5(A) to 5(C) are diagrams illustrating embodiment 1 (a first example of a modulation function unit and a demodulation function unit).

FIGS. 10(A) to 10(B) are diagrams illustrating an operation scheme of a MIMO process applied to a receiving side.

FIG. 11 is a diagram illustrating an operation scheme of a MIMO process applied to a receiving side.

FIGS. 12(A) to 12(C) are diagrams illustrating a relationship between a constraint of antenna arrangement and a MIMO processing amount (inverse matrix operation amount).

FIGS. 14(A) to 14(B) are diagrams illustrating an operation scheme of the MIMO process applied to the transmission side.

FIGS. 16(A) to 16(C) are diagrams illustrating embodiment 7 (a third example of a modulation function unit and a peripheral circuit).

FIGS. 17(A) to 17(C) are diagrams illustrating embodiment 7 (a third example of a demodulation function unit and a peripheral circuit).

FIG. 18 is a diagram showing a configuration example of a phase and amplitude adjustment unit.

FIG. 25 is a diagram showing a phase relationship of respective signals in injection locking.

FIG. 26 is a diagram illustrating embodiment 7, in which a basic configuration of modulation and demodulation corresponding to injection locking is shown.

FIGS. 28(A) to 28 (C) are diagrams illustrating embodiment 7, in which one example of a relationship between a phase difference between an injection signal and a demodulation carrier signal in injection locking and a DC component of a demodulation output is shown.

FIGS. 30(A) to 30(B) are diagrams illustrating embodiment 8, in which a phase difference between a reception signal and a demodulation carrier signal supplied to a frequency mixing unit is illustrated.

FIGS. 31(A) to 31(C) are diagrams illustrating embodiment 8, in which a relationship between a phase difference between the reception signal and the demodulation carrier signal supplied to the frequency mixing unit and a DC component of a demodulation signal is illustrated.

FIGS. 32(A) to 32(B) are diagrams illustrating embodiment 8, in which a scheme for suppressing influence of the phase difference between the reception signal and the demodulation carrier signal supplied to the frequency mixing unit is illustrated.

FIGS. 37(A) to 37(C) are diagrams showing a frequency-amplitude characteristic example illustrating frequency shift for a carrier for a transmission side and a receiving side.

FIGS. 38(A) to 38(B) are diagrams illustrating a first example of an electronic device of embodiment 11.

FIG. 39 is a diagram illustrating a second example of the electronic device of embodiment 11.

FIG. 40 is a diagram illustrating a third example of the electronic device of embodiment 11.

DESCRIPTION OF EMBODIMENTS

Figure 1:
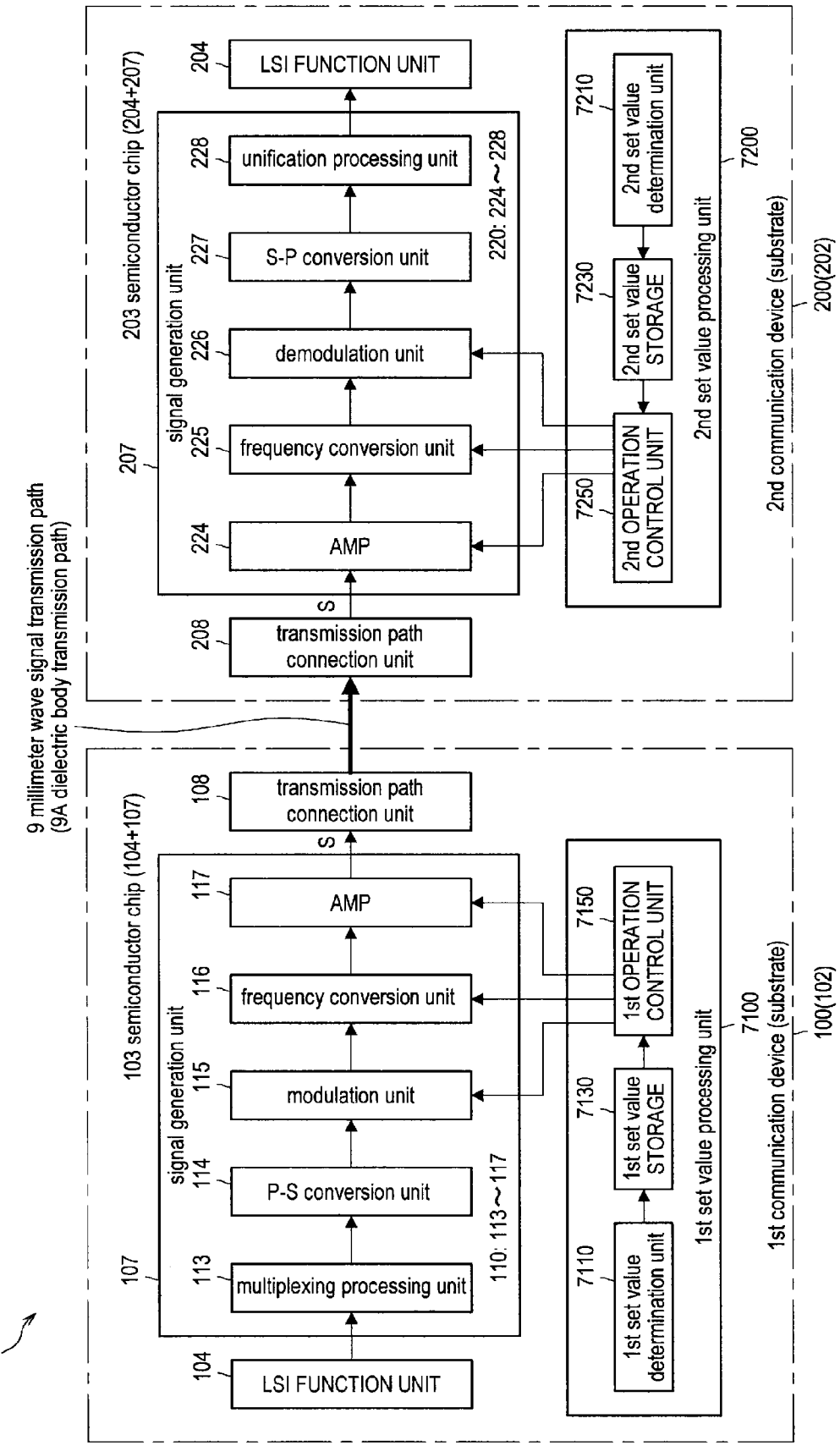
FIG. 1 is a diagram showing a first basic configuration (a first example) of a wireless transmission device of the present embodiment.

Hereinafter, embodiments of the present invention will be described in detail with reference to the accompanying drawings. When respective functional elements are distinguished according to forms, reference numerals of capital letters such as A, B, C, . . . are added and described. In particular, when a description is given without distinguishment, these reference numerals will be omitted. The same applies to the drawings.

A description will be given in the following order.
1. Overall Overview
2. Communication Processing System: Basic Configuration 1
3. Communication Processing System: Basic Configuration 2
4. Embodiment 1: First Example of Modulation Function Unit and Demodulation Function Unit
5. Embodiment 2: Second Example of Modulation Function Unit and Demodulation Function Unit
6. Embodiment 3: Frequency Characteristic Correction Process
7. Embodiment 4: Echo Canceller Technique in Bidirectional Communication
8. Embodiment 5: Space Division Multiplexing (MIMO Process at Receiving Side)
9. Embodiment 6: Space Division Multiplexing (MIMO Process at Transmission Side)
10. Embodiment 7: Third Example (Injection Locking Scheme) of Modulation Function Unit and Demodulation Function Unit
11. Embodiment 8: Phase Difference Correction in Injection Locking Scheme
12. Embodiment 9: Spreading Code Scheme
13. Embodiment 10: High Speed of Transmission Data
14. Embodiment 11: Example of Application to Electronic Device <Overall Overview>
[Wireless Transmission Device and Wireless Transmission Method]

In a first configuration of the present embodiment corresponding to the first aspect or the fourth aspect of the present invention, at least one of a transmission unit (e.g., a transmission path connection unit at a transmission side) and a reception unit (e.g., a transmission path connection unit) is included to constitute a wireless transmission device. The transmission unit transmits a signal-processed signal for a transmission target signal as a radio signal. The reception unit receives the radio signal transmitted from the transmission unit. Here, a transmission characteristic between the transmission unit and the reception unit is known. For example, in an environment in which a transmission condition between transmission and reception is substantially not changed (i.e., is fixed), such as a case in which arrangement positions of the transmission unit and the reception unit in one housing are not changed (in the case of in-device communication) or a case in which the arrangement positions of the transmission unit and the reception unit in a use state are in a prescribed state (radio transmission between devices at a relatively short distance) even when the transmission unit and the reception unit are arranged in separate housings, a transmission characteristic between a transmission unit and a reception unit can be recognized in advance. A signal processing unit and a set value processing unit are included in at least one of a preceding stage of the transmission unit and a subsequent stage of the reception unit. The signal processing unit performs prescribed signal processing based on the set value. The set value processing unit inputs the set value for prescribed signal processing to the signal processing unit.

The present invention is not limited to the set value corresponding to the transmission characteristic or the signal transmission within a device or between devices, and for example, parameter setting for correction of variations of circuit elements is also included. Preferably, a set value processing unit may input a set value for prescribed signal processing to the signal processing unit corresponding to a transmission characteristic between the transmission unit and the reception unit. In an environment in which a transmission condition between transmission and reception is substantially changed (i.e., is fixed), even when a set value for defining an operation of the signal processing unit is treated as a fixed value, that is, even when parameter setting is regarded as fixing, the signal processing unit can be correctly operated. The set value for signal processing is set to a prescribed value (i.e., a fixed value) such that parameter setting is not dynamically changed and accordingly the parameter operation circuit can be simplified and power consumption can be reduced. In radio transmission within a device or between devices at a relatively short distance, a communication environment is fixed. Accordingly, various circuit parameters that depend on communication environments can be determined in advance. In an environment in which a transmission condition can be fixed, even though a set value for defining an operation of the signal processing unit is treated as a fixed value, that is, the parameter setting is fixed, the signal processing unit can be correctly operated. For example, an optimal parameter can be obtained in shipment at a factory and held in a device unit, such that the parameter operation circuit can be simplified or power consumption can be reduced.

When various circuit parameters are determined in advance, any of a first scheme of automatically generating the parameters within a device and a second scheme of using parameters generated in the outside of a wireless transmission device (or an electronic device) may be employed. When the first scheme is used, the set value processing unit may include a set value determination unit for determining a set value, a storage unit for storing the set value determined by the set value determination unit, and an operation control unit for operating the signal processing unit based on the set value read from the storage unit. When the second scheme is used, the set value processing unit may include a set value receiving unit for receiving a set value from the outside, a storage unit for storing the set value received by the set value receiving unit, and an operation control unit for operating the signal processing unit based on the set value read from the storage unit.

There are a variety of signal processing parameter settings. For example, there is gain setting (signal amplitude setting) for a signal amplification circuit (amplitude adjustment unit). The signal amplification circuit is used, for example, for transmission power setting, reception level setting input to a demodulation function unit, or automatic gain control (AGC). In this case, the signal processing unit includes an amplitude adjustment unit for performing signal processing for adjusting a size of the input signal and outputting the adjusted signal, and the set value processing unit inputs a set value for adjusting a size of the input signal to the amplitude adjustment unit.

As another example of signal processing parameter setting, there is setting of a phase adjustment amount. For example, in a system for separately transmitting a carrier signal or a clock, a phase may be adjusted according to a delay amount of a transmission signal. In this case, the signal processing unit includes a phase adjustment unit for performing signal processing for adjusting a phase of an input signal and outputting the adjusted signal, and the set value processing unit inputs a set value for adjusting a phase of the input signal to the phase adjustment unit. This setting of a phase adjustment amount may be combined with the above-described gain setting.

As another example of signal processing parameter setting, there is setting of a frequency characteristic. For example, this is a case in which amplitude of a low frequency component or a high frequency component is emphasized at the transmission side. In this case, the signal processing unit includes a frequency characteristic correction processing unit for correcting a frequency characteristic of an input signal and outputting the corrected signal, and the set value processing unit inputs a set value for correcting a frequency characteristic of an input signal to the frequency characteristic correction processing unit.

As another example of signal processing parameter setting, there is setting of an echo canceller amount when bidirectional communication is performed. In this case, the signal processing unit includes an echo suppression unit for suppressing an echo component contained in an input side among signals output from the transmission side, and the set value processing unit inputs a set value for suppressing an echo component to the echo suppression unit.

As another example of signal processing parameter setting, there is setting of a cancel amount of crosstalk when the transmission unit and the reception unit each include a plurality of antennas and spatial multiplexing communication is performed between transmission and reception. In this case, the signal processing unit includes a matrix operation processing unit for performing a matrix operation based on a channel matrix having a transfer function of each antenna pair between transmission and reception as an element, and the set value processing unit inputs a set value for performing the matrix operation to the matrix operation processing unit.

As another example of signal processing parameter setting, there is setting of an amplitude value (injection amount) or a phase shift amount of an injection signal when a carrier signal for demodulation (demodulation carrier signal) synchronized to a carrier signal for modulation (modulation carrier signal) generated by a carrier signal generation unit at a transmission side is generated by an injection locking scheme based on a received signal, a correction amount of a phase difference between a reception signal and a demodulation carrier signal input to the demodulation function unit, and the like. A set value for injection locking such as the amplitude value or the phase shift amount of the injection signal, or the correction amount of the phase difference between the reception signal and the demodulation carrier signal is referred to as "set value for performing injection locking." In this case, the signal processing unit for transmission includes a first carrier signal generation unit for generating a carrier signal for modulation, and a first frequency conversion unit for frequency-converting a transmission target signal with the carrier signal for modulation generated by the first carrier signal generation unit to generate a modulation signal, and transmitting the modulation signal to the radio signal transmission path. The signal processing unit for reception includes a second carrier signal generation unit for generating a carrier signal for demodulation synchronized to the carrier signal for modulation generated by the first carrier signal generation unit as a signal received via the radio signal transmission path is injected, and a second frequency conversion unit for frequency-converting the modulation signal received via the radio signal transmission path with the carrier signal for demodulation generated by the second carrier signal generation unit. The set value processing unit inputs a set value for performing injection locking to the signal processing unit for transmission and/or the signal processing unit for reception.

A size of a DC component of a signal (demodulation signal) demodulated by the demodulation function unit is determined by a phase difference between the reception signal and the demodulation carrier signal input to the demodulation function unit, but the phase difference becomes zero when the DC component is maximum, and a free-running frequency difference between the injection signal and the demodulation carrier signal generated by the injection locking disappears. Accordingly, the "set value for performing injection locking" may be determined such that the DC component of the demodulation signal is great. However, since a locking range is changed by a size of an injection signal level (injection amount), in order to rapidly find a maximum value while maintaining a locked state, it is necessary to optimally select a change amount (step) to change the free-running frequency of the demodulation carrier signal. For this, an optimal step may be calculated from the amplitude of the reception signal input to the demodulation function unit in advance, stored in a storage unit, and used when the free-running frequency of the demodulation carrier signal is changed. Alternatively, an optimal gain may be obtained so that the injection amount is constant, stored in a storage unit, and used for setting of the injection amount. Further, since there is a path difference between the reception signal and the demodulation carrier signal input to the demodulation function unit, influence of the path difference appears in a phase difference and a way in which the DC component of the demodulation signal varies is changed. Accordingly, a phase adjustment unit (phase shifter) may be inserted into at least one of paths of the injection signal, the demodulation carrier signal, and the reception signal, and a value of a phase adjustment amount (phase shift amount) may be held in the storage unit in advance and used for phase adjustment setting.

As a configuration for determining the "set value for performing injection locking," for example, an injection locking judgment and an adjustment mechanism based on a judgment result may be used. For example, the signal processing unit for reception includes an injection locking detection unit for detecting information indicating an injection locking state in the second carrier signal generation unit, and at least one of the signal processing unit for transmission and the signal processing unit for reception includes an injection locking adjustment unit for performing synchronization adjustment so that the carrier signal for demodulation generated by the second carrier signal generation unit is synchronized to the carrier signal for modulation generated by the first carrier signal generation unit, based on the information indicating the injection locking state detected by the injection locking detection unit. The set value processing unit holds and reads the set value adjusted by the injection locking adjustment unit in the storage unit and uses the set value for an operation setting for the signal processing unit.

The synchronization adjustment in the injection locking adjustment unit may be performed at the receiving side or may be performed at the transmission side. For example, when the synchronization adjustment is performed at the receiving side, the injection locking adjustment unit changes amplitude of a signal injected to the second carrier signal generation unit and/or a frequency of an output signal when the second carrier signal generation unit performs free-running oscillation to thereby perform the synchronization adjustment. When the synchronization adjustment is performed at the transmission side, the injection locking adjustment unit changes a frequency of the carrier signal for modulation generated by the first carrier signal generation unit and/or amplitude of a signal transmitted to the radio signal transmission path to thereby perform the synchronization adjustment. Further, the synchronization adjustment may be performed at either of the receiving side and the transmission side, and a control agent when the synchronization adjustment is performed at the transmission side may be arranged in either of the receiving side and the transmission side.

When the demodulation carrier signal is generated by the injection locking scheme, preferably, the signal processing unit at a transmission side includes a modulation target signal processing unit for suppressing a component near DC of modulated transmission target information, and the frequency conversion unit at the transmission side may frequency-convert the processed signal processed by the modulation target signal processing unit with the modulation carrier signal generated the carrier signal generation unit at the transmission side to generate a transmission signal. In brief, DC cut is performed in advance to facilitate the injection locking. Preferably, the modulation target signal processing unit may perform DC-free coding on digital transmission target information.

As another example of signal processing parameter setting, there is setting of a correction amount of a clock phase when a clock signal synchronized to the spreading code sequence for a synchronization mechanism of a spreading code sequence in radio communication of a spreading code scheme is transmitted. In this case, a reference signal output unit for outputting a reference signal, and a clock generation unit for generating a clock signal for signal processing about a radio communication process of a spreading code scheme in synchronization with the reference signal based on the reference signal output from the reference signal output unit are further included. The clock generation unit includes a phase correction unit for performing phase correction according to the set value, the signal processing unit performs signal processing based on the clock signal subjected to phase correction by the phase correction unit, and the set value processing unit inputs a set value for performing the phase correction to the phase correction unit. The signal processing unit may include a spreading code sequence generation unit for generating a spreading code sequence in synchronization with the clock signal generated by the clock generation unit, and a spreading processing unit for performing a spreading process for transmission target data as signal processing based on the spreading code sequence generated by the spreading code sequence generation unit.

As another example of signal processing parameter setting, there is setting of a shift amount of a carrier frequency of a transmission side or a receiving side when high speed of transmission data is achieved using asymmetry of a transmission frequency characteristic between transmission and reception with respect to the carrier frequency. In this case, a signal processing unit at a transmission side including a first carrier signal generation unit for generating a carrier signal for modulation, and a first frequency conversion unit for frequency-converting a transmission target signal with the carrier signal for modulation generated by the first carrier signal generation unit to generate a transmission signal; and a signal processing unit at a receiving side including a second carrier signal generation unit for generating a carrier signal for demodulation, and a second frequency conversion unit for frequency-converting the received transmission signal with the carrier signal for demodulation generated by the second carrier signal generation unit are included. At least one of the carrier signal for modulation and the carrier signal for demodulation is shifted from a band center of a transmission characteristic between transmission and reception and set. For example, only one of the transmission system and the receiving system may be frequency-shifted. Only one of a band center of a transmission system (which may include the amplification circuit at the transmission side, as well as the signal processing unit and the modulation function unit at the transmission side) and a band center of a receiving system (which may include the amplification circuit at the receiving side, as well as the signal processing unit and the demodulation function unit at the receiving side) may be shifted from the frequency of the carrier signal and set. Alternatively, both of the transmission system and the receiving system may be frequency-shifted in the same direction. In this case, both the band center of the transmission system and the band center of the receiving system may be shifted in the same direction from the frequency of the carrier signal and set.

Preferably, the demodulation is performed through lock detection, that is, the frequency conversion unit at the receiving side performs frequency conversion using a lock detection scheme to demodulate the transmission target signal. Preferably, the demodulation carrier signal may be generated by the injection locking scheme. In this case, preferably, the "set value for injection locking" may be fixed as described above, and for example an injection locking judgment and an adjustment mechanism based on a judgment result may be used as a configuration for determining the "set value for performing injection locking." In the case of the injection locking scheme, preferably, DC cut (e.g., DC-free coding) may be performed at the transmission side in advance so that injection locking is facilitated, as described above.

[Electronic Device]

In an electronic device of the present embodiment corresponding to the second aspect of the present invention or the third aspect of the present invention, respective units are accommodated in one housing so that one electronic device is configured, or one entire electronic device is configured through a combination of a plurality of devices (electronic devices). The wireless transmission device of the present embodiment is used, for example, for electronic devices such as a digital recording and reproducing apparatus, a terrestrial television receiver device, a portable phone device, a gaming device, or a computer.

In the wireless transmission device of the present embodiment that will be described below, a carrier frequency in a millimeter wave band (wavelength is 1 to 10 mm) is used, but the present invention is not limited to the millimeter wave band, and a carrier frequency near a millimeter wave band with a shorter wavelength, such as a sub-millimeter wave band, may be used.

The wireless transmission device may be configured of only a transmission side, only a receiving side, or both the transmission side and the receiving side. The transmission side and the receiving side are connected via a radio signal transmission path (e.g., millimeter wave signal transmission path) to perform signal transmission in the millimeter wave band. A transmission target signal is frequency-converted into a millimeter wave band suitable for broadband transmission and then transmitted. For example, a first communication unit (a first millimeter wave transmission device) and a second communication unit (a second millimeter wave transmission device) constitute a wireless transmission device. Between the first communication unit and the second communication unit arranged at a relatively short distance, a transmission target signal is converted into a millimeter wave signal and then this millimeter wave signal is transmitted via the millimeter wave signal transmission path. "Radio transmission" of the present embodiment refers to transmitting a transmission target signal wirelessly (in this example, millimeter wave) rather than a general electrical line (simple wire line).

"Relatively short distance" refers to a shorter distance than a distance between communication devices used outdoors for broadcasting or general radio communication and may be such a distance that can substantially specify a space in which a transmission range is closed. The "closed space" refers to a space where electromagnetic wave leakage from the inside of the space to the outside is less and, reversely, electromagnetic wave input (intrusion) from the outside to the inside of the space is less. Typically, the entire space is surrounded by a housing (case) having a shield effect against the electromagnetic wave. For example, this corresponds to communication between substrates within a housing of one electronic device or communication between chips on the same substrate, or communication between devices in a state in which a plurality of electronic devices are integral, such as in a state in which one electronic device is mounted on the other electronic device. "Integral" typically refers to a state in which both electronic devices are completely contacted by mounting, and may refer to a state in which a transmission range between both the electronic devices is substantially specified as a closed space. For example, it includes a state that can be regarded as "substantially" integral, in which both electronic devices are arranged in determined positions at a relatively short distance, such as within a few cm or within 10 or more cm. In brief, it may be a state in which electromagnetic wave leakage from the inside of a space where an electromagnetic wave formed in both electronic devices can be propagated to the outside is less and, reversely, electromagnetic wave input (intrusion) from the outside to the inside of the space is less.

Hereinafter, signal transmission within a housing of one electronic device is referred to as in-housing signal transmission, and signal transmission in a state in which a plurality of electronic devices are integral (hereinafter, including "substantially integral") is referred to as inter-device signal transmission. In the case of the in-housing signal transmission, a wireless transmission device in which a communication device at a transmission side (communication unit: a transmission unit) and a communication device at a receiving side (communication unit: a reception unit) are accommodated in the same housing, and a radio signal transmission path is formed between communication units (a transmission unit and a reception unit) is an electronic device. Meanwhile, in the case of the inter-device signal transmission, when a communication device at a transmission side (communication unit: a transmission unit) and a communication device at a receiving side (communication unit: a reception unit) are accommodated within housings of different electronic devices, and both the electronic devices are arranged in determined positions and integrally arranged, a radio signal transmission path is formed between communication units (a transmission unit and a reception unit) in both the electronic devices, so that a wireless transmission device is built.

In respective communication devices with a millimeter wave signal transmission path provided therebetween, a transmission system and a receiving system are paired, assembled and arranged. The transmission system and the receiving system are present in each communication device such that bidirectional communication can be realized. When the transmission system and the receiving system are present in each communication device, signal transmission between one communication device and the other communication device may be unidirectional (one way) transmission or bidirectional transmission. For example, when the first communication unit becomes a transmission side and the second communication unit becomes a receiving side, a transmission unit is arranged in the first communication unit and a reception unit is arranged in the second communication unit. When the second communication unit is a transmission side and the first communication unit is a receiving side, a transmission unit is arranged in the second communication unit and a reception unit is arranged in the first communication unit.

The transmission unit includes, for example, a signal generation unit at the transmission side for signal-processing a transmission target signal to generate a millimeter wave signal (a signal conversion unit for converting an electrical signal as a transmission target into the millimeter wave signal), and a signal connection unit at a transmission side for connecting the millimeter wave signal generated by the signal generation unit at a transmission side to a transmission path for transmitting the millimeter wave signal (millimeter wave signal transmission path). Preferably, the signal generation unit at a transmission side may be integral with a functional unit for generating a transmission target signal.

For example, the signal generation unit at a transmission side includes a modulation circuit, which modulates a transmission target signal. The signal generation unit at a transmission side frequency-converts the signal modulated by the modulation circuit to generate the millimeter wave signal. In principle, the transmission target signal may be directly converted into the millimeter wave signal. The signal connection unit at the transmission side supplies the millimeter wave signal generated by the signal generation unit at a transmission side to the millimeter wave signal transmission path.

The reception unit includes, for example, a signal connection unit at a receiving side for receiving the millimeter wave signal transmitted via the millimeter wave signal transmission path, and a signal generation unit at a receiving side for signal-processing the millimeter wave signal (input signal) received by the signal connection unit at a receiving side to generate a normal electrical signal (a transmission target signal) (a signal conversion unit for converting the millimeter wave signal into an electrical signal as a transmission target). Preferably, the signal generation unit at a receiving side may be integral with a functional unit for receiving the transmission target signal. For example, the signal generation unit at a receiving side includes a demodulation circuit, and frequency-converts the millimeter wave signal to generate an output signal, and the demodulation circuit demodulates the output signal to generate a transmission target signal. In principle, the millimeter wave signal may be directly converted into the transmission target signal.

That is, when a signal interface is used, the transmission target signal is transmitted by a millimeter wave signal without a contact or a cable (no transmission with an electrical line). Preferably, at least the signal transmission (particularly, for an image signal or a high-speed clock signal requiring high-speed transmission or large capacity transmission) is transmission based on the millimeter wave signal. In brief, in a related art, signal transmission is performed using electrical lines while in the present embodiment, the signal transmission is performed using a millimeter wave signal. As the signal transmission in a millimeter wave band is performed, high speed signal transmission on the order of Gbps can be realized, and coverage of a millimeter wave signal can be easily limited so that resultant effects can be obtained.

Here, each signal connection unit may be such that the first communication unit and the second communication unit can transmit a millimeter wave signal via the millimeter wave signal transmission path. For example, the signal connection unit may include an antenna structure (antenna connection unit) or may use a connection without including the antenna structure. A "millimeter wave signal transmission path for transmitting a millimeter wave signal" may be air (so-called free space), but preferably, may be a structure for transmitting a millimeter wave signal while confining the millimeter wave signal in a transmission path (referred to as a millimeter wave confining structure or a radio signal confining structure). The millimeter wave confining structure is positively used such that pulling of the millimeter wave signal transmission path can be arbitrarily settled, as in the electrical line. For example, such a millimeter wave confining structure typically is a so-called waveguide, but the present invention is not limited thereto. For example, the millimeter wave confining structure may be a structure configured of a dielectric material capable of millimeter wave signal transmission (referred to as a dielectric body transmission path or in-millimeter wave dielectric transmission path) or a hollow waveguide in which a transmission path is formed, a shield for suppressing radiation of a millimeter wave signal to the outside surrounds the transmission path, and the inside of the shield is hollow. The dielectric material or the shield has flexibility such that pulling of the millimeter wave signal transmission path is possible. When the millimeter wave signal transmission path is air (so-called free space), each signal connection unit uses an antenna structure such that a space at a short distance can be used for signal transmission by the antenna structure. Meanwhile, when the structure is configured of a dielectric material, an antenna structure may be used, but this is not essential.

[Comparison Between Signal Transmission Using Electrical Line and Wireless Transmission]

There are the following problems associated with signal transmission for performing signal transmission via an electrical line.

i) Large capacity and high speed of transmission data is required, but transmission speed and transmission capacity of the electrical line are limited.

ii) There is a scheme for reducing transmission speed for each signal line through signal parallelization based on an increased number of lines to cope with a problem of high speed of transmission data. However, in this scheme, the number of I/O terminals increases. As a result, a printed board or a cable line becomes complex, and a large physical size of a connector unit or an electrical interface is necessary. Accordingly, a shape is complex, reliability is degraded, and cost increases.

iii) With the increase of an information amount of movie images, computer images or the like, a band of a baseband signal is broadened, and accordingly an EMC (electromagnetic environment compatibility) problem becomes more apparent. For example, when an electrical line is used, a line becomes an antenna and a signal corresponding to a tuning frequency of the antenna is interfered with. In addition, reflection or resonance caused by mismatching of an impedance of a line causes unnecessary radiation. In order to resolve such a problem, a configuration of the electronic device becomes complex.

iv) In addition to the EMC, when there is reflection, a transmission error caused by interference between symbols at a receiving side or a transmission error caused by an obstruction becomes a problem.

On the other hand, when signal transmission is performed wirelessly (e.g., using a millimeter wave band) rather than through an electrical line, since there is no need to worry about a line shape or a connector position, a layout is not limited. For a signal replaced for signal transmission using a millimeter wave, lines or terminals can be omitted and the EMC problem is resolved. In general, since there is no function unit using a frequency in a millimeter wave band in a communication device unit, an EMC solution can be easily realized. Since radio transmission is in a state in which a communication device at a transmission side is close to a communication device at a receiving side and is signal transmission between fixed positions or in a known positional relationship, the following advantages are obtained.

1) It is easy to appropriately design a propagation channel (waveguide structure) between a transmission side and a receiving side.

2) A dielectric structure of a transmission path connection unit that connects a transmission side to a receiving side and a propagation channel (a waveguide structure of a millimeter wave signal transmission path) are designed together such that good transmission with high reliability becomes possible in comparison with free space transmission.

3) Since control of a controller for managing radio transmission does not need to be performed dynamically, adaptively and frequently, unlike general radio communication, overhead due to the control can be smaller than in general radio communication. As a result, a set value (so-called parameter) used, for example, in a control circuit or an operational circuit can be a constant number (so-called fixed value), and small, low power consumption and high speed can be realized. For example, when a radio transmission characteristic is calibrated in manufacture or in design and individual variations are recognized, the data can be referenced and accordingly a set value for defining an operation of the signal processing unit can be subjected to preset or static control. Since the set value substantially appropriately defines an operation of the signal processing unit, high-quality communication becomes possible with a simple configuration and low power consumption.

For example, radio transmission within a device or between devices has features in that a situation of a propagation path is not changed, there is (almost) no substantial change in reception power or timing, a propagation distance is short, a delay spread of a multipath is small, etc., unlike outdoor communication such as so-called cellular communication. These are collectively described as a characteristic of "radio transmission within a device or between devices." In the "radio transmission within a device or between devices," it is unnecessary to always check a situation of a propagation path, and a prescribed set value may be used, unlike outdoor radio communication. That is, the "radio transmission within a device or between devices" may be considered to be radio signal transmission in a static environment, and a communication environment characteristic may be considered to be substantially invariant. This means that since the "communication environment is invariant (fixed), parameter setting may be invariant (fixed)." Accordingly, for example, a parameter indicating a communication environment characteristic may be determined in product shipment and stored in a memory, and an operation setting for the signal processing unit may be performed based on this parameter in operation. There is an adjustment mechanism for performing operation based on the set value, but a mechanism (control mechanism) for always monitoring a communication environment characteristic and maintaining the set value in an optimal state based on the monitoring result is unnecessary, such that a circuit scale can be reduced and power consumption can also be reduced.

In addition, the following advantages are obtained with the radio communication in the millimeter wave band with a short wavelength.

a) Since millimeter wave communication uses a broad communication band, it is simple to increase a data rate.

b) A frequency used for transmission can be separated from another frequency for baseband signal processing, and it is difficult for interference to occur between the millimeter wave and a baseband signal frequency.

c) Since the millimeter wave band has a short wavelength, an antenna or waveguide structure determined according to the wavelength can be small. Further, since distance attenuation is great and diffraction is small, it is easy to perform electromagnetic shielding.

d) In normal outdoor radio communication, there are strict regulations about carrier stability in order to prevent, for example, interference. In order to realize such a high-stability carrier, external frequency reference parts, a multiplication circuit, a PLL (phase locked loop circuit), or the like with high stability is used, which increases a circuit scale. However, the millimeter wave (particularly, with signal transmission between fixed positions or in a known positional relationship) can be easily shielded and not leaked to the outside. It is advisable to use an injection locking scheme (which will be described in detail) to demodulate a signal transmitted with a carrier in a small circuit at a receiving side in order to loosen the stability.

For example, as a scheme for realizing high speed signal transmission between electronic devices arranged at a relatively short distance (e.g., within 10 or more cm) or in an electronic device, for example, LVDS (Low Voltage Differential Signaling) is known. However, with large capacity and high speed of recent new transmission data, increase in power consumption, increase in influence of signal distortion due to, for example, reflection, increase in unnecessary radiation (so-called EMI issue), and the like become problems. For example, when a signal such as an image signal (including a capture signal) or a computer image is transmitted at high speed (in real time) within a device or between devices, LVDS reaches its limit.

To cope with high-speed data transmission, a transmission speed for each signal line may be reduced through signal parallelization based on an increased number of lines. However, in this, the number of I/O terminals increases. As a result, a printed board or a cable line becomes complex or a size of a semiconductor chip increases. Further, high speed and large capacity data is along the line, such that so-called EMI becomes a problem.

Problems associated with LVDS or the scheme of increasing the number of lines are caused by signal transmission using the electrical line. As a scheme for resolving the problems caused by signal transmission using the electrical line, a transmission scheme without an electrical line may be employed. As the transmission scheme without an electrical line, for example, signal transmission in a housing is wirelessly performed and a UWB (Ultra Wide Band) communication scheme may be applied (described as a first scheme), or a carrier frequency of a millimeter wave band with a short wavelength (1 to 10 mm) may be used (described as a second scheme). However, in the UWB communication scheme of the first scheme, there are problems in that a carrier frequency is low, the UWB communication scheme is not suitable for high-speed communication such as image signal transmission, and an antenna is large. Further, since a frequency used for transmission is close to another frequency for baseband signal processing, it is easy for interference to occur between the radio signal and the baseband signal. Further, when the carrier frequency is low, it is easy to receive influence of a driving system noise within a device, and a solution becomes necessary. On the other hand, when a carrier frequency of a millimeter wave band with a shorter wavelength is used as in the second scheme, the antenna size or interference problem can be resolved.

While the case in which the communication in the millimeter wave band is performed is described herein, an application range is not limited to the millimeter wave band communication. Communication in a frequency band below the millimeter wave band or, reversely, in a frequency band above the millimeter wave band may be applied. For example, a microwave band, or a sub-millimeter wave band with a shorter wavelength (0.1 to 1 mm) than a millimeter wave band may be applied. However, in in-housing signal transmission or inter-device signal transmission, it is effective to use a millimeter wave band with a wavelength that is not too long or too short.

Hereinafter, a wireless transmission device or an electronic device of the present embodiment will be described in detail. Further, an example in which a number of functional units are formed in a semiconductor integrated circuit (chip) will be described as the most preferred example, but this is not essential.

<Communication Processing System: Basic Configuration 1>

Figure 2:
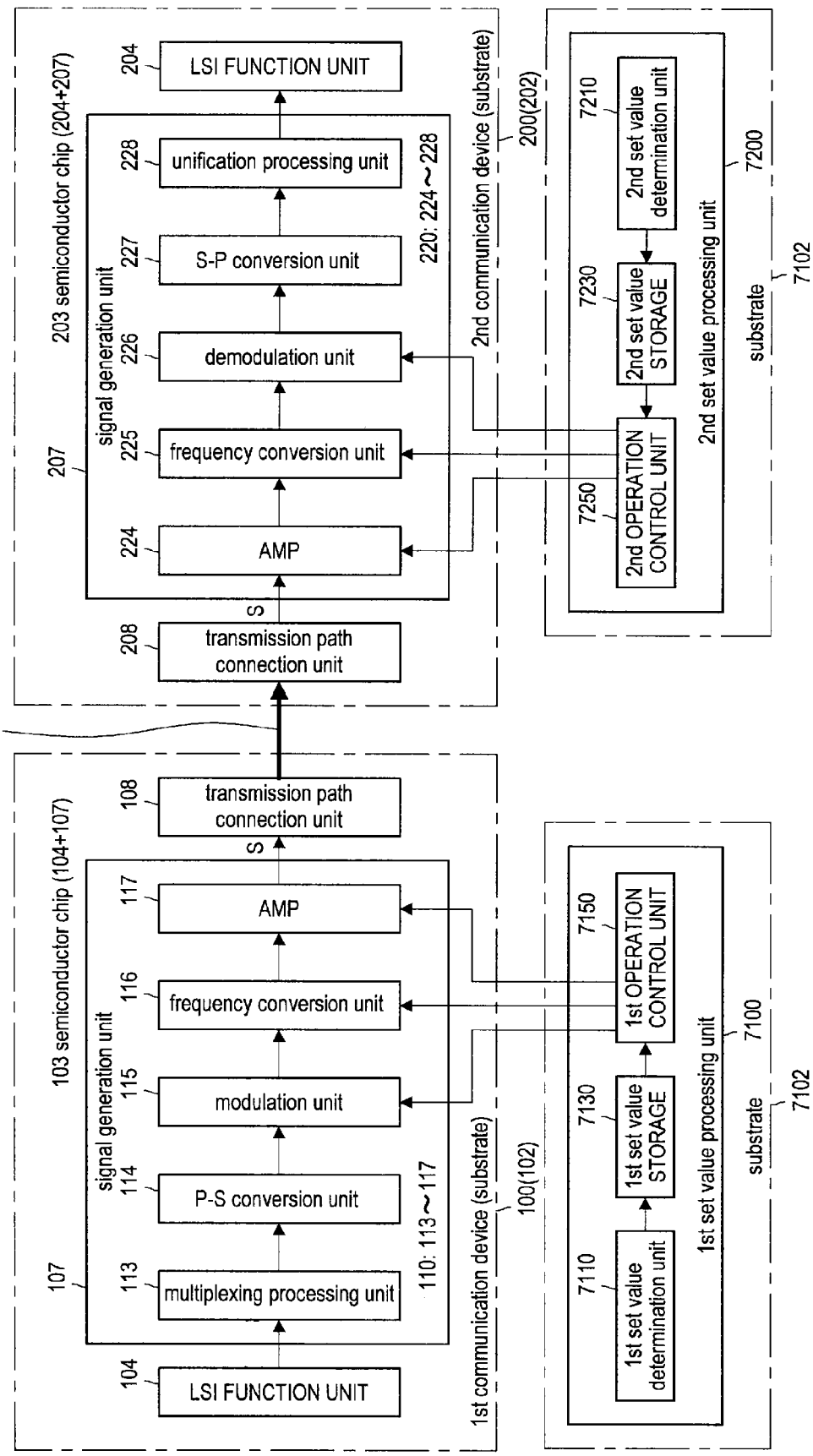
FIG. 2 is a diagram showing a first basic configuration (a second example) of the wireless transmission device of the present embodiment.

FIGS. 1 and 2 show a first basic configuration (basic configuration 1) illustrating a signal interface of a wireless transmission device (signal transmission device) of the present embodiment in terms of a functional configuration.

(Functional Configuration)

As shown in FIGS. 1 and 2, a signal transmission device 1 is configured so that a first communication device 100 that is one example of a first wireless device and a second communication device 200 that is one example of a second wireless device are connected via a millimeter wave signal transmission path 9 to perform signal transmission in a millimeter wave band. In FIG. 1, a transmission system is provided in the first communication device 100 and a receiving system is provided in the second communication device 200.

A semiconductor chip 103 corresponding to millimeter wave band transmission is provided in the first communication device 100, and a semiconductor chip 203 corresponding to millimeter wave band reception is provided in the second communication device 200.

In the present embodiment, signals that are targets of communication in a millimeter wave band are only signals requiring high speed or large capacity, and other signals that are sufficient with low speed and small capacity or may be regarded as DC such as power are not targets of conversion into a millimeter wave signal. For the signals (including power) that are not targets of conversion into a millimeter wave signal, a signal connection between substrates is used in a scheme of a related art. Electrical signals that are original transmission targets before being converted into the millimeter wave are collectively referred to as a baseband signal.

[First Communication Device]

The first communication device 100 includes a semiconductor chip 103 and a transmission path connection unit 108 corresponding to millimeter wave band transmission, which are mounted on a substrate 102. The semiconductor chip 103 is an LSI (Large Scale Integrated Circuit) in which an LSI function unit 104 and a signal generation unit 107 (millimeter wave signal generation unit) are integral.

The semiconductor chip 103 is connected with the transmission path connection unit 108. The transmission path connection unit 108 is one example of a transmission unit. For example, an antenna structure including an antenna connection unit, an antenna terminal, a microstrip line, an antenna, or the like is applied.

The LSI function unit 104 serves to perform primary application control of the first communication device 100. For example, a circuit for processing various signals desired to be transmitted to the other party is included.

The signal generation unit 107 (electrical signal conversion unit) includes a transmission-side signal generation unit 110 for converting a signal from the LSI function unit 104 into a millimeter wave signal and performing signal transmission control via the millimeter wave signal transmission path 9. The transmission-side signal generation unit 110 and the transmission path connection unit 108 constitute a transmission system (transmission unit: a communication unit at a transmission side).

The transmission-side signal generation unit 110 includes a multiplexing processing unit 113, a parallel-serial conversion unit 114, a modulation unit 115, a frequency conversion unit 116, and an amplification unit 117 to process an input signal and generate a millimeter wave signal. The amplification unit 117 is one example of an amplitude adjustment unit for adjusting a size of the input signal and outputting the resultant signal. Further, the modulation unit 115 and the frequency conversion unit 116 may be unified as a unit using a so-called direct conversion scheme.

When signals from the LSI function unit 104 include multiple (N1) types of signals, which are targets of communication in a millimeter wave band, the multiplexing processing unit 113 performs a multiplexing process such as time division multiplexing, frequency division multiplexing, or code division multiplexing, to unify multiple types of signals into one system of signal. For example, multiple types of signals requiring high speed or large capacity are targets of transmission in a millimeter wave and unified into one system of signal.

The parallel-serial conversion unit 114 converts a parallel signal into a serial data signal and supplies the serial data signal to the modulation unit 115. The modulation unit 115 modulates a transmission target signal and supplies the resultant signal to the frequency conversion unit 116. When the present embodiment is not applied, the parallel-serial conversion unit 114 may be included for a parallel interface specification using a plurality of signals for parallel transmission, but is unnecessary for a serial interface specification.

The modulation unit 115 may basically be a modulation unit for modulating at least one of amplitude, frequency and phase with a transmission target signal. Any combination of them may be used. For example, analog modulation schemes include, for example, amplitude modulation (AM) and vector modulation. The vector modulation includes frequency modulation (FM) and phase modulation (PM). Digital modulation schemes include, for example, amplitude shift keying (ASK), frequency shift keying (FSK), phase shift keying (PSK), and amplitude and phase shift keying (APSK) for modulating amplitude and phase. One representative of APSK is quadrature amplitude modulation (QAM). In the present embodiment, in particular, a scheme that allows a lock detection scheme to be employed at a receiving side may be used.

The frequency conversion unit 116 frequency-converts the transmission target signal modulated by the modulation unit 115 to generate an electrical signal of a millimeter wave, and supplies the electrical signal to the amplification unit 117. The electrical signal of a millimeter wave refers to an electrical signal at a frequency in a range of about 30 GHz to 300 GHz. "About" implies frequencies that can obtain effects of the millimeter wave communication. A lower limit of the range is not limited to 30 GHz and an upper limit is not limited to 300 GHz.

Various circuit configurations may be employed for the frequency conversion unit 116. For example, a configuration including a frequency mixing circuit (mixer circuit) and a local oscillation circuit may be employed. The local oscillation circuit generates a carrier used for modulation (a carrier signal or a reference carrier). The frequency mixing circuit multiplies (modulates) a signal from the parallel-serial conversion unit 114 by a carrier in a millimeter wave band generated by the local oscillation circuit to generate a transmission signal in a millimeter wave band, and supplies the transmission signal to the amplification unit 117.

The amplification unit 117 amplifies the frequency-converted electrical signal of a millimeter wave and supplies the resultant signal to the transmission path connection unit 108. The amplification unit 117 is connected to the bidirectional transmission path connection unit 108 via an antenna terminal that is not shown.

The transmission path connection unit 108 transmits the millimeter wave signal generated by the transmission-side signal generation unit 110 to the millimeter wave signal transmission path 9. The transmission path connection unit 108 includes an antenna connection unit. The antenna connection unit is one example of the transmission path connection unit 108 (signal connection unit) or constitutes a part thereof. The antenna connection unit, in a narrow sense, refers to a part for connecting an electronic circuit within the semiconductor chip with an antenna arranged inside or outside the chip and, in a broad sense, refers to a part for signal-connecting the semiconductor chip with the millimeter wave signal transmission path 9. For example, the antenna connection unit includes at least an antenna structure. The antenna structure refers to a structure in a connection unit with the millimeter wave signal transmission path 9. The antenna structure may be a structure for connecting the electrical signal in a millimeter wave band to the millimeter wave signal transmission path 9, and does not refer to only an antenna.

The millimeter wave signal transmission path 9, which is a millimeter wave propagation path, is a free space transmission path. For example, the millimeter wave signal transmission path 9 may have a configuration in which a signal is propagated through a space inside a housing. Preferably, the millimeter wave signal transmission path 9 may have a waveguide structure such as a waveguide, a transmission line, a dielectric line, or an in-dielectric body, which confines an electromagnetic wave in a millimeter wave band in the transmission path, and may have an efficient transmission characteristic. For example, the millimeter wave signal transmission path 9 may be a dielectric body transmission path 9A including a dielectric material having a certain range of relative permittivity and a certain range of dielectric tangent. For example, the entire housing is filled with a dielectric material, such that the dielectric body transmission path 9A rather than a free space transmission path is arranged between the transmission path connection unit 108 and the transmission path connection unit 208. Alternatively, the dielectric body transmission path 9A may be configured by connecting an antenna of the transmission path connection unit 108 to an antenna of the transmission path connection unit 208 using a dielectric line that is a linear member including a dielectric material and having line diameter. Further, the millimeter wave signal transmission path 9 having a configuration that confines a millimeter wave signal in the transmission path may be a hollow waveguide in which a transmission path is surrounded with a shield and the inside of the transmission path is hollow, as well as the dielectric body transmission path 9A.

In addition, the first communication device 100 of the present embodiment includes a first set value processing unit 7100 on the substrate 102, which includes a first set value determination unit 7110, a first set value storage unit 7130, and a first operation control unit 7150. The first set value determination unit 7110 determines set values (variables and parameters) for designating operation of each functional unit of the semiconductor chip 103 (in other words, an entire operation of the first communication device 100). A set value determination process is performed, for example, in product shipment at a factory. The first set value storage unit 7130 stores the set values determined by the first set value determination unit 7110. The first operation control unit 7150 operates the functional units of the semiconductor chip 103 (in this example, the modulation unit 115, the frequency conversion unit 116, the amplification unit 117, and the like) based on the set values read from the first set value storage unit 7130.

In the example shown in FIG. 1, the first set value processing unit 7100 is included on the substrate 102. However, as in an example shown in FIG. 2, the first set value processing unit 7100 may be mounted on a substrate 7102 other than the substrate 102 on which the semiconductor chip 103 is mounted. In addition, in the example shown in FIG. 1, the first set value processing unit 7100 is included outside the semiconductor chip 103, but the first set value processing unit 7100 may be included inside the semiconductor chip 103. In this case, the first set value processing unit 7100 is mounted on the same substrate 102 as the substrate 102 on which the respective functional unit (the modulation unit 115, the frequency conversion unit 116, the amplification unit 117, and the like), which are control targets, are mounted (not shown).

[Second Communication Device]

The second communication device 200 includes a semiconductor chip 203 and a transmission path connection unit 208 corresponding to millimeter wave band reception, which are mounted on the substrate 202. The semiconductor chip 203 is an LSI in which an LSI function unit 204 and a signal generation unit 207 (millimeter wave signal generation unit) are integral. Although not shown, the semiconductor chip 203 may have a configuration in which the LSI function unit 204 and the signal generation unit 207 are not integral, similar to the first communication device 100.

The semiconductor chip 203 is connected with a transmission path connection unit 208 that is the same as the transmission path connection unit 108. The transmission path connection unit 208 is one example of a reception unit. The same unit as the transmission path connection unit 108 is employed to receive the millimeter wave signal from the millimeter wave signal transmission path 9 and output the millimeter wave signal to the receiving-side signal generation unit 220.

The signal generation unit 207 (electrical signal conversion unit) includes the receiving-side signal generation unit 220 for performing signal reception control via the millimeter wave signal transmission path 9. The receiving-side signal generation unit 220 and the transmission path connection unit 208 constitute a receiving system (reception unit: communication unit at the receiving side).

The receiving-side signal generation unit 220 includes an amplification unit 224, a frequency conversion unit 225, a demodulation unit 226, a serial-parallel conversion unit 227, and a unification processing unit 228 in order to signal-process an electrical signal of a millimeter wave received by the transmission path connection unit 208 and generate an output signal. The amplification unit 224 is one example of an amplitude adjustment unit for adjusting a size of the input signal and outputting the resultant signal. The frequency conversion unit 225 and the demodulation unit 226 may be unified as a unit using a so-called direct conversion scheme.

The receiving-side signal generation unit 220 is connected to the transmission path connection unit 208. The amplification unit 224 at the receiving side is connected to the transmission path connection unit 208. The amplification unit 224 amplifies an electrical signal of a millimeter wave received by the antenna and supplies the resultant signal to the frequency conversion unit 225. The frequency conversion unit 225 frequency-converts the amplified electrical signal of a millimeter wave and supplies the frequency-converted signal to the demodulation unit 226. The demodulation unit 226 demodulates the frequency-converted signal, acquires a baseband signal, and supplies the baseband signal to the serial-parallel conversion unit 227.

The serial-parallel conversion unit 227 converts serial reception data into parallel output data and supplies the parallel output data to the unification processing unit 228. The serial-parallel conversion unit 227 is included for a parallel interface specification using a plurality of signals for parallel transmission when the present embodiment is not applied, similar to the parallel-serial conversion unit 114. When original signal transmission between the first communication device 100 and the second communication device 200 is of a serial format, the parallel-serial conversion unit 114 and the serial-parallel conversion unit 227 may not be provided.

When the original signal transmission between the first communication device 100 and the second communication device 200 is of a parallel format, an input signal is subjected to parallel-serial conversion and transmitted to the semiconductor chip 203 or a reception signal from the semiconductor chip 203 is subjected to serial-parallel conversion, thus decreasing the number of signals that are millimeter wave conversion targets.

Since the unification processing unit 228 corresponds to the multiplexing processing unit 113, a signal unified into one system is separated into multiple types of signals_@ (@ is 1 to N). For example, a plurality of data signals unified into one system of signal are separately separated and supplied to the LSI function unit 204.

The LSI function unit 204 serves to perform primary application control of the second communication device 200. For example, a circuit for processing various signals received from the other party is contained.

In addition, the second communication device 200 of the present embodiment includes a second set value processing unit 7200 including a second set value determination unit 7210, a second set value storage unit 7230, and a second operation control unit 7250, which is provided on the substrate 202. The second set value determination unit 7210 determines set values (variables and parameters) for designating operation of the respective functional units of the semiconductor chip 203 (in other words, an entire operation of the second communication device 200). A set value determination process is performed, for example, in product shipment at a factory. The second set value storage unit 7230 stores the set values determined by the second set value determination unit 7210. The second operation control unit 7250 operates the respective functional units (in this example, the amplification unit 224, the frequency conversion unit 225, the demodulation unit 226, and the like) of the semiconductor chip 203 based on the set values read from the second set value storage unit 7230.

In the first example shown in FIG. 1, the second set value processing unit 7200 is included on the substrate 202, but the second set value processing unit 7200 may be mounted on a substrate 7202 other than the substrate 202 on which the semiconductor chip 203 is mounted, as in the second example shown in FIG. 2. In addition, while in the example shown in FIG. 1, the second set value processing unit 7200 is included outside the semiconductor chip 203, the second set value processing unit 7200 may be included inside the semiconductor chip 203. In this case, the second set value processing unit 7200 is mounted on the same substrate 202 as the substrate 202 on which the respective functional units (the amplification unit 224, the frequency conversion unit 225, and the demodulation unit 226), which are control targets, are mounted (a figure is omitted).

[Bidirectional Communication]

The signal generation unit 107 and the transmission path connection unit 108 or the signal generation unit 207 and the transmission path connection unit 208 have a configuration with data bidirectionality, for bidirectional communication. For example, a signal generation unit at a receiving side and a signal generation unit at a transmission side are provided in the signal generation unit 107 and the signal generation unit 207, respectively. While the transmission path connection unit 108 or the transmission path connection unit 208 may be separately provided in the transmission side and the receiving side, a transmission path connection unit for both transmission and reception may be used.

Further, in "bidirectional communication" shown herein, the millimeter wave signal transmission path 9, which is a millimeter wave transmission channel, is for one system (one core) of one-core bidirectional transmission. For realization of this, a half duplex scheme with time division duplex (TDD), frequency division duplex (FDD) or the like is applied.

[Connection and Operation]

The scheme for frequency-converting an input signal and performing signal transmission is generally used for broadcasting or radio communication. In such a use, a relatively complex transmitter or receiver capable of coping with issues such as a communication distance (an S/N issue for thermal noise), how to cope with reflection or multipath, or how to suppress obstruction or interference with other channels is used.

On the other hand, since the signal generation unit 107 and the signal generation unit 207 used in the present embodiment are used in a millimeter wave band of a higher frequency band in comparison with a used frequency of a complex transmitter or receiver generally used for broadcasting or radio communication, and a wavelength $\lambda$ is short, a signal generation unit and a signal generation unit in which it is easy to reuse a frequency and that are suitable for communication between a number of adjacent devices are used.

In the present embodiment, the signal transmission in a millimeter wave band is performed as described above, to flexibly cope with high speed and large capacity, unlike a signal interface using a conventional electrical line. For example, only signals requiring high speed or large capacity are targets of communication in a millimeter wave band. In some device configurations, the first communication device 100 and the second communication device 200 partially include an existing electrical line-based interface (connections using terminals and connectors) for low speed and small capacity signals or for power supply.

The signal generation unit 107 is one example of a signal processing unit for performing prescribed signal processing based on the set values. In this example, the signal generation unit 107 signal-processes an input signal input from the LSI function unit 104 to generate a millimeter wave signal. The signal generation unit 107 is connected to the transmission path connection unit 108, for example, via a transmission line such as a microstrip line, a strip line, a coplanar line, or a slot line, and the generated millimeter wave signal is supplied to the millimeter wave signal transmission path 9 via the transmission path connection unit 108.

The transmission path connection unit 108 has an antenna structure and has a function of converting a transmitted millimeter wave signal to an electromagnetic wave and transmitting the electromagnetic wave. The transmission path connection unit 108 is connected with the millimeter wave signal transmission path 9, and the electromagnetic wave converted by the transmission path connection unit 108 is supplied to one end of the millimeter wave signal transmission path 9. The transmission path connection unit 208 of the second communication device 200 is connected to the other end of the millimeter wave signal transmission path 9. As the millimeter wave signal transmission path 9 is provided between the transmission path connection unit 108 of the first communication device 100 and the transmission path connection unit 208 of the second communication device 200, the electromagnetic wave in the millimeter wave band is propagated in the millimeter wave signal transmission path 9.

The transmission path connection unit 208 of the second communication device 200 is connected to the millimeter wave signal transmission path 9. The transmission path connection unit 208 receives the electromagnetic wave transmitted from the other end of the millimeter wave signal transmission path 9, converts the electromagnetic wave into a millimeter wave signal, and supplies the millimeter wave signal to the signal generation unit 207 (baseband signal generation unit). The signal generation unit 207 is one example of a signal processing unit that performs prescribed signal processing based on the set values. In this example, the signal generation unit 207 signal-processes the converted millimeter wave signal to generate an output signal (baseband signal) and supplies the output signal to the LSI function unit 204.

While the signal transmission from the first communication device 100 to the second communication device 200 has been described herein, both the first communication device 100 and the second communication device 200 have a configuration capable of bidirectional communication such that the millimeter wave signal can be transmitted bidirectionallly, including a case in which a signal from the LSI function unit 204 of the second communication device 200 is transmitted to the first communication device 100.

<Communication Processing System: Basic Configuration 2>

Figure 3:
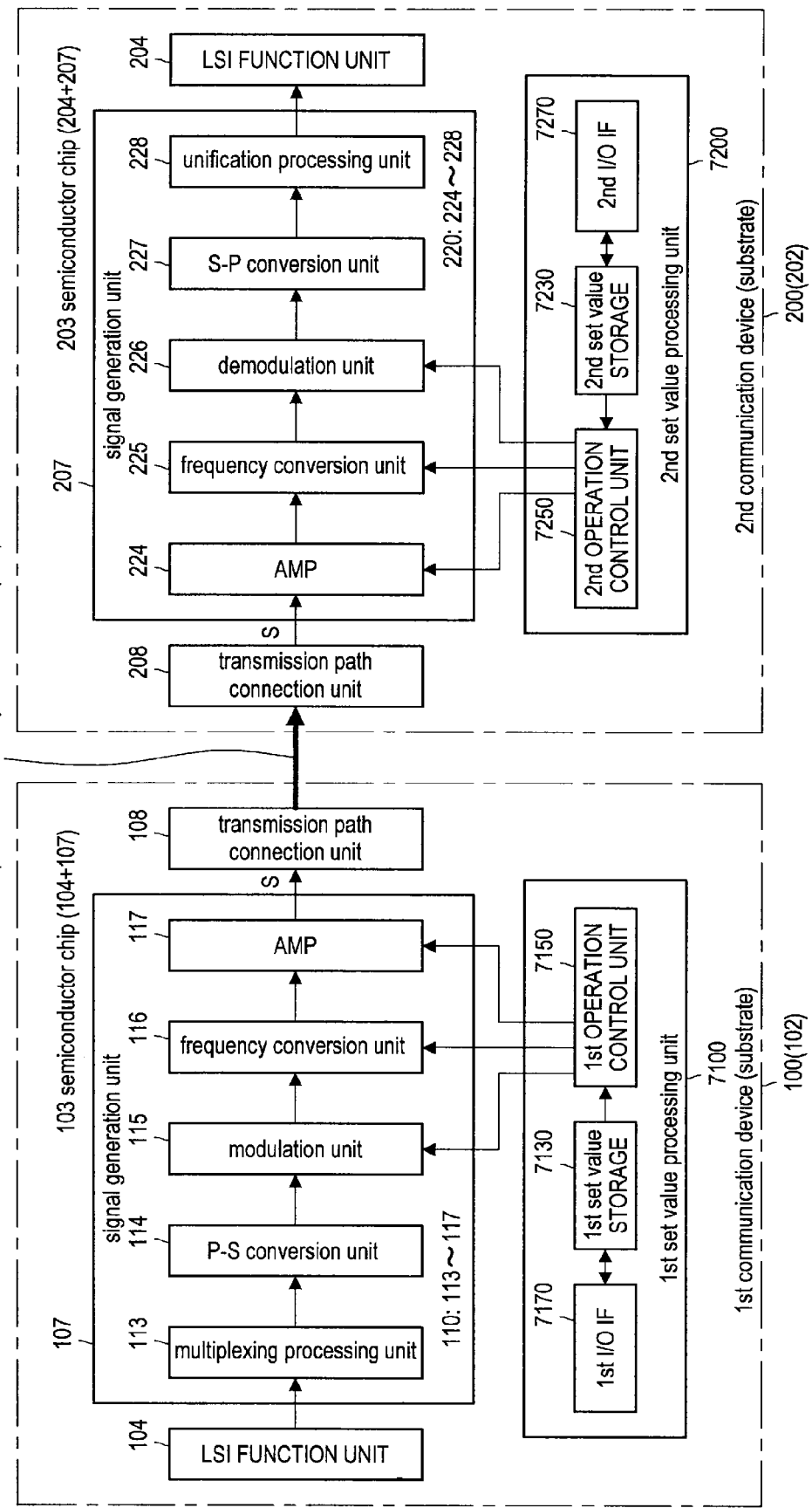
FIG. 3 is a diagram showing a second basic configuration (a first example) of the wireless transmission device of the present embodiment.
Figure 4:
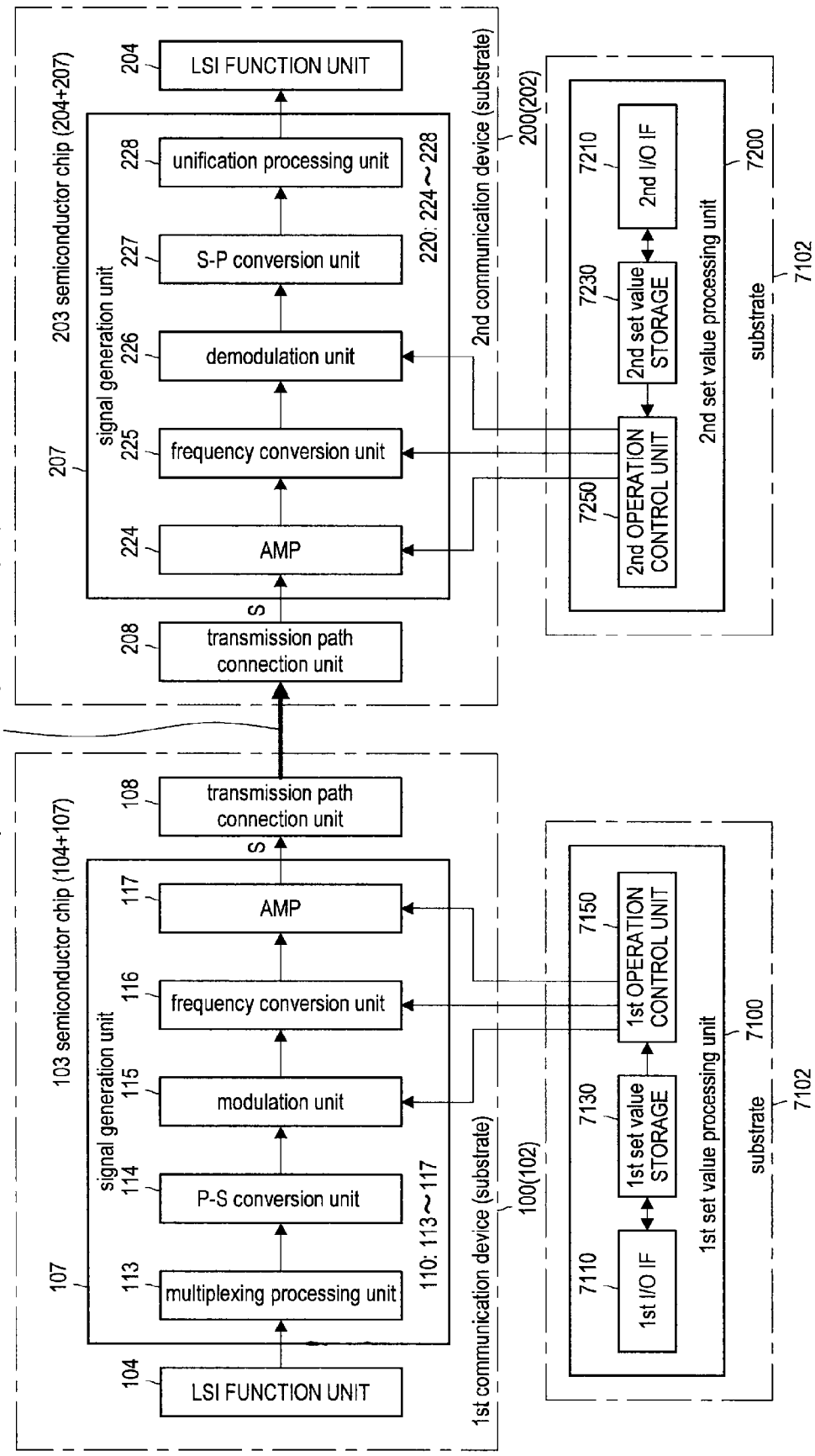
FIG. 4 is a diagram showing a second basic configuration (a second example) of a wireless transmission device of the present embodiment.

FIGS. 3 and 4 show a second basic configuration (basic configuration 2) in which a signal interface of a wireless transmission device (signal transmission device) of the present embodiment is illustrated in terms of functions and configurations. The first example shown in FIG. 3 is a variant of FIG. 1, and the second example shown in FIG. 4 is a variant of FIG. 2.

The second basic configuration is characterized in that set values determined outside the device are stored. Hereinafter, differences between the second basic configuration and the first basic configuration will be described. The second basic configuration includes a first I/O interface unit 7170 in place of the first set value determination unit 7110, and includes a second I/O interface unit 7270 in place of the second set value determination unit 7210. Each of the first I/O interface unit 7170 and the second I/O interface unit 7270 is one example of a set value receiving unit for receiving set values from the outside.

The first I/O interface unit 7170 has an interface function with the first set value storage unit 7130, stores set values given from the outside in the first set value storage unit 7130, and reads the set values stored in the first set value storage unit 7130 to output the set values to the outside. The second I/O interface unit 7270 has an interface function with the second set value storage unit 7230, stores set values given from the outside in the second set value storage unit 7230, and reads the set values stored in the second set value storage unit 7230 to output the set values to the outside.

In the case of the second basic configuration, the set values are not determined in the first set value processing unit 7100 or the second set value processing unit 7200, but in the outside. For example, the set values may be determined from design parameters and an actual state or the set value may be determined based on a production test of device. In addition, in either case, individual set values are not determined for each device, but set values common to devices may be determined. The case in which the set values are determined from the design parameters substantially corresponds to this case. The case in which the set values are determined based on a production test in a standard device also corresponds to such a case.

Next, a concrete example of fixing of parameter setting, which is a characteristic of the present embodiment, will be described. Further, the present invention will be described using embodiments, but a technical range of the present invention is not limited to described scopes of the embodiments that will be described later. Various variations or improvements may be made to embodiments, which will be described later, without departing from the scope and spirit of the invention, and such variations or improvements are included in a technical range of the present invention. In addition, the embodiments that will be described later are not limited to inventions according to claims, and not all combinations of features described in the embodiments are essential to the solution of the invention. An invention of various steps is included in the embodiments that will be described later and various inventions can be extracted by an appropriate combination of a plurality of disclosed configuration requirements. Respective embodiments that will be described later are not limited to being solely applied, and any combination of the embodiments may be applied in an allowable range. As long as effects can be obtained even when some of all the configuration requirements shown in the embodiment are deleted, a configuration in which the some configuration requirements have been deleted can be extracted as an invention.

Embodiment 1

FIG. 5 is a diagram illustrating embodiment 1. In particular, a first example of a modulation function unit and a demodulation function unit will be described herein.

Modulation Function Unit

First Example

In FIG. 5(A), a configuration of a modulation function unit 8300A of a first example provided in the transmission side is shown. A transmission target signal (baseband signal: for example, a 12-bit image signal) is converted into a high-speed serial data sequence by a parallel-serial conversion unit 8114 (P-S: corresponding to the parallel-serial conversion unit 114) and supplied to the modulation function unit 8300A. The modulation function unit 8300A receives the signal from the parallel-serial conversion unit 8114 as a modulation signal and modulates the modulation signal into a modulated millimeter wave band signal according to a prescribed modulation scheme.

The modulation function unit 8300A may employ various circuit configurations according to modulation schemes. For example, when the modulation scheme is an amplitude modulation scheme, a configuration including a 2-input type frequency mixing unit 8302 (a mixer circuit or a multiplier) and a transmission-side local oscillation unit 8304 may be employed.

The transmission-side local oscillation unit 8304 (a first carrier signal generation unit) generates a carrier signal (modulation carrier signal) used for modulation. The frequency mixing unit 8302 (a first frequency conversion unit) multiplies (modulates) the signal from the parallel-serial conversion unit 8114 by a carrier in a millimeter wave band generated by the transmission-side local oscillation unit 8304 to generate a transmission signal in a millimeter wave band (modulated signal), and supplies the transmission signal in a millimeter wave band to the amplification unit 8117 (corresponding to the amplification unit 117). The transmission signal is amplified by the amplification unit 8117 and radiated from the antenna 8136.

Demodulation Function Unit

First Example

In FIG. 5(B), a configuration of a demodulation function unit 8400A of the first example provided in the receiving side is shown. The demodulation function unit 8400A may employ various circuit configurations in a range according to the modulation scheme of the transmission side. A case of the amplitude modulation scheme will be described herein to correspond to the above description of the modulation function unit 8300A.

The demodulation function unit 8400A of the first example includes a 2-input type frequency mixing unit 8402 (referred to as frequency conversion unit, mixer circuit, or multiplier) and a carrier recovery unit 8403, and performs demodulation using a so-called lock detection scheme. In the lock detection scheme, the carrier contained in the reception signal is recovered by the carrier recovery unit 8403 separate from the frequency mixing unit 8402, and demodulation is performed using the recovered carrier. Although not shown, envelope detection or squared detection may be applied instead of the lock detection scheme.

As the carrier recovery unit 8403, various configurations may be employed. Any of a scheme for generating a line spectrum coincident with the carrier frequency and inputting the line spectrum to a resonance circuit or a phase locked loop (PLL) circuit to generate a carrier, a frequency multiplication-based scheme, and an inverse modulation-based scheme is employed herein.

The carrier recovery unit 8403 extracts a carrier signal for demodulation (referred to as demodulation carrier signal: recovered carrier signal) having completely the same frequency and phase as the carrier at the transmission side, that is, frequency locked and phase locked, and supplies the carrier signal to the frequency mixing unit 8402. The frequency mixing unit 8402 multiplies the recovered carrier with the reception signal. A modulation signal component (baseband signal) that is a transmission target signal component and a harmonic component (and a DC component in some cases) are contained in the multiplication output.

In the shown example, a filtering processing unit 8410, a clock recovery unit 8420 (CDR: clock data recovery), and a serial-parallel conversion unit 8227 (S-P: corresponding to serial-parallel conversion unit 227) are provided in a subsequent stage of the frequency mixing unit 8402. For example, a low pass filter (LPF) is provided in the filtering processing unit 8410 to remove the harmonic component contained in the multiplication output.

A millimeter wave reception signal received by the antenna 8236 is input to a variable gain type and low noise type amplification unit 8224 (corresponding to the amplification unit 224: LNA), which adjusts amplitude of the millimeter wave reception signal, and supplied to the demodulation function unit 8400A. The amplitude-adjusted reception signal is input to the frequency mixing unit 8402 and the carrier recovery unit 8403, and a multiplication signal is generated by the frequency mixing unit 8402 through lock detection as described above and supplied to the filtering processing unit 8410. A high frequency component of the multiplication signal generated by the frequency mixing unit 8402 is removed by the low pass filter of the filtering processing unit 8410 and a waveform (baseband signal) of the input signal transmitted from the transmission side is generated and supplied to the clock recovery unit 8420.

The clock recovery unit (CDR) 8420 recovers a sampling clock based on this baseband signal, and samples the baseband signal with the recovered sampling clock to generate a reception data sequence. The generated reception data sequence is supplied to the serial/parallel conversion unit (S-P) 8227 and a parallel signal (e.g., 12-bit image signal) is reproduced. There are a variety of clock recovery schemes, but a symbol locking scheme is employed as an example.

[Problem]

Here, when the modulation function unit 8300A and the demodulation function unit 8400A of the first example constitute a wireless transmission device, there are the following drawbacks. First, there are the following drawbacks associated with an oscillation circuit. For example, in outdoor communication, it is necessary to consider a multi-channel. In this case, since influence of a frequency change component of the carrier is received, a requirement for stability of the carrier at the transmission side is strict. In in-housing signal transmission or inter-device signal transmission, when data is transmitted in an millimeter wave and a normal scheme as used in outdoor radio communication is used in the transmission side and the receiving side, the stability of the carrier is required, and a high-stability millimeter wave oscillation circuit with frequency stability on the order of ppm (parts per million) is necessary.

In order to realize a carrier signal with high frequency stability, for example, a scheme for forming a high-stability millimeter wave oscillation circuit on a silicon integrated circuit (CMOS: Complementary Metal-oxide Semiconductor) may be employed. In the case of a typical LC oscillation circuit used in a normal CMOS process, a silicon substrate has low insulation and a thinner wiring constituting an inductor than discrete parts. Accordingly, a high Q value (Quality Factor) tank circuit is not easily formed and is difficult to realize. For example, when an inductor is formed on a CMOS chip, the Q value is on the order of 30 to 40.

Accordingly, in order to realize a high-stability oscillation circuit, for example, a scheme for providing a tank circuit with a high Q value using, for example, a crystal oscillator in the outside of the CMOS in which a main body part of the oscillation circuit is formed, oscillating at a low frequency, and multiplying an oscillation output to raise the oscillation output to a millimeter wave band may be employed. However, it is not desirable to provide such an external tank in all chips in order to realize a function of replacing signal transmission using wirings, such as LVDS (Low Voltage Differential Signaling), with signal transmission using a millimeter wave.

As another scheme for realizing a carrier signal with high frequency stability, a scheme of using, for example, a high-stability frequency multiplication circuit or PLL circuit may be employed, but a circuit scale increases. A scheme for resolving this problem will be described, for example, in embodiment 7 that will be described later.

Operation and Effects of Embodiment 1

In embodiment 1, as shown in FIG. 5(A), a first set value processing unit 7100A for controlling a level of the transmission signal output from the amplification unit 8117 is provided in the transmission side. The first set value processing unit 7100A includes, as a first operation control unit 7150, an output level DAC 7152 for setting the output level of the amplification unit 8117. While the first set value processing unit 7100A having the second basic configuration is employed, the first set value determination unit 7110 may be included in place of the first I/O interface unit 7170, as in the first basic configuration. The output level DAC 7152 reads the set value stored in the first set value storage unit 7130 and controls the amplification unit 8117 based on the set value, so that the transmission output level is an appropriate value. Power consumption of the amplification unit 8117 is great when the transmission output level is high, but the transmission output level decreases so that the reception level is not a level that is too high or low, i.e., is a best level, thus realizing low power consumption.

That is, a mechanism for managing transmission power is provided, but a purpose of the mechanism is to prevent the transmission power from being at a level that is too high or too low or an SNR (signal noise ratio, signal-to-noise ratio or S/N) from being at a level that is too low. As the transmission output level is appropriately managed based on a transmission characteristic (communication environment characteristic) such as a transmission distance due to an arrangement of the transmitter and a receiver or a transmission path state, the reception level is a minimum necessary level and low power consumption communication (preferably, communication with less unnecessary radiation) is realized.

As a mechanism for managing transmission power, various schemes may be employed from the viewpoint of fixed setting (so-called preset setting), automatic control, or a judgment of a set level, but in embodiment 1, at least a fixed setting scheme is employed.

For example, a scheme for preset-setting a transmission output level based on a transmission characteristic between transmission and reception (a communication environment) is employed. In this case, as a preferred aspect, a transmission characteristic index detection unit for detecting a state of a transmission characteristic between a transmission chip that is a transmission device and a reception chip that is a reception device is provided so that a transmission output level of the transmission chip can be preset-set by referencing a transmission characteristic index signal that is a detection result. For example, the first set value determination unit 7110 or the second set value determination unit 7210 functions as the transmission characteristic index detection unit. For example, the transmission characteristic index detection unit is provided in the reception chip (or, the transmission characteristic index detection unit may not be embedded in the reception chip) to detect a state of a received radio signal, and a transmission output level of the transmission chip is preset-set by referencing a state detection signal that is a detection result (a determined set value is stored in the first set value storage unit 7130).

If there is a certain correspondence relationship between a reception level and an SNR, for example, if the SNR decreases when the reception level is too high or low, use of the reception level as a judgment index is equivalent to use of the SNR as the judgment index. In the case of a device configuration in which there is no certain correspondence relationship between the reception level and the SNR, SNR-based level management may be performed, for example, using an error rate as the judgment index instead of the reception level. That is, a detection mechanism (transmission characteristic index detection unit) for detecting a judgment index reflecting an actual transmission characteristic such as the reception level or the SNR is provided in the reception chip and the output level of the transmission side is manually set by referencing a detection result. Alternatively, as shown, an externally determined set value is stored in the first set value storage unit 7130 via the first I/O interface unit 7170.

The scheme of embodiment 1 is not an automatic control scheme using feedback, but the reception level or the SNR of the receiving side is referenced as the judgment index when the reception level is preset-set. Since the reception level or the SNR is changed according to a transmission characteristic such as a transmission distance or a transmission path state that depends on an arrangement of a transmitter and a receiver, the distance between transmission and reception is not directly judged, but the reception level or the SNR to which an actual transmission characteristic is reflected is used as the judgment index to manage the reception level. That is, the transmission chip has a configuration in which a transmission output level is variable. The transmission output level decreases for low power consumption, and the transmission output level is appropriately set by referencing the reception level or the SNR changed according to a transmission characteristic such as a transmission distance or a transmission path state that depends on an arrangement of a transmitter and a receiver such that a reception state is an appropriate state. For example, as the transmission output level decreases when the reception level (i.e., reception intensity) is high and the transmission output level increases when the reception level is low, the transmission output level is set so that the reception level is not a level that is too high or low, i.e., is a best level. The transmission output level is set to a minimum necessary level, thus enabling an output amplifier to be operated with low power consumption and realizing low power consumption communication.

As the output level of the transmitter is set to a minimum necessary level in consideration of a communication environment (a communication range, a transmission path characteristic, or the like), an output of the transmitter can be decreased to a minimum level and used, thus reducing power consumption of the transmission output amplifier. As a transmission output amplifier is operated with low power consumption, low power consumption communication can be realized. As an input level to the receiver is a constant level, resistance to strong input can be alleviated and the power consumption of the receiver can be reduced. Since the transmission output is a minimum necessary level, radiation to the outside of the device is also alleviated. Since such a scheme is not an automatic control scheme using feedback, a scale of a circuit for controlling (setting) the output level is smaller and power consumption is lower than the automatic control.

In embodiment 1, since feedback control is not performed, it may not be said that an appropriate level can be managed according to a change in a communication environment. However, when there is a change in the communication environment, coping may be performed by manually changing the set value.

In addition, in embodiment 1, as shown in FIG. 5(B), a second set value processing unit 7200A for controlling a level of the reception signal output from the amplification unit 8224 is provided in the receiving side. The second set value processing unit 7200A includes, as a second operation control unit 7250, an output level DAC 7252 for setting the output level of the amplification unit 8224. The second set value processing unit 7200A has the second basic configuration, but may include the second set value determination unit 7210 in place of the second I/O interface unit 7270, as in the first basic configuration. The output level DAC 7252 reads the set value stored in the second set value storage unit 7230 and controls the amplification unit 8224 based on the set value so that the output level of the amplification unit 8224 (in other words, an input level of the demodulation function unit 8400) is an appropriate value. By doing so, an appropriate demodulation process can be realized by the demodulation function unit 8400 regardless of the reception level at the antenna 8236.

In a configuration example shown in FIG. 5(C), an amplification unit 8224, a demodulation function unit 8400, and a transmission environment index detection unit 8470 are provided in a reception chip 8002 (reception device). The transmission environment index detection unit 8470 detects a state of a transmission environment between a transmission chip 8001 (transmission device) and the reception chip 8002, and outputs a transmission environment index signal based on a detection result. In particular, in the present example, it is assumed that a reception level is detected. That is, the transmission environment index detection unit 8470 in the present example constitutes a mechanism for detecting a reception level (input level). The transmission environment index detection unit 8470 performs reception level detection to detect an input level, and outputs a level detection signal Vdet that is a detection result output. The input signal of the demodulation function unit 8400 (i.e., a received signal; specifically, an output of the amplification unit 8224) or a baseband signal demodulated by the demodulation function unit 8400 (i.e., an output signal of the demodulation function unit 8400) may be supplied to the transmission environment index detection unit 8470. The transmission environment index detection unit 8470 detects the input level based on the input signal.

An attenuation amount due to the distance between the transmitter and the receiver or the transmission path can be obtained based on the input level of the receiver indicated by the level detection signal Vdet output from the transmission environment index detection unit 8470 and the output level of the transmitter can be set to an optimal value. Feedback control of the transmission output level is performed based on the level detection signal Vdet, but in the case of signal transmission within a device or between devices, once the transmission output level is set to an optimal state, the feedback control does not need to be performed dynamically, adaptively, and frequently, the feedback control may stop, and the set value stored as the optimal value may be used. Unlike the feedback control, a detection mechanism (transmission characteristic index detection unit) for detecting a judgment index in which an actual transmission characteristic is reflected is provided in the reception chip 8002, and a transmission output level of the transmission chip 8001 can be set to an appropriate level (which is not a level that is too low or high, i.e., is a best level) by referencing the level detection signal Vdet that is the detection result. When the attenuation amount is small, the output level can decrease and communication with low power consumption can be performed. That is, low power consumption communication can be performed by the transmission chip 8001 (one example of the transmitter) having the gain-variable amplification unit 8117 and the reception chip 8002 (one example of the receiver) having the transmission environment index detection unit 8470.

For example, although not shown, information detected by the transmission environment index detection unit 8470 may be used in the first set value processing unit 7100A shown in FIG. 5(A). In this case, for example, the detection information (level detection signal Vdet) acquired by the transmission environment index detection unit 8470 is referenced when a manipulating person sets the transmission output level. The manipulating person stores a set value allowing a transmission output level of the transmission chip 8001 to be an appropriate level (which is not a level that is too low or high, i.e., is a best level) in the first set value storage unit 7130 via the first I/O interface unit 7170 based on the detection result output from the transmission environment index detection unit 8470.

The information detected by the transmission environment index detection unit 8470 may be automatically used in the first set value processing unit 7100A shown in FIG. 5(C). In terms of the configuration, a gain control unit 8090 for executing feedback control is included. In the shown example, the gain control unit 8090 is provided outside the transmission chip 8001 and the reception chip 8002. Although not shown, the gain control unit 8090 may be embedded in any one of the transmission chip 8001 and the reception chip 8002. Transmission of the level detection signal Vdet between the transmission characteristic index detection unit 8470 and the gain control unit 8090 and transmission of a signal Gcont between the gain control unit 8090 and the first set value processing unit 7100A may be wireless or wired transmission. For the radio transmission, any of light and an electromagnetic wave may be used, and a frequency band may be the same as or different from a radio signal Sm.

The gain control unit 8090 determines the set value that allows the transmission output level of the transmission chip 8001 to be an appropriate level (which is not a level that is too low or high, i.e., is a best level) based on the level detection signal Vdet output from the transmission characteristic index detection unit 8470. The determined set value is stored in the first set value storage unit 7130 via the first I/O interface unit 7170. For example, when operation starts, the transmission chip 8001 (the amplification unit 8117) starts operation at a maximum output, and the reception chip 8002 (the transmission characteristic index detection unit 8470) detects a reception signal level and supplies the level detection signal Vdet to the gain control unit 8090. The gain control unit 8090 generates a gain control signal Gcont based on the level detection signal Vdet so that the transmission output level is an appropriate level, and controls a gain of the amplification unit 8117 of the transmission chip 8001. To cope with a change in communication environment, feedback control may be performed at certain time intervals in a communication process. It is difficult to cope with the feedback control at certain time intervals, but the determined set value may be stored in the first set value storage unit 7130, and accordingly the gain control unit 8090 does not need to be necessarily mounted to a product. For example, a connection may be made and adjustment may be performed in shipment at a factory, and then the adjustment may be undone.

When embodiment 1 is not applied, the transmitter output is at a high constant level, a signal is detected at the receiving side and gain control is performed in the receiver to obtain a certain baseband signal. However, between transmission and reception in which a communication distance is short, communication at an unnecessarily high level is performed and power consumption is high. Power is unnecessarily consumed. Since the receiver needs to receive a strong input signal, a good linearity circuit is necessary and power consumption of the receiver increases. When the transmission output is great, there is a problem in that the radiation to the outside is great.

On the other hand, according to the scheme in embodiment 1, the transmission output level is managed (set) to be an appropriate level according to a transmission characteristic between transmission and reception, thus resolving such a problem. In addition, in the receiving side, the amplification unit 8224 in a preceding stage of the demodulation function unit 8400 adjusts the output level to be appropriate. Accordingly, even when the transmission output level is too high, the demodulation function unit 8400 can appropriately perform the demodulation process. In particular, since the signal transmission within a device or between devices is signal transmission between fixed positions or in a known positional relationship in which the transmission characteristic such as a distance between transmission and the reception or a transmission path state is specified, it is easy to appropriately design a propagation channel between the transmission and the reception. Thereby, the control of a controller for managing radio transmission (in the present example, the gain control unit) does not need to be performed dynamically, adaptively and frequently, unlike general radio communication. The radio transmission characteristic is calibrated in manufacture or in design and individual variations are recognized such that setting of the transmission output level can be subjected to preset or static control and miniaturization of the overall configuration or low power consumption can be realized.

Embodiment 2

Figure 6:
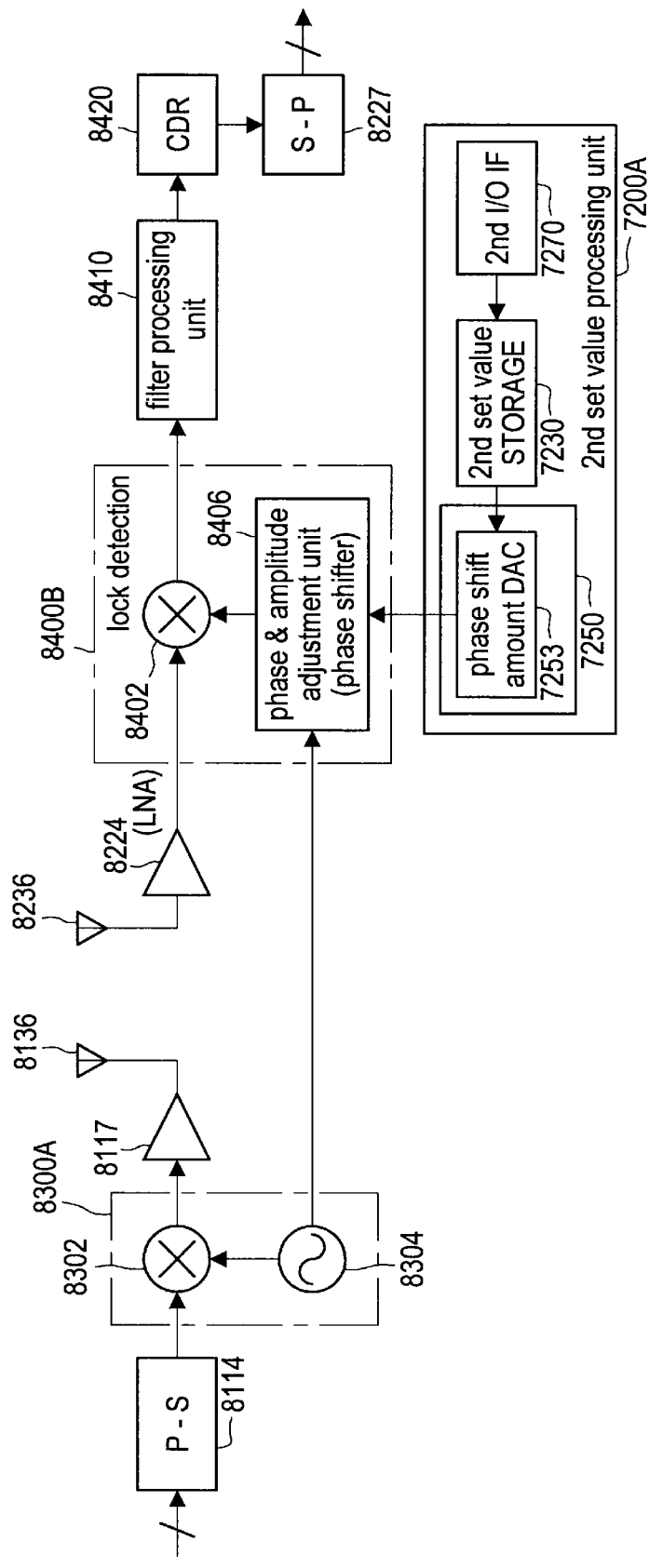
FIG. 6 is a diagram illustrating embodiment 2 (a second example of the modulation function unit and the demodulation function unit).

FIG. 6 is a diagram illustrating embodiment 2. Here, in particular, a second example of the modulation function unit and the demodulation function unit will be described with respect to differences between the second example and the first example of the modulation function unit and the demodulation function unit. Further, although not shown, embodiment 1 described above is applied to embodiment 2, such that the output level of the amplification unit 8117 may be set by the first set value processing unit 7100A, and the output level of the amplification unit 8224 may be set by the second set value processing unit 7200A. The same applies to other embodiments that will be described later.

Embodiment 2 is a system for transmitting a carrier signal separately from the transmission target signal (a separate carrier frequency transmission system), and is characterized in that when a mechanism for adjusting a phase of the carrier signal received from a transmission side according to a delay amount of the transmission signal wirelessly transmitted from an antenna 8136 to an antenna 8236 is included, a second set value processing unit 7200B sets a phase adjustment amount. Although not shown, the same applies to a system for transmitting a clock for clock recovery separately from the transmission target data (a separate clock transmission system), in which the phase of the received clock is adjusted according to the delay amount of the transmission data (transmission signal).

For example, at the receiving side, a phase and amplitude adjustment unit 8406 including a function of the phase adjustment circuit (phase shifter) is provided in the demodulation function unit 8400B. A carrier signal is supplied via a cable or wirelessly from a transmission-side local oscillation unit 8304 at the transmission side to the phase and amplitude adjustment unit 8406. Further, at the receiving side, the second set value processing unit 7200B includes, as a second operation control unit 7250, a phase shift amount DAC 7253 for setting a phase shift amount of (a phase adjustment circuit of) the phase and amplitude adjustment unit 8406. The second set value processing unit 7200B may have the second basic configuration, but may include the second set value determination unit 7210 in place of the second I/O interface unit 7270, as in the first basic configuration.

Operation and Effects of Embodiment 2

A set value for setting an optimal value of the phase shift amount in (the phase adjustment circuit of) the demodulation function unit 8400 is held in a second set value storage unit 7230 in advance. The phase shift amount DAC 7253 reads the set value stored in the second set value storage unit 7230 and controls (the functional unit of the phase shifter of the phase and amplitude adjustment unit 8406) of the demodulation function unit 8400 based on the set value so that a phase shift amount of the output carrier signal from the phase and amplitude adjustment unit 8406 is an appropriate value. By doing so, an appropriate demodulation process can be performed by the demodulation function unit 8400 irrespective of a transmission delay amount of a signal that depends on the transmission characteristic between transmission and reception. That is, the phase of the carrier signal is appropriately set according to the delay amount of the transmission target signal, thus realizing an appropriate demodulation process.

Embodiment 3

Figure 7:
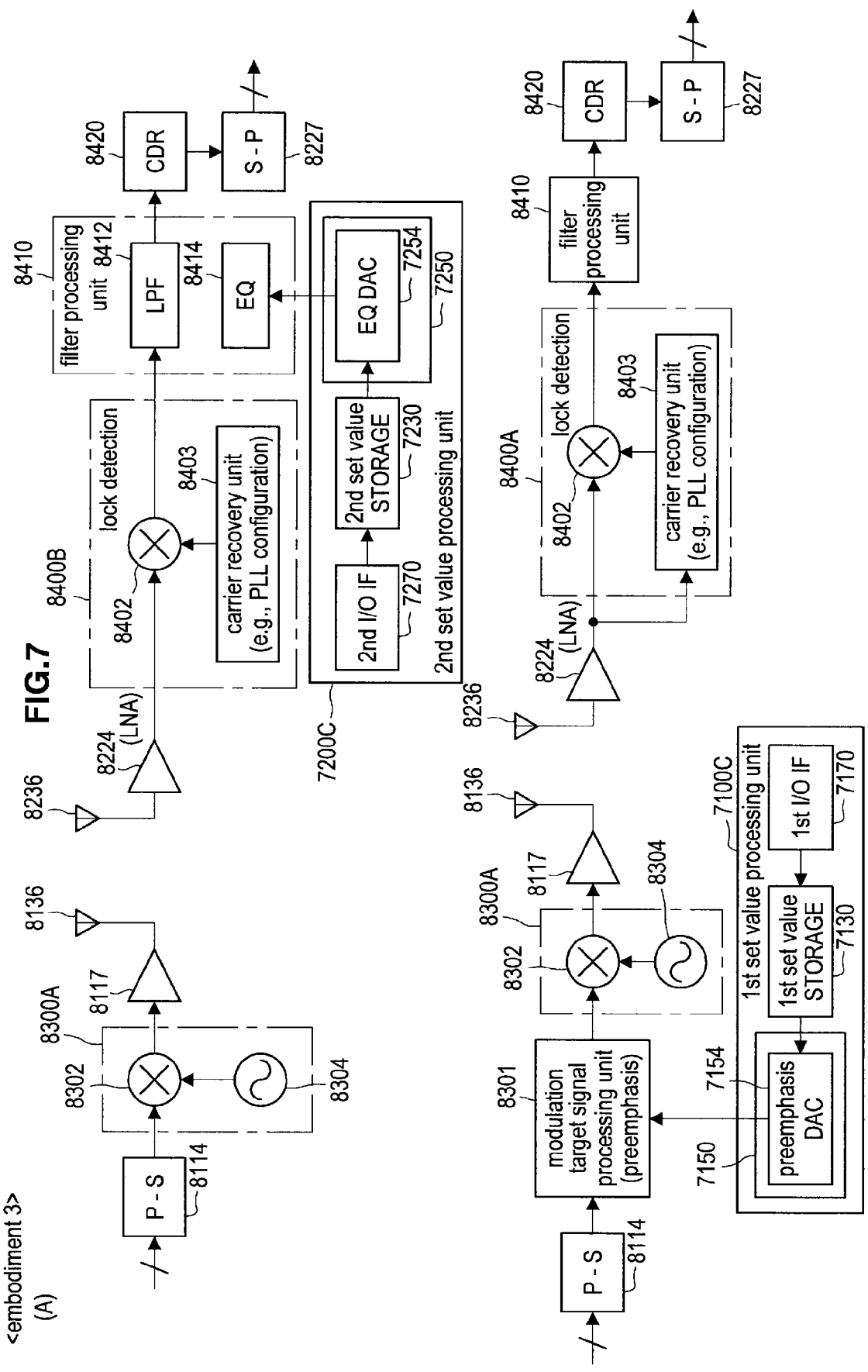
FIGS. 7(A) to 7(B) are diagrams illustrating embodiment 3.

FIG. 7 is a diagram illustrating embodiment 3. Embodiment 3 is characterized in that, when a function unit (frequency characteristic correction processing unit) for correcting a high frequency component or a low frequency component of a reproduced transmission target signal is provided, operation setting of the frequency characteristic correction processing unit is performed by a first set value processing unit 7100C or a second set value processing unit 7200C.

For example, in the example shown in FIG. 7(A), when a filtering processing unit 8410 provided in a subsequent stage of the demodulation function unit 8400 includes a waveform equalizing function as a frequency characteristic correction processing unit, an operation setting of the equalizer is performed by a second set value processing unit 7200C. The filtering processing unit 8410 includes a low pass filter 8412 and an equalizer 8414. The equalizer 8414 includes an equalizer (i.e., waveform equalizing) filter for applying a reduced gain to a high frequency band of a received signal, for example, to reduce inter-symbol interference. A high frequency component of a baseband signal demodulated by the demodulation function unit 8400 is removed by the low pass filter 8412 and a high frequency component is corrected by the equalizer 8414.

Operation and Effects of Embodiment 3

The second set value processing unit 7200C of the embodiment 3 includes, as a second operation control unit 7250, an equalizer DAC 7254 for performing operation setting (specifically, tap coefficient setting) of the equalizer 8414. The second set value processing unit 7200C has the second basic configuration, but may include the second set value determination unit 7210 in place of a second I/O interface unit 7270, as in the first basic configuration. An optimal set value (tap coefficient) for the equalizer 8414 is stored in the second set value storage unit 7230 in advance. The equalizer DAC 7254 reads the set value stored in the second set value storage unit 7230, and adjusts the tap coefficient of the set value equalizer 8414.

In the case of radio transmission within a device or between devices using a millimeter wave band or a wavelength band before or after the millimeter wave band, even when there is reflection, the reflection is fixed reflection, the effects of which can be easily eliminated at the receiving side using a small equalizer. Setting of the equalizer can be performed through preset or static control and is easy to realize.

While the case in which the receiving side includes the waveform equalizing function as the frequency characteristic correction processing unit has been described in FIG. 7(A), the transmission side may include a pre-emphasis unit as the frequency characteristic correction processing unit and operation of the pre-emphasis unit may be controlled by the first set value processing unit 7100C. For example, as shown in FIG. 7(B), a modulation target signal processing unit 8301 including a function of the pre-emphasis unit is provided in a preceding stage of the modulation function unit 8300A (frequency mixing unit 8302). (The pre-emphasis unit of) the modulation target signal processing unit 8301 emphasizes a high frequency component of a transmission target signal in advance and supplies the resultant transmission target signal to the modulation function unit 8300.

In this case, the first set value processing unit 7100C of embodiment 3 includes, as the first operation control unit 7150, a pre-emphasis DAC 7154 for performing operation setting for the modulation target signal processing unit 8301 (specifically, high frequency emphasis degree setting). The first set value processing unit 7100C has the second basic configuration, but may include the first set value determination unit 7110 in place of a first I/O interface unit 7170, as in the first basic configuration. An optimal set value (high frequency emphasis degree) for a pre-emphasis unit of the modulation target signal processing unit 8301 is stored in the first set value storage unit 7130 in advance. The pre-emphasis DAC 7154 reads the set value stored in the first set value storage unit 7130, and adjusts an emphasis degree of the high frequency component of the transmission target signal in the modulation target signal processing unit 8301 based on the set value. Further, although not shown, a high frequency emphasis processing unit may be provided in the transmission side as the frequency characteristic correction processing unit and controlled by the first set value processing unit 7100C, and an equalizer 8414 may be provided in the receiving side as the frequency characteristic correction processing unit and controlled by the second set value processing unit 7200C.

Embodiment 4

Figure 8:
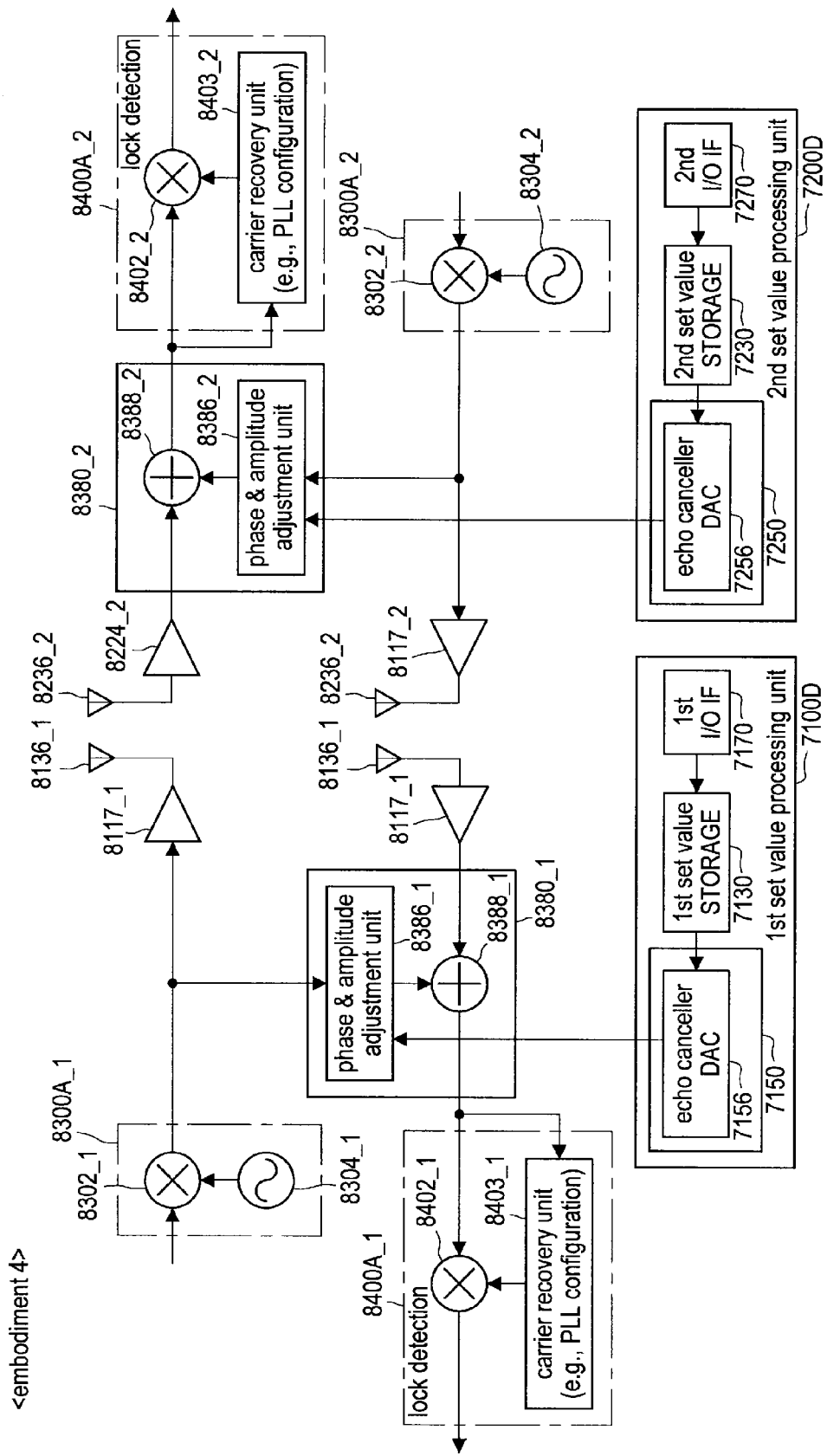
FIG. 8 is a diagram illustrating embodiment 4 (echo canceller technique in bidirectional communication).

FIG. 8 is a diagram illustrating embodiment 4. Embodiment 4 is characterized in that an echo canceller technique is applied to a configuration for performing bidirectional communication. When a transmission signal is contained in a reception signal, an echo component is suppressed using a known echo canceller technique. The "echo canceller technique" refers to a technique for preventing a noise called echo or howling (hereinafter referred to as an echo component) from being contained (i.e., for suppressing an echo component) as a signal output from the transmission side reaches the input side. There are various schemes as the technique for suppressing an echo component, but in embodiment 4, as the simplest scheme, a scheme for subtracting an amplitude and phase-adjusted transmission signal from the reception signal is employed. The "amplitude and phase adjustment" refers to performing adjustment so that an echo component of a processed signal is suppressed (canceled) (optimally, so that the echo component is zero), in which both amplitude and phase of an input signal are adjustment targets. While in embodiment 4, the echo component is suppressed by the "amplitude and phase adjustment," the present invention is not necessarily limited thereto and any scheme may be employed as long as the scheme can suppress the echo component.

For bidirectional communication, a function unit of a transmission system and a function unit of a receiving system are provided in the first communication device 100 and the second communication device 200, respectively. For example, the first communication device 100 includes, as the functional units of the transmission system, an amplification unit 8117_1 and an antenna 8136_1, and includes, as functional units of the receiving system, an antenna 8236_1, an amplification unit 8224_1, and a demodulation function unit 8400_1. The second communication device 200 includes, as functional units of the transmission system, an amplification unit 8117_2 and an antenna 8136_2, and includes, as functional units of the receiving system, an antenna 8236_2, an amplification unit 8224_2, and a demodulation function unit 8400_2. Further, for application of the echo canceller technique, the first communication device 100 includes an echo canceller unit 8380_1 having a phase and amplitude adjustment unit 8386_1 and an addition and subtraction unit 8388_1, and the second communication device 200 includes an echo canceller unit 8380_2 having a phase and amplitude adjustment unit 8386_2 and an addition and subtraction unit 8388_2.

The echo canceller unit 8380_1 and the echo canceller unit 8380_2 constitute one example of an echo suppression unit for suppressing an echo component contained in an input side among signals output from the transmission side. In the present configuration, each phase and amplitude adjustment unit 8386 performs output with phase inversion, and the addition and subtraction unit 8388 correspondingly serves as an addition processing unit. When each phase and amplitude adjustment unit 8386 performs output without phase inversion, the addition and subtraction unit 8388 may correspondingly serve as a subtraction processing unit. Each phase and amplitude adjustment unit 8386 adjusts the phase and the amplitude of the signal modulated by the modulation function unit 8300 and input to the amplification unit 8117, and supplies the adjusted signal to the addition and subtraction unit 8388. The addition and subtraction unit 8388 adds the transmission signal whose amplitude and phase have been adjusted by the phase and amplitude adjustment unit 8386 to the reception signal output from the amplification unit 8224. In fact, the transmission signal whose amplitude and phase have been adjusted is subtracted from the reception signal such that the component of the transmission signal contained in the reception signal is cancelled.

Operation and Effects of Embodiment 4

The first set value processing unit 7100D includes, as the first operation control unit 7150, an echo canceller DAC 7156 for setting a phase shift amount and an amplitude adjustment amount of the phase and amplitude adjustment unit 8386_1 of the echo canceller unit 8380_1. The second set value processing unit 7200D includes, as the second operation control unit 7250, an echo canceller DAC 7256 for setting a phase shift amount and an amplitude adjustment amount of the phase and amplitude adjustment unit 8386_2 of the echo canceller unit 8380_2. The first set value processing unit 7100D and the second set value processing unit 7200D have the second basic configuration, but may include the first set value determination unit 7110 in place of the first I/O interface unit 7170 and the second set value determination unit 7210 in place of the second I/O interface unit 7270, as in the first basic configuration. Set values for setting optimal values of the phase shift amount and the amplitude adjustment amount in the phase and amplitude adjustment unit 8386 so that a component of the transmission signal contained in the reception signal can be cancelled are stored in the first set value storage unit 7130 and the second set value storage unit 7230 in advance. Each echo canceller DAC 7156 reads the set values stored in the first set value storage unit 7130 or the second set value storage unit 7230 and adjusts (a shift amount of) a phase and an amplitude level of a signal output from the phase and amplitude adjustment unit 8386 based on the set values.

Embodiment 5

Figure 9:
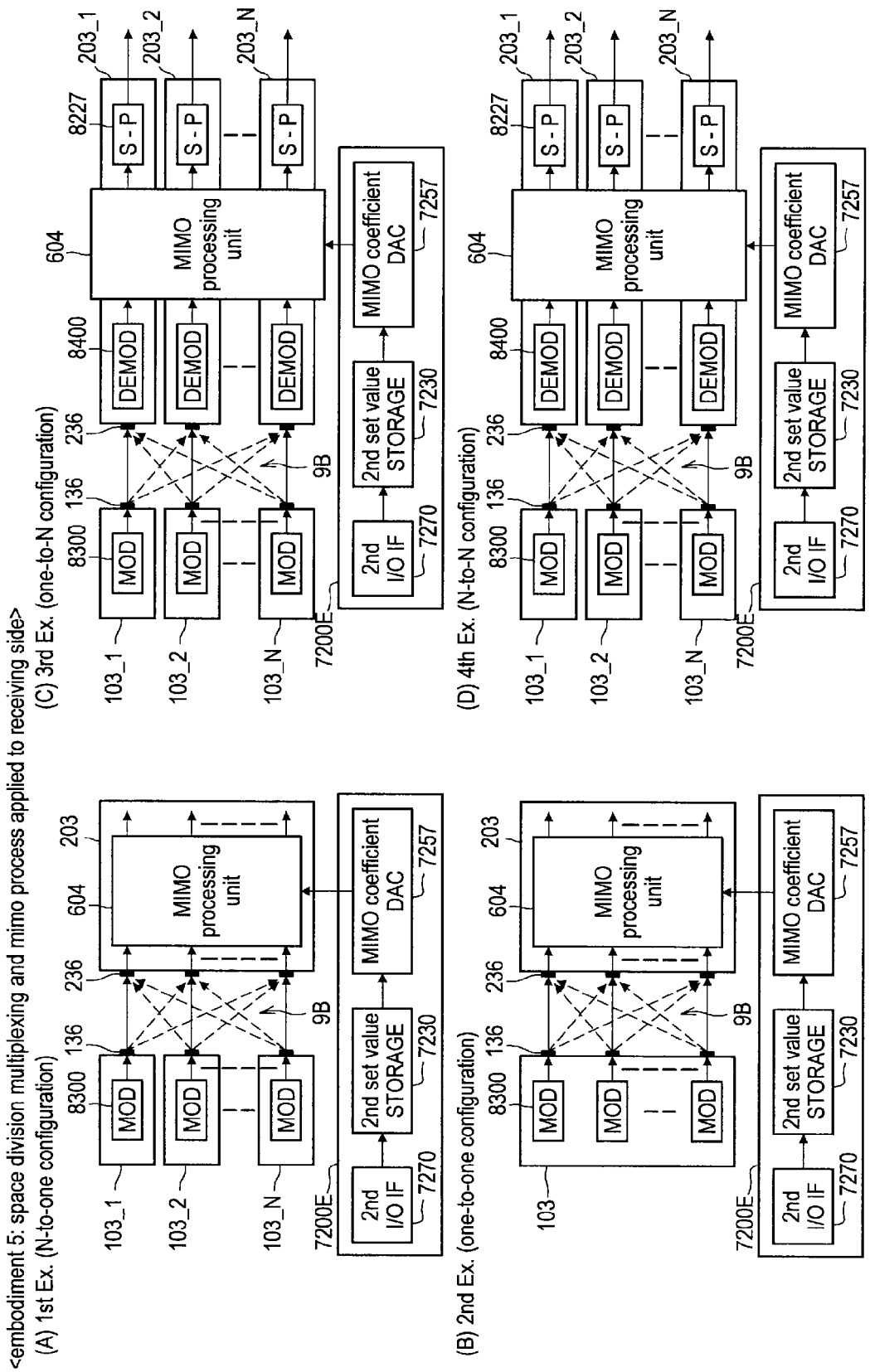
FIGS. 9(A) to 9(D) are diagrams illustrating embodiment 5 (a MIMO process applied to a receiving side).

FIG. 9 is a diagram illustrating embodiment 5. Embodiment 5 is characterized in that a plurality of pairs (sets) of transmission path connection unit 108 and transmission path connection unit 208 are provided and accordingly multiple systems of millimeter wave signal transmission paths 9 are included. In other words, a multi-channel is achieved. Further, in embodiment 5 (and also embodiment 6 that will be described later), the millimeter wave signal transmission path 9 is a free space transmission path 9B, but this is not essential. Further, in embodiment 5, a MIMO (Multi-Input Multi-Output) process is applied as a solution to interference between channels, but embodiment 5 differs from embodiment 6 that will be described later in that signal processing for alleviating a requirement for an interference solution is performed at the receiving side. "To alleviate a requirement for an interference solution" refers to shortening a distance between the channels without use of a radio signal shield or simplifying an interference solution.

The plurality of systems of millimeter wave signal transmission paths 9 are installed not to spatially interfere (no influence of interference) and allow communication at the same frequency or the same time in multiple systems of signal transmission. "Spatially interfere" refers to multiple systems of signals being independently transmitted. Such a scheme is referred to as "space division multiplexing." When a multi-channel of the transmission channel is achieved and space division multiplexing is not applied, different carrier frequencies need to be used in respective channels by applying, for example, frequency division duplex. However, when space division multiplexing is applied, transmission can be performed without influence of interference even when a carrier signal at the same carrier frequency is used. In embodiment 5 (and also embodiment 6 that will be described later), a common carrier frequency is used among respective channels, but this is not essential and carrier frequencies of the respective channels may be at least in a synchronization relationship.

Here, when "space division multiplexing" is applied, multiple systems of millimeter wave signal transmission paths 9 may be formed in a three-dimensional space in which a millimeter wave signal can be transmitted, and the present invention is not limited to the multiple systems of millimeter wave signal transmission paths 9 being formed in a free space. For example, when the three-dimensional space capable of transmitting a millimeter wave signal (electromagnetic wave) is formed of a dielectric material (tangible material), the multiple systems of millimeter wave signal transmission paths 9 may be formed in the dielectric material. In addition, each of the multiple systems of millimeter wave signal transmission paths 9 is not limited to the free space, and may be a form such as a dielectric body transmission path or a hollow waveguide.

As a scheme for achieving a multi-channel, there is a so-called frequency division duplex scheme in which a plurality of transmission and reception pairs use different carrier frequencies. Full duplex bidirectionality can be easily realized by using different carrier frequencies, and a plurality of transmission and reception pairs can independently perform communication in a housing of an electronic device. However, when the multi-channel is obtained through frequency division duplex, it is necessary to fairly broaden an overall use band of the millimeter wave signal transmission path. The free space transmission path satisfies this requirement, but a limited bandwidth channel such as a dielectric body transmission path does not satisfy the requirement.

Meanwhile, in radio transmission within a device or between devices, since it is easy to define an arrangement position of a circuit member or an antenna, it is easy to apply a space division multiplexing scheme. In the case of the space division multiplexing, there is an advantage in that a transmission bandwidth restriction is resolved, basically, since respective channels (a plurality of transmission and reception pairs) can use the same carrier frequency. However, in the space division multiplexing, an inter-channel interference (so-called crosstalk) solution is necessary. For example, in the free space transmission path, it is important to have a sufficient distance between transmission antennas (or between receiving antennas). However, this means that there is a restriction on a distance between the channels, and becomes a problem when a number of antenna pairs (i.e., transmission channels) need to be arranged in a narrow space.

As another interference solution scheme, for example, a structure for obstructing electromagnetic wave propagation between the transmission antennas (or between the receiving antennas) may be employed. In addition, a scheme of employing a structure for confining a radio signal such as a dielectric body transmission path or a hollow waveguide to decrease a distance between the channels may be employed. However, these schemes increase cost in comparison with a free space transmission path.

On the other hand, a technique in which a plurality of antennas are provided in each of the transmission side and the receiving side (the numbers of antennas at the transmission side and the receiving side may differ), and transmission capacity is increased by a MIMO scheme using space division multiplexing by the plurality of antennas is known. In the MIMO scheme, the transmission side encodes and multiplexes k transmission data, distributes the resultant data, for example, to M antennas and transmits the data to a transmission space (also referred to as channel), and the receiving side decodes a reception signal received by m (M≠m or M=m) antennas via the transmission space to obtain K reception data. That is, in the MIMO scheme, the transmission side distributes transmission data to a plurality of antennas and transmits the data, and the receiving side obtains reception data from signals received by a plurality of antennas through signal processing. The MIMO scheme is a communication scheme based on a space division multiplexing scheme using a transmission characteristic of the transmission space. In the MIMO scheme, a plurality of independent logical paths without crosstalk at the same frequency and the same time can be obtained, a plurality of data can be transmitted through radio communication using the same frequency at the same time, and transmission speed can be improved.

As configuration schemes for data transmission using a MIMO scheme, there are various schemes such as unique mode transmission using singular value decomposition (SVD) or unique value decomposition of a channel matrix, but a calculation amount in the conventional schemes is generally great. For example, it is necessary to perform an operation for an m×M channel matrix in which the number of antennas at the transmission side is M and the number of antennas at the receiving side is m in order to perform unique mode transmission.

As a scheme for alleviating a problem in such a space division multiplexing scheme using a MIMO scheme, in embodiment 5 (and embodiment 6 that will be described later), signal processing for alleviating a requirement for the interference solution is performed at the receiving side. Basically, as shown in FIG. 9, a MIMO processing unit 604 is provided in the receiving side and an interference solution is used from an aspect of baseband signal processing, so that an antenna interval can be decreased. The MIMO processing unit 604 is one example of a matrix operation processing unit (transfer characteristic correction unit) for performing a matrix operation based on a channel matrix having a transfer function of each antenna pair between transmission and reception as an element. Specifically, the MIMO processing unit 604 performs a correction operation on a plurality of transmission target signals corresponding to a plurality of antennas 136, based on a transfer characteristic of a millimeter wave signal transmission path 9 (transmission space) between the antenna 136 at the transmission side and the antenna 236 at the receiving side. The transfer characteristic is represented by a channel matrix, and an inverse matrix operation is performed, as the correction operation, on a transmission target signal of each channel.

A significance of the correction operation (the inverse matrix operation) is to correct the transfer characteristic for the demodulation signal, in which a transmission target signal can be acquired as the processed signal without receiving influence of the transfer characteristic. When the modulation schemes for the respective channels are the same, a demodulation component based on an unnecessary wave received by the antenna 236 is completely cancelled. When the modulation schemes of the respective channels are different, the unnecessary wave component is not completely cancelled, but a demodulation process can cause the influence of the unnecessary wave component not to be received.

Here, the MIMO process in the MIMO processing unit 604 in embodiment 5 is characterized in that only a direct wave between transmission and reception is a target. This greatly differs from signal processing handling a plurality of reception signals in which a reflection wave along a different path from a direct wave generated from the same transmission antenna is also a target in one receiving antenna because of a multipath solution in which the same electromagnetic wave from a plurality of paths reaches the receiving side in a multipath environment in which an electromagnetic wave transmitted from the transmission side is reflected or diffracted by parts, walls or the like in the housing in the MIMO process in the radio transmission between devices or in a housing that may be normally employed. This is because a millimeter wave (or microwave) with a relatively short wavelength is used in the radio signal transmission within the device or between devices such that obstructions substantially obstructing the radio transmission do not exist in a space where the millimeter wave signal transmission path 9 applied with the space division multiplexing is formed, and in this case, it is mostly unnecessary to consider effects of the reflection wave.

Under a multipath environment, when electromagnetic waves from a plurality of paths are received at the receiving side, distances of a plurality of paths are different and times taken for the electromagnetic waves from the transmission side to reach the receiving side are different according to the paths. Thereby, a plurality of phase-shifted electromagnetic waves are received at the receiving side and as a result, a waveform of the reception signal is distorted and the signal is not likely to be decoded. As a solution, the MIMO process may be applied. In this case, considering a channel matrix is naturally suitable as the multipath solution.

On the other hand, the MIMO process of embodiment 5, or embodiment 6 that will be described later, differs from the MIMO process for such a multipath solution, and considering the channel matrix differs from considering the channel matrix for the multipath solution. However, in an environment in which reflection waves are rich, an inverse matrix of the channel matrix can be easily solved, but in a real environment in which only a direct wave exists and a reflection wave does not exist at all, it may be difficult to solve the inverse matrix of the channel matrix. In embodiment 5 or 6, an antenna arrangement is restricted to prevent the inverse matrix of the channel matrix from being difficult to obtain.

In this case, in embodiment 5, the antenna arrangement (each antenna interval between the transmission side and the receiving side) is determined so that the number of multipliers (an element of an amplifier) and adders necessary in the MIMO process can be reduced, and correspondingly the MIMO process at the receiving side is performed. That is, the antenna arrangement is determined so that the number of MIMO processes can be decreased, and correspondingly the MIMO process at the receiving side in which only a direct wave is a target is performed. However, whether orthogonal detection or lock detection is necessary in the demodulation function unit 8400 depends on such a relationship. When the orthogonal detection or the lock detection is unnecessary, envelope detection or squared detection may be applied. A distance between each antenna 136 in the transmission side and each antenna 236 in the receiving side is set so that the orthogonal detection or the lock detection is unnecessary, such that a configuration in which the envelope detection or the squared detection is applied can be employed. In any case, the MIMO process is applied to the receiving side to alleviate a requirement for an interference solution in the free space transmission path. Preferably, a common carrier frequency among channels is used such that the MIMO process in a baseband is performed in the receiving side. More preferably, the antenna arrangement is restricted such that the MIMO processing amount (inverse matrix operation amount) can be reduced.

Further, it is desirable to share a carrier frequency among the channels, but this is not essential. The carrier frequencies of the respective channels may be at least in a synchronized relationship. As a basic consideration of space division multiplexing, normally, a common (the same) frequency of the carrier signal is used. If the common frequency of the carrier signal at the transmission side is used, effects of the carrier frequency are certainly the same in the respective channels and the MIMO process in the baseband region can be certainly and efficiently performed. When the carrier frequencies are different from channel to channel, the demodulation circuit or the frequency selection filter corresponding to each carrier frequency is provided in each channel at the receiving side and a device scale becomes great. In this regard, when a common carrier frequency for the respective channels is used, a great advantage is obtained.

The first example shown in FIG. 9(A) is a configuration in which, for N systems, the receiving side is a one-chip configuration and the transmission side uses a semiconductor chip 103 accommodating the modulation function unit (MOD) 8300 for each system (referred to as N-to-one configuration). The second example shown in FIG. 9(B) is a one-to-one configuration in which the receiving side is a one-chip configuration and the transmission side is also a one-chip configuration. When the configuration of the second example is employed, since the transmission side is a one-chip configuration, the modulation function unit 8300 in the transmission-side signal generation unit 110 does not need to include the transmission-side local oscillation unit 8304 for each system. That is, the transmission-side local oscillation unit 8304 is provided in one system, and the carrier signal generated by the transmission-side local oscillation unit 8304 is used for frequency conversion (modulation) in other systems. A third example shown in FIG. 9(C) is a configuration in which the transmission side is a one-chip configuration, and the receiving side uses one chip for each system (referred to as one-to-N configuration). A fourth example shown in FIG. 9(D) is a configuration in which the transmission side uses one chip for each system and the receiving side also uses one chip for each system (N-to-N configuration). In the case of the third or fourth example, a MIMO processing unit 604 shared among all the systems is provided between the demodulation function unit (DEMOD) 8400 and the serial-parallel conversion unit 8227 for each system.

Even in any of the first to fourth examples, the second set value processing unit 7200E for controlling an operation of the MIMO processing unit 604 is provided. The second set value processing unit 7200E of embodiment 5 includes, as the second operation control unit 7250 (not shown), a MIMO coefficient DAC 7257 for performing operation setting for the MIMO processing unit 604 (specifically, setting of a coefficient of a matrix operation in the MIMO process (corresponding to the matrix element)). The second set value processing unit 7200E has the second basic configuration, but may include a second set value determination unit 7210 in place of the second I/O interface unit 7270, as in the first basic configuration. An optimal parameter (a value of each matrix element that will be described later) for the MIMO process capable of suitably canceling crosstalk is checked in advance, and the value (one example of the set value) is stored in the second set value storage unit 7230 of the second set value processing unit 7200E in advance. The second operation control unit 7250 reads the set value (the value of each matrix element) stored in the second set value storage unit 7230 and sets the set value in the MIMO processing unit 604.

Hereinafter, the MIMO process at the receiving side will be described in detail. For simplicity of description, one-way communication from the first communication device 100 to the second communication device 200 will be described, unless otherwise mentioned. In addition, as an optimal form of a chip configuration of the transmission system, the transmission-side signal generation unit 110 (accommodating the modulation function unit 8300) for M systems is accommodated in one semiconductor chip 103. For a receiving system, as an optimal form, all receiving-side signal generation units 220 (accommodating the demodulation function unit 8400) for M systems are accommodated in one semiconductor chip 203, as well. That is, one-way communication from the first communication device 100 in which one semiconductor chip 103 accommodating the transmission-side signal generation units 110 for M systems is mounted to the second communication device 200 in which one semiconductor chip 203 accommodating the receiving-side signal generation units 220 for M systems is mounted will be described.

[Overview of MIMO Process Applied to Receiving Side]

FIGS. 10 and 11 are diagrams illustrating an overview of the MIMO process applied to the receiving side. Here, FIG. 10 is a diagram illustrating an operation of the MIMO process applied to the receiving side. FIG. 11 is a diagram illustrating a basic MIMO process operation scheme applied to the receiving side.

In FIG. 10, the number of transmission channels in space division multiplexing is M, and the number of antennas 136 and the number of antennas 236 are M. A millimeter wave signal from each antenna 136 at the transmission side is transmitted to the antenna 236 arranged to face the antenna 136 at the receiving side. In FIG. 10, a solid line indicates a desired wave directly delivered from the antenna 136_$a$ (a is any of 1 to M) to the antenna 236_$a$ arranged to face the antenna 136_$a$. A dotted line indicates an unnecessary wave (interference wave) directly delivered from the antenna 136_$a$ to the other antenna 236_$b$ (b is any of 1 to M, and b≠a) not arranged to face the antenna 136_$a$. Both the desired wave and the unnecessary wave are direct waves directly delivered from the antenna 136_$a$ to the antenna 236_$a$ and the antenna 236_$b$.

Here, a channel matrix H applied to the MIMO process operation is shown in Equation (1-1). In the M×M channel matrix H, an i=j element among matrix elements $h_{i,j}$ is an element for the desired wave, and an i≠j element is an element for the unnecessary wave. In addition, a reception signal r in this case is shown in Equation (1-2). Further, s denotes a transmission signal and v denotes noise.

[Math. 1]

$$\left.\begin{array}{c} H = \begin{pmatrix} h_{1,1} & h_{1,2} & \cdots & h_{1,M} \\ h_{2,1} & h_{2,2} & \cdots & h_{2,M} \\ & & \ddots & \\ h_{M,1} & h_{M,2} & \cdots & h_{M,M} \end{pmatrix}_{M \times M} \quad (1\text{-}1) \\ \begin{pmatrix} r_1 \\ r_2 \\ \vdots \\ r_M \end{pmatrix} = \begin{pmatrix} h_{1,1} & h_{1,2} & \cdots & h_{1,M} \\ h_{2,1} & h_{2,2} & \cdots & h_{2,M} \\ \vdots & \vdots & \ddots & \vdots \\ h_{M,1} & h_{M,2} & \cdots & h_{M,M} \end{pmatrix} \begin{pmatrix} s_1 \\ s_2 \\ \vdots \\ s_M \end{pmatrix} + \begin{pmatrix} v_1 \\ v_2 \\ \vdots \\ v_M \end{pmatrix} \quad (1\text{-}2) \\ r = Hs + v \end{array}\right\} \quad (1)$$

As shown in FIG. 10(B), in a MIMO process at a receiving side of a MIMO processing unit 604, an inverse matrix H-1 of the channel matrix H is applied to a reception signal r. As a result, a transmission target signal s (and specifically, a noise component H-1·v) is obtained at the receiving side. The transmission target signal s is a baseband signal before modulation. That is, the MIMO process in the MIMO processing unit 604 is a matrix operation that uses a value of the matrix element $h_{i,j}$. Specifically, an inverse matrix operation in the MIMO processing unit 604 based on the inverse matrix H-1 is a process of superimposing the component based on the unnecessary wave and an inverse component in a baseband region that is performed on a demodulation output of the reception signal in which the desired wave and the unnecessary wave are mixed, such that a component based on an unnecessary wave received by the antenna 236 at the receiving side is cancelled. When the MIMO process in the baseband region after demodulation at the receiving side is applied, a transmission target signal s not affected by an interference wave can be acquired. As a result, when multiplexing transmission is realized by space division multiplexing, a requirement for the interference solution can be alleviated and an interference solution is unnecessary, or an interference solution can be reduced even when the millimeter wave signal transmission path 9 is the free space transmission path 9B. For the convenience of illustration, a second set value processing unit 7200E is shown in the outside of the semiconductor chip 203 in FIG. 10(B).

In FIG. 11, a relationship between the MIMO process applied to the receiving side and the carrier frequency is shown. The first communication device 100 includes, as the modulation function unit 8300, a frequency mixing unit 8302 for each channel. In this example, the frequency mixing unit 8302 for each channel (system) is an amplitude modulation scheme and does not employ orthogonal modulation. The modulation function unit 8300 includes one transmission-side local oscillation unit 8304 shared among all the channels. A carrier signal generated by the transmission-side local oscillation unit 8304 is used for the frequency mixing unit 8302 of each channel to perform modulation. This configuration is convenient since the semiconductor chip 103 at the transmission side has a one-chip configuration.

The second communication device 200 includes, as the demodulation function unit 8400, an amplitude detection circuit 8403 for each channel. The amplitude detection circuit 8403 is of a scheme of simply demodulating an amplitude component of an amplitude modulation wave without employing orthogonal detection or lock detection. For example, an envelope detection circuit or a squared detection circuit is employed.

When one transmission-side local oscillation unit 8304 shared among all channels is provided and the carrier signal generated by the transmission-side local oscillation unit 8304 is used by the frequency mixing unit 8302 of each channel for modulation, effects of the carrier frequency are the same in the respective systems. For basic advantages of space division multiplexing, the common carrier frequency is used for all the systems, such that effects of the carrier frequency are the same in the respective systems and the MIMO process in the baseband region can be performed at the receiving side.

[Relationship between Constraint of Antenna Arrangement and MIMO Processing Amount]

In FIG. 12, a relationship between a constraint of an antenna arrangement and a MIMO processing amount (an inverse matrix operation amount) is shown. In FIG. 12, a case in which the number of channels is 2 (the number of antenna pairs is 2) is shown as the simplest configuration. As shown in FIG. 12(A), an antenna 136_1 and an antenna 136_2 are provided in a semiconductor chip 103 at a transmission side, and an antenna 236_1 and an antenna 236_2 are provided in a semiconductor chip 203 to directly face the antenna 136_1 and the antenna 136_2, respectively. The antenna 136 is equivalent to the antenna 8136 and the antenna 236 is equivalent to the antenna 8236. Hereinafter, the same applies to other descriptions.

"Directly facing" refers to an antenna pair being arranged so that the antennas do not have a phase characteristic that depends on directivity. In other words, directly facing refers to the fact that a radiation angle of a desired wave from the antenna 136 or an incidence angle to the corresponding antenna 236 is zero. When a relationship of "directly facing" is not satisfied, correction based on the phase characteristic that depends on the directivity of the antenna may be performed. Hereinafter, unless otherwise mentioned, it is assumed that the antenna pair is arranged in a "directly facing" state.

A distance between antennas associated with the desired wave is d1. That is, a directly facing distance between the antenna 136_1 of the semiconductor chip 103 and the antenna 236_1 of the semiconductor chip 203 is d1, and similarly, a directly facing distance between the antenna 136_2 of the semiconductor chip 103 and the antenna 236_2 of the semiconductor chip 203 also is d1. Meanwhile, a distance between antennas associated with an unnecessary wave is d2. That is, a distance between the antenna 136_1 of the semiconductor chip 103 and the antenna 236_2 of the semiconductor chip 203 is d2, and similarly, a distance between the antenna 136_2 of the semiconductor chip 103 and the antenna 236_1 of the semiconductor chip 203 is also d2. The desired wave transmitted from the antenna 136_1 is directly received by the antenna 236_1. The desired wave transmitted from the antenna 136_2 is directly received by the antenna 236_2. The unnecessary wave transmitted from the antenna 136_1 is directly received by the antenna 236_2. The unnecessary wave transmitted from the antenna 136_2 is directly received by the antenna 236_1. Since "distance d1<distance d2," a reception level of the desired wave received by the antenna 236_1 (or the antenna 236_2) is higher than a reception level of the unnecessary wave received by the antenna 236_2 (or the antenna 236_1) due to distance attenuation even when reception levels of the antenna 136_1 and the antenna 1362 are the same. This causes the inverse matrix of the channel matrix to be necessarily present.

The MIMO process generally requires a complex number operation (or corresponding process), making the circuit scale large. On the other hand, the antenna arrangement is restricted in consideration of only a direct wave being a target and signal processing is correspondingly performed such that the MIMO processing amount (inverse matrix operation amount) can be reduced. For example, in two channels, a distance difference (referred to as path difference) between the distance d1 of the desired wave between the antennas and the distance d2 of the unnecessary wave between the antennas is $\Delta d$ (=d2−d1), and a distance attenuation element is $\alpha$. In an M×M channel matrix H, when each matrix element $h_{i,j}$ is represented by a complex number, the matrix element is represented by synthesis of a real term (cos term) and an imaginary term (sin term). In this case, when the path difference $\Delta d$ is set with a certain condition, each matrix element $h_{i,j}$ of the channel matrix H consists of only the real term (cos term) or the imaginary term (sin term). In addition, due to the presence of the distance attenuation element $\alpha$, the inverse matrix H-1 of the channel matrix H is necessarily obtained and each element of the inverse matrix H-1 consists of only a real term (cos term) or an imaginary term (sin term). For example, when normalization and consideration are used in the channel matrix H for the 2 channels, each element of the desired wave (each element of 1×1 and 2×2) consists of a real term (Re==1) irrespectively of the path difference $\Delta d$, and each element of the inverse matrix H-1 consists of a real term (Re'). On the other hand, an element of the unnecessary wave (each element of 1×2 or 2×1) consists of only a real term, only an imaginary term, or "a real term+an imaginary term" due to path difference $\Delta d$.

For example, as shown in FIG. 12(B), when "$\Delta d=(n/2+\frac{1}{4})\lambda c$ (n is a positive integer of 0 or 1 or more)" is satisfied (referred to as pass condition 1), the path difference $\Delta d$ is an odd number times $\pi/2$ in terms of phase and the real term is zero. Accordingly, an element consists of only an imaginary term (1m) and each element of the inverse matrix H-1 consists of only an imaginary term (1m') (FIG. 12(B-1)). When the pass condition 1 is not satisfied, the element consists of "a real term+an imaginary term," but when a relationship of the pass condition 1 is almost satisfied, the real term component is much smaller than the imaginary term component and the element may be treated as consisting of substantially only the imaginary term. That is, it is optimal to completely satisfy $\Delta d=(n/2+\frac{1}{4})\lambda c$, but a slight deviation from this relationship is allowed. In this disclosure, "only an imaginary term" includes a case in which there is such a slight deviation. Here, specifically, when n is 0 or an even number, the imaginary term becomes "+1" and accordingly in the unnecessary wave, the phase is turned by $\pi/2$ with respect to the desired wave, as a path difference. In this case, when a time difference corresponding to the path difference $\Delta d$ is $\Delta t$ and $D=\exp(j\omega\Delta t)$, "detH=1−($\alpha \cdot$D)2=1−($\alpha \cdot$−j)2>1" and accordingly the inverse matrix H-1 of the channel matrix H may exist. In the MIMO process, since "−$\alpha \cdot$D=−j·$\alpha$," the unnecessary component is "−$\pi/2$" in terms of phase with respect to the desired component. Meanwhile, when n is an odd number, the imaginary term is "−1" and accordingly in the unnecessary wave, the phase is turned by −$\pi/2$ with respect to the desired wave, as a path difference. In this case, since "detH=1−($\alpha \cdot$D)2=1−($\alpha \cdot$j)2>1," the inverse matrix H-1 of the channel matrix H may exist. In the MIMO process, since "−$\alpha \cdot$D=j·$\alpha$," the unnecessary component is "$\pi/2$" in terms of phase with respect to the desired component.

In any case, the element of the desired wave of 1×1 and 2×2 consists of only the real term, and the element of the unnecessary wave of 1×2 and 2×1 consists of only the imaginary term. Thereby, the MIMO processing amount can be reduced. Since the imaginary term 1$m$' (orthogonal component) exists, an orthogonal component demodulation circuit (i.e., orthogonal detection circuit) is necessary as the demodulation function unit 8400 even when a modulation scheme when the present configuration example is not applied is, for example, a modulation originally without an orthogonal component, such as the ASK scheme or the BPSK scheme. For example, in a case in which the modulation scheme is the BPSK scheme, a reception signal state of each channel when the MIMO process is performed at the receiving side by applying pass condition 1 is shown in FIG. 12(B-2). As shown, a component of the first channel ch1 is a synthesis of a one-axis component (Ch1_I) of an original desired wave (for a desired signal) and a Q-axis component (Ch2_Q') of an unnecessary wave for an unnecessary signal due to the second channel ch2, and is received by the antenna 236_1. A component of the second channel ch2 is a synthesis of a one-axis component (Ch2_I) of an original desired wave (for a desired signal) and a Q-axis component (Ch1_Q') of an unnecessary wave for an unnecessary signal due to the first channel ch1 and is received by the antenna 236_2. As can be seen from the figure, since the desired wave and the unnecessary wave are orthogonal, an orthogonal detection circuit is necessary as the demodulation function unit 8400. In the MIMO process at the receiving side, since an unnecessary wave component appearing as a component orthogonal to the desired signal is canceled, an orthogonal detection circuit is necessary as the demodulation function unit 8400.

As shown in FIG. 12(C), when "$\Delta d=(n/2)\lambda c$ (n is a positive integer equal to or more than 1)" is satisfied (referred to as pass condition 2), the path difference $\Delta d$ is in a relationship of an integer times $\pi$ in terms of phase and the imaginary term is zero. Accordingly, the element consists of only a real term (Re") and each element of the inverse matrix H-1 consists of a real term (Re''') (FIG. 12(C-1)). When the relationship of pass condition 2 is not satisfied, the element consists of "a real term+an imaginary term," but when the relationship of this pass condition is almost satisfied, the imaginary term component is much smaller than the real term component and the element may be treated as consisting of substantially only a real term. That is, it is optimal to completely satisfy $\Delta d=(n/2)\lambda c$, but a slight deviation from this relationship is allowed. In this disclosure, "only a real term" includes a case in which there is such a slight deviation. Here, specifically, when n is an even number, the real term is "+1" and accordingly, in the unnecessary wave, the phase is turned by $2\pi$ with respect to the desired wave, as the path difference (i.e., in phase and with the same polarity). In this case, since "detH=1−($\alpha \cdot$D)2=1−($\alpha \cdot$1)2>1," the inverse matrix H-1 of the channel matrix H may exist. In the MIMO process, since "−a·D=−$\alpha$," the unnecessary component is "−$\pi$" in terms of phase with respect to the desired component (i.e., in phase and with reverse polarity). Meanwhile, when n is an odd number, the real term is "−1" and accordingly, in the unnecessary wave, the phase is turned by it with respect to the desired wave, as a path difference (i.e., in phase and with reverse polarity). In this case, since "det H=1−($\alpha \cdot$D)2=1−($\alpha'$−1)2>1," the inverse matrix H-1 of the channel matrix H may exist. In the MIMO process, since "−$\alpha \cdot$D=$\alpha$," the unnecessary component is "$2\pi$" in terms of phase with respect to the desired component (i.e., in phase and with the same polarity).

In any case, the element of the desired wave of 1×1 and 2×2 consists of a real term and the element of the unnecessary wave of 1×2 and 2×1 consists of only a real term. Thereby, the MIMO processing amount can be reduced. In this case, since the imaginary term (orthogonal component) does not exist, when a modulation scheme when the present configuration example is not applied is, for example, a modulation originally without an orthogonal component, such as the ASK scheme, an orthogonal component demodulation circuit (i.e., orthogonal detection circuit) is unnecessary as the demodulation function unit 8400. For example, in a case in which a modulation scheme when the present configuration example is not applied is the ASK scheme, a transmission signal state of each channel when the MIMO process is performed at the receiving side by applying pass condition 2 is shown in FIG. 12(C-2). As shown, a component of the first channel ch1 is a synthesis of a one-axis component (Ch1_I) of an original desired wave (for a desired signal) and a one-axis component (Ch2_I') of an unnecessary wave for an unnecessary signal due to the second channel ch2, and is received by the antenna 236_1. A component of the second channel ch2 is a synthesis of a one-axis component (Ch2_I) of an original desired wave (for a desired signal) and a one-axis component (CH1_I') of an unnecessary wave for an unnecessary signal due to the first channel ch1, and is received by the antenna 236_2. As can be seen from the figure, in the MIMO process at the receiving side, an unnecessary signal component appearing as an in-phase component with respect to the desired wave may be canceled, and an orthogonal detection circuit is unnecessary as the demodulation function unit 8400.

A difference between a distance d1 between antennas of a desired wave between the antenna 136 at the transmission side and the antenna 236 at the receiving side and a distance d2 between antennas of an unnecessary wave may be set so that each element of an unnecessary wave of a channel matrix H (or the inverse matrix H-1) defining a transfer characteristic of a transmission space (in this example, the free space transmission path 9B) can be substantially represented by only a real term or an imaginary term. An antenna arrangement is caused to satisfy pass condition 1 or pass condition 2 in consideration of a characteristic based on a set value of such a path difference $\Delta d$, such that an element of the unnecessary wave of the channel matrix can consist of only an imaginary term or only a real term and an inverse matrix operation process in the MIMO processing unit 604 can be simplified. In particular, when pass condition 2 consisting of only a real term is satisfied, the demodulation function unit 8400 can be simply configured without using an orthogonal detection circuit.

Operation and Effects of Embodiment 5

Here, a value of each matrix element hi,j depends on a transfer characteristic of a transmission space (the millimeter wave signal transmission path 9) between the antenna 136 and the antenna 236, but since a communication environment characteristic may be considered to be substantially invariant in "radio transmission within a device or between devices," a fixed value may be used. An optimal value of each matrix element hi,j capable of suitably canceling crosstalk is checked in advance, and a matrix element (one example of the set value) of the inverse matrix based on the value is held in the second set value storage unit 7230 of the second set value processing unit 7200E in advance. That is, in this case, a set value for performing a matrix operation based on a channel matrix having a transfer function of each antenna pair between transmission and reception as an element corresponds to a matrix element of the inverse matrix of the channel matrix. The MIMO processing unit 604 reads the set value (the value of each matrix element hi,j) stored in the second set value storage unit 7230 and performs the MIMO process based on the set value. By doing so, the MIMO processing unit 604 at the receiving side can suitably cancel the crosstalk.

Embodiment 6

Figure 13:
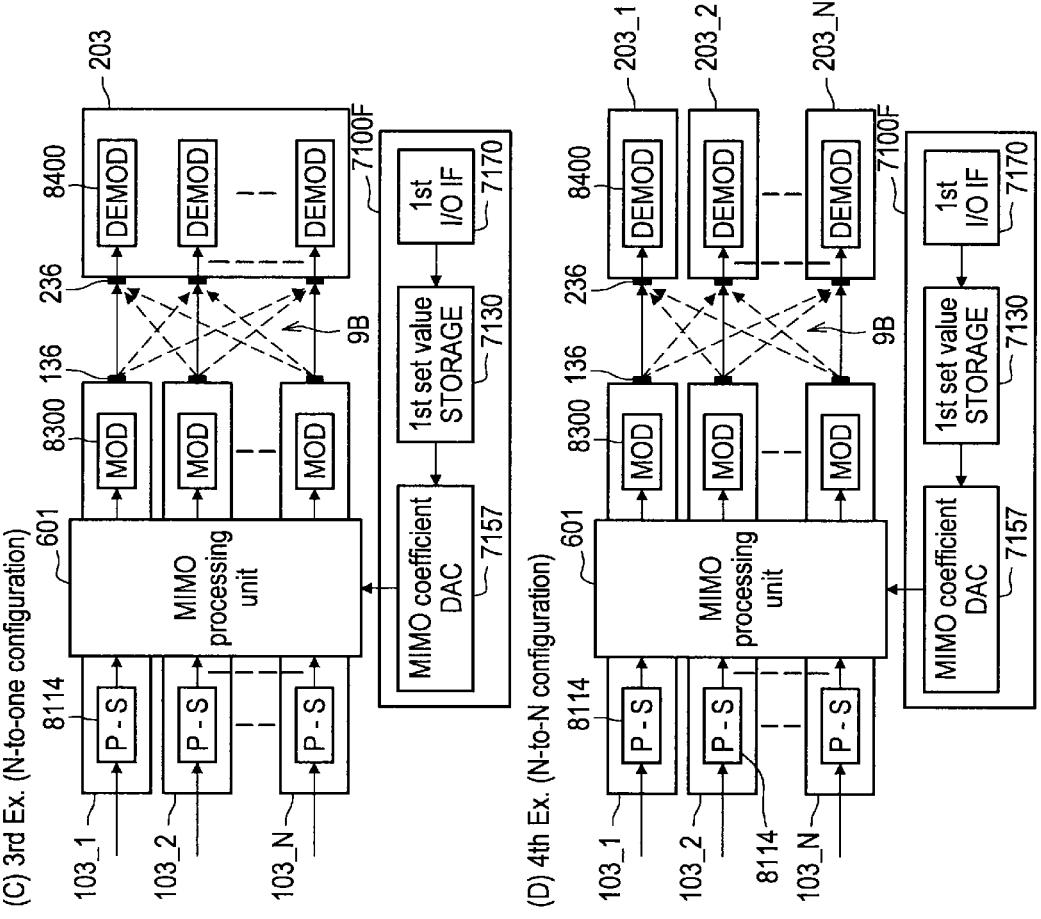
FIGS. 13(A) to 13(D) are diagrams illustrating embodiment 6 (a MIMO process applied to a transmission side).

FIG. 13 is a diagram illustrating embodiment 6. Embodiment 6 is the same as embodiment 5 in that a MIMO process is applied as a solution to interference between channels when multi-channel is achieved, but differs from embodiment 5 in that signal processing for alleviating a requirement for the interference solution is performed at the transmission side. Basically, as shown in FIG. 13, in the transmission side, a MIMO processing unit 601 is provided and an interference solution is used from an aspect of baseband signal processing, so that an antenna interval can be decreased.

The MIMO processing unit 601 is, the MIMO processing unit 604 is one example of a matrix operation processing unit (transfer characteristic correction unit) for performing a matrix operation based on a channel matrix having a transfer function of each antenna pair between transmission and reception as an element. Specifically, the MIMO processing unit 601 performs a correction operation on a plurality of transmission target signals corresponding to a plurality of antennas 136, based on the transfer characteristic of a millimeter wave signal transmission path 9 (transmission space) between the antenna 136 at the transmission side and the antenna 236 at the receiving side. The transfer characteristic is represented by a channel matrix, and an inverse matrix operation is performed on the transmission target signal of each channel, as a correction operation. The MIMO process in the MIMO processing unit 601 is characterized in that only a direct wave between transmission and reception in each antenna is a target. The same applies to the MIMO processing unit 604 provided in the receiving side. However, an essential significance of the correction operation (inverse matrix operation) of the MIMO processing unit 601 is to correct a transfer characteristic in advance for transmission such that the receiving side can receive the transmission target signal without receiving influence of the transfer characteristic. An unnecessary signal component received by the antenna 236 is completely cancelled, and only a signal component based on a desired signal is input to the demodulation function unit 8400.

Even in embodiment 6, preferably, an antenna arrangement is restricted to prevent an inverse matrix of the channel matrix from being difficult to obtain. In this case, the antenna arrangement (each antenna interval between the transmission side and the receiving side) is determined so that the number of multipliers (an element of an amplifier) and adders necessary in the MIMO process can be decreased, and a resultant MIMO process at the transmission side is performed. That is, the antenna arrangement is determined so that the number of MIMO processes can be decreased, and the MIMO process at the transmission side in which only a resultant direct wave is a target is performed. Whether orthogonal modulation in the modulation function unit is necessary, a demodulation method (whether to use an injection locking scheme and whether to use envelope detection or squared detection), and the like depend on such a relationship. In any case, as the MIMO process is applied to the transmission side, a request for an interference solution in the free space transmission path 9B is alleviated, a common carrier frequency is used among channels to perform the MIMO process in the baseband at the transmission side, and the antenna arrangement is restricted to reduce a MIMO processing amount (inverse matrix operation amount).

In a first example shown in FIG. 13(A), for N systems, the transmission side is a one-chip configuration, and the receiving side is a configuration in which a semiconductor chip 203 accommodating a demodulation function unit (DEMOD) 8400 is used for each system (one-to-N configuration). When the configuration of the first example is employed, a transmission-side local oscillation unit 8304 is provided in one system, and other systems may perform a frequency conversion (modulation) using a carrier signal generated by the transmission-side local oscillation unit 8304. A second example shown in FIG. 13(B) is a one-to-one configuration in which the transmission side is a one-chip configuration and the receiving side is a one-chip configuration. When the configuration of the second example is employed, since the receiving side is a one-chip configuration, the demodulation function unit 8400 in the receiving-side signal generation unit 220 does not need to include a receiving-side local oscillation unit 8404 for each system. The receiving-side local oscillation unit 8404 is provided for one system, and for other systems, a reception signal may be demodulated through lock detection using a recovered carrier signal generated by the receiving-side local oscillation unit 8404. In a third example shown in FIG. 13(C), the receiving side is a one-chip configuration and the transmission side is a configuration in which a chip is used for each system (N-to-1 configuration). In a fourth example shown in FIG. 13(D), the transmission side is a configuration in which a chip is used for each system and the receiving side also is a configuration in which a chip is used for each system (N-to-N configuration). In the case of the third or fourth example, a MIMO processing unit 601 shared among all the systems is provided between a modulation function unit (MOD) 8300 and a parallel-serial conversion unit 8114 of each system.

In any of the first to fourth examples, a first set value processing unit 7100F for controlling an operation of the MIMO processing unit 601 is provided. The first set value processing unit 7100F of embodiment 6 includes, as the first operation control unit 7150 (not shown), a MIMO coefficient DAC 7157 for performing operation setting for the MIMO processing unit 601 (specifically, setting of a coefficient (corresponding to the matrix element) of a matrix operation in the MIMO process). The first set value processing unit 7100F employs the second basic configuration, but may include a first set value determination unit 7110 in place of the first I/O interface unit 7170, as in the first basic configuration. A parameter of an optimal MIMO process capable of suitably canceling crosstalk (a value of each matrix element that will be described later) is checked in advance, and the value (one example of the set value) is held in the first set value storage unit 7130 of the first set value processing unit 7100F in advance. The first operation control unit 7150 reads the set value (the value of each matrix element) stored in the first set value storage unit 7130 and sets the set value in the MIMO processing unit 601.

Hereinafter, the MIMO process in the transmission side will be described in detail. Further, hereinafter, for simplicity of the description, one-way communication from the first communication device 100 to the second communication device 200 will be described, unless otherwise mentioned. In addition, as an optimal chip configuration of the transmission system, the transmission-side signal generation units 110 (accommodating the modulation function unit 8300) for M systems are accommodated in one semiconductor chip 103. At the receiving system, the receiving-side signal generation units 220 (accommodating the demodulation function unit 8400) for M systems are accommodated in separate semiconductor chips 203. That is, one-way communication from the first communication device 100 in which one semiconductor chip 103 accommodating transmission-side signal generation units 110 for M systems is mounted to the second communication device 200 in which M semiconductor chips 203 each accommodating a receiving-side signal generation unit 220 for one system is mounted will be described.

[Overview of MIMO Process Applied to Transmission Side]

Figure 15:
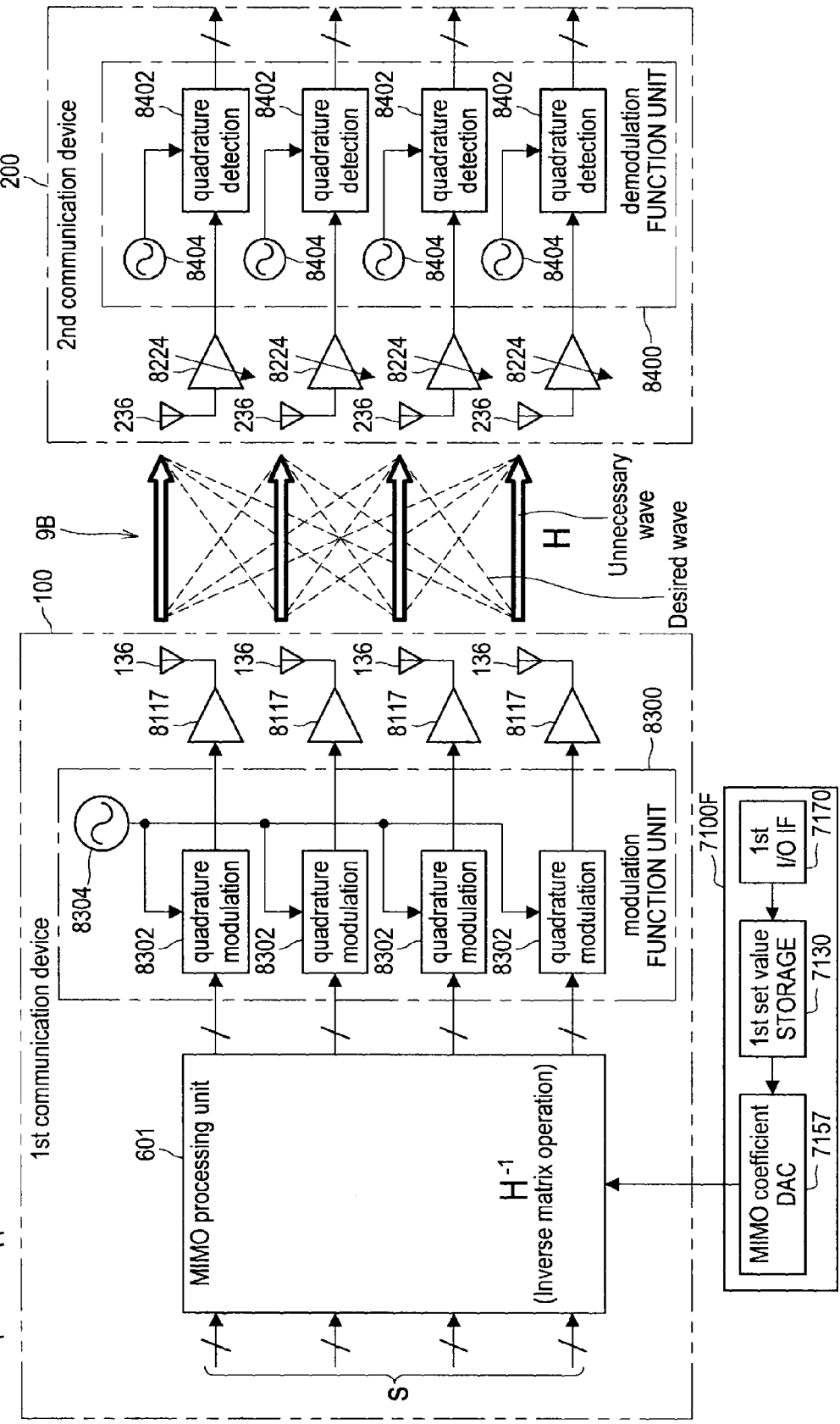
FIG. 15 (A) is a diagram illustrating an operation scheme of the MIMO process applied to the transmission side.

FIGS. 14 and 15 are diagrams illustrating an overview of a MIMO process applied to a transmission side. Here, FIG. 14 is a diagram illustrating operation of the MIMO process applied to the transmission side. FIG. 15 is a diagram illustrating a basic operation scheme of the MIMO process applied to the transmission side.

In FIG. 14, the numbers of antennas 136 and antennas 236 are M so that the number of transmission channels in space division multiplexing is M. A millimeter wave signal is transmitted from each antenna 136 in the transmission side to an antenna 236 at the receiving side arranged to face the antenna 136. In FIG. 14, a solid line indicates a desired wave directly delivered from the antenna 136_*a* (a is any of 1 to M) to the antenna 236_*a* arranged to face the antenna 136_*a*. A dotted line indicates an unnecessary wave (interference wave) directly delivered from the antenna 136_*a* to the other antenna 236_*b* (b is any of 1 to M and b≠a) not arranged to face the antenna 136_*a*. Any of the desired wave and the unnecessary wave is a direct wave directly delivered from the antenna 136_*a* to the antenna 236_*a* and the antenna 236_*b*.

As can be guessed from a comparison between FIG. 10(A) and FIG. 14(A), the channel matrix H applied to the MIMO process operation is shown in Equation (1-1), similar to embodiment 5. However, since the MIMO process operation is performed at the transmission side in embodiment 6, in the MIMO process at the transmission side in the MIMO processing unit 601, an inverse matrix H-1 of the channel matrix H is applied to the transmission target signal sˆ (s hat), as shown in FIG. 14(B). As a result, at a receiving side, the transmission target signal sˆ (and, specifically, a noise v) is obtained. The transmission target signal V' is a signal input to the MIMO processing unit 601. As can be seen from this, when the MIMO process is applied to the transmission side, the transmission target signal s" can be acquired without receiving influence of an interference wave. As a result, when multiplexing transmission is realized using space division multiplexing, a requirement for the interference solution can be alleviated, and an interference solution can be unnecessary or the interference solution can be simplified even when the millimeter wave signal transmission path 9 is a free space transmission path 9B.

The inverse matrix operation in the MIMO processing unit 601 based on the inverse matrix H-1 is a process in which an unnecessary wave component based on a transmission target signal (unnecessary signal) of the other channel received together with a desired wave based on a transmission target signal (a desired signal) of an own channel by the antenna 236 at the receiving side is canceled when embodiment 6 is not applied. More specifically, the inverse matrix operation is a process in which the unnecessary wave component based on the unnecessary signal and an inverse component are superimposed in advance and transmitted as a desired wave.

In FIG. 15, a relationship between a MIMO process applied to the transmission side and a carrier frequency is shown. The first communication device 100 includes, as the modulation function unit 8300, a frequency mixing unit 8302 for each channel in a subsequent stage of the MIMO processing unit 601. In this example, the frequency mixing unit 8302 is shown as performing orthogonal modulation, but this is not essential. The modulation function unit 8300 has one transmission-side local oscillation unit 8304 shared among all channels. The frequency mixing unit 8302 of each channel uses a carrier signal generated by the transmission-side local oscillation unit 8304 to perform modulation. This configuration is convenient since the semiconductor chip 103 at the transmission side has a one-chip configuration. The second communication device 200 includes a modulation function unit 8300 including a frequency mixing unit 8402 and a receiving-side local oscillation unit 8404, for each channel. In this example, the frequency mixing unit 8402 is shown as performing orthogonal detection to correspond to the orthogonal modulation at the transmission side. When the transmission side is not the orthogonal modulation, the frequency mixing unit 8402 may not perform the orthogonal detection. When one transmission-side local oscillation unit 8304 shared among all the channels is provided and the frequency mixing unit 8302 of each channel performs modulation using the carrier signal generated by the transmission-side local oscillation unit 8304 as described above, effects of the carrier frequency are the same in the respective systems. A common carrier frequency is used for all the systems to take basic advantages of space division multiplexing, and effects of the carrier frequency are the same in the respective systems, which enables the MIMO process to be performed in a base band.

Operation and Effects of Embodiment 6

Similar to embodiment 5, the value of each matrix element hi,j depends on a transfer characteristic of the millimeter wave signal transmission path 9 between the antenna 136 and the antenna 236, but since a communication environment characteristic may be considered to be substantially invariant in "radio transmission within a device or between devices," the fixed value may be used. An optimal value of each matrix element hi,j capable of suitably canceling crosstalk is checked in advance, and a matrix element (one example of the set value) of the inverse matrix based on the value is held in the first set value storage unit 7130 in advance. That is, in this case, a set value for performing a matrix operation based on a channel matrix having a transfer function of each antenna pair between transmission and reception as an element corresponds to a matrix element of an inverse matrix of the channel matrix. The MIMO processing unit 601 reads the set value stored in the first set value storage unit 7130 (a value of each matrix element hi,j) and performs a MIMO process based on the set value. By doing so, the baseband signal can be corrected in the MIMO processing unit 601 at the transmission side in advance so that crosstalk can be suitably canceled at a receiving side.

Variants of Embodiments 5 and 6

When the antenna pair has a phase characteristic that depends on directivity φa, it is necessary to consider influence of the phase characteristic φa, as well as the path difference Δd. Basically, influence of the phase characteristic φa may be corrected and considered. In this case, for example, influence of the phase characteristic φa may be converted into a distance and pass condition 1 or pass condition 2 may be calculated again in consideration of the influence.

Even when three channels (three transmission and reception antenna pairs) or more exist, considering a constraint condition of an antenna arrangement may be applied according to the case of two channels. For example, even when there are three or more antenna pairs, the path difference Δd is caused to satisfy pass condition 1 such that the channel matrix and the inverse matrix have a component of only a real term Re or an imaginary term $1m$, similar to the case of two antenna pairs. That is, an element of the desired wave at i=j consists of the real term Re and an element of the unnecessary wave at consists of the imaginary term $1m$. In addition, even when the number of antenna pairs is 3 or more, the path difference Δd is caused to satisfy pass condition 2 such that the channel matrix and the inverse matrix have a component of only the real term Re, similar to the case of two antenna pairs. That is, the element of the desired wave at i=j consists of the real term Re and the element of the unnecessary wave at also consists of the real term Re.

In general, when the number of channels is M, as can be guessed from the channel matrix, for either of pass condition 1 and pass condition 2, $2 \cdot M2$ real number multiplications are necessary in 2-axis modulation such as QPSK, and M2 real number multiplications are necessary in 1-axis modulation such as an ASK scheme or a BPSK scheme. This means that a calculation amount of the real number multiplications increases with the square of the number of antenna pairs in a case in which the number of antenna pairs are 3 or more when the same consideration as in the case of two antennas is simply applied. In the case of 3 or more channels, the number of real number multiplications is suppressed not to be the square of the number of channels (the number of real number multiplications can be suppressed from increasing) based on the characteristic of the antenna arrangement. Specifically, this is based on the fact that influence of an interference wave from an adjacent antenna is greatest and interference waves from other antennas are relatively small. Accordingly, an antenna interval is determined in consideration of the unnecessary wave (interference wave) from the adjacent antenna and is applied to the other antennas. Thus, a total amount of real number multiplications can be reduced.

For example, when pass condition 1 is applied, only a real term for the antenna 136 of a desired wave and an imaginary term for the antenna 136 of an unnecessary wave at both ends may be considered for inner channels other than channels at both of the ends. That is, for the i-th channel, only a desired wave from the i-th antenna 136_i to the antenna 236_i, an unnecessary wave from the (i−1)-th antenna 136_i−1 to the antenna 236i, and an unnecessary wave from the (i+1)-th antenna 136_i+1 to the antenna 236_i may be considered. Thereby, in the channel matrix or the inverse matrix, in row i, an element of a desired wave in column i consists of a real term, elements of the unnecessary wave in columns i−1 and i+1 consist of an imaginary term, and other elements of the unnecessary wave are zero.

When pass condition 2 is applied, only a real term for the antenna 136 of a desired wave and a real term for the antenna 136 of an unnecessary wave at both ends may be considered for inner channels other than channels at both of the ends. That is, for the i-th channel, only a desired wave from the i-th antenna 136_i to the antenna 236_i, an unnecessary wave from the (i−1)-th antenna 136_i−1 to the antenna 236_i, and an unnecessary wave from the (i+1)-th antenna 136_i+1 to the antenna 236_i may be considered. Thereby, in the channel matrix or the inverse matrix, in row i, an element of a desired wave in column i consists of a real term, elements of the unnecessary wave in columns i−1 and i+1 consist of a real term, and other elements of the unnecessary wave are zero.

In any of pass condition 1 and pass condition 2, the number of real number multiplications in the channels at both ends is 2, and the number of real number multiplications in inner channels other than the channels at both ends is 3. A MIMO processing amount can be reduced in comparison with a case in which the present scheme is not applied. That is, in the case of M channels (M is an integer equal to or more than 3), in either of pass condition 1 and pass condition 2, the number of real number multiplications is $2 \cdot \{2 \cdot 2 + (M-2) \cdot 3\}$ in 2-axis modulation such as QPSK, and $\{2 \cdot 2 + (M-2) \cdot 3\}$ in 1-axis modulation such as an ASK scheme or a BPSK scheme. This means that it is possible to reduce a calculation amount of real number multiplications in a case in which the number of antenna pairs is 3 or more when the same consideration as the case of two antennas is simply applied.

The matters described in embodiment 5 or 6 have been exemplarily applied to the case in which the antenna 136 at the transmission side and the antenna 236 at the receiving side are arranged in a two-dimensional shape. However, the scheme in embodiment 5 or 6 may be applied to a case in which the transmission and reception antennas are arranged in a three-dimensional shape, as well as the case in which the transmission and reception antennas are arranged in a two-dimensional shape. For a desired wave between the antennas arranged to face each other at the receiving side in a three-dimensional space from the semiconductor chip 103 at the transmission side, and an unnecessary wave between the antennas arranged to face each other, the same consideration as in the above-described two-dimensional arrangement may be applied. Even in the three-dimensional arrangement, a path difference Δd between the desired wave and the unnecessary wave is caused to satisfy pass condition 1 or pass condition 2 described above, such that the same operation and effects as described above can be obtained.

In embodiment 5 or 6, the inverse matrix operation in the MIMO process performed on the premise that signal processing for alleviating a requirement for the interference solution in the space division multiplexing scheme based on the MIMO scheme is performed at the receiving side or at the transmission side, and on the assumption that the value of the matrix element hi,j of the channel matrix is the fixed value has been described as a preferred aspect, but the present invention is not limited thereto. The technique of assuming the parameter to be the fixed value may be similarly applied to any scheme of adjusting (correcting) a crosstalk canceling amount in space division multiplexing scheme based on the MIMO scheme. For example, the scheme of calculating an antenna weight coefficient matrix is disclosed in Japanese Patent Laid-open Publication Nos. 2009-272823, 2009-272822, and 2008-124533, but a value of a matrix element of this antenna weight coefficient matrix may be assumed to be a fixed value and then the weighting matrix operation (a weighting process based on the weight coefficient matrix) may be performed. In this case, a set value for performing a matrix operation based on a channel matrix having a transfer function of each antenna pair between transmission and reception as an element corresponds to the matrix element of the antenna weight coefficient matrix.

Embodiment 7

FIGS. 16 and 7 are diagrams illustrating embodiment 7. Here, in particular, a third example of a modulation function unit and a demodulation function unit will be described. Here, FIG. 16 is a diagram illustrating a basic configuration example of a transmission-side signal generation unit 8110 (a communication unit at a transmission side) including a modulation function unit 8300C (a modulation unit 115 and a frequency conversion unit 116) of the third example and a peripheral circuit provided in the transmission side. FIG. 17 is a diagram illustrating a basic configuration example of a receiving-side signal generation unit 8220 (a communication unit at the receiving side) including a demodulation function unit 8400C (a frequency conversion unit 225 and a demodulation unit 226) of the third example and a peripheral circuit provided at the receiving side.

Embodiment 7 (the third example of the modulation function unit and the demodulation function unit) is characterized in that an injection locking scheme is applied. In particular, embodiment 7 differs from embodiment 8 that will be described later in that a free-running frequency of the receiving-side local oscillation unit 8404 or an injection amount for injection locking is appropriately set by the second set value processing unit 7200A.

The injection locking scheme is applied for the following reasons. That is, in a case of radio transmission to which a millimeter wave band is applied, high stability of the carrier frequency is necessary when a wireless scheme (radio communication scheme) adapted for general outdoor use is applied. This means that a complex oscillation circuit having a high frequency stability circuit configuration is necessary and that an overall device configuration becomes complex. For example, when an external reference part, frequency multiplication circuit, PLL circuit or the like to realize a carrier signal at a frequency with high stability on the order of ppm (parts per million) is used, a circuit scale is great. In addition, when an overall oscillation circuit including a tank circuit (a resonance circuit including an inductor and a capacitor) is realized by a silicon integrated circuit, in fact, a tank circuit with a high Q value is difficult to form and it is necessary for the tank circuit with a high Q value to be arranged outside the integrated circuit.

However, when realizing high speed signal transmission using a wireless scheme between electronic devices arranged at a relatively short distance or within an electronic device, in a frequency band with a shorter wavelength (e.g., millimeter wave band), is considered, it is believed that it is not advisable to require a high-stability carrier frequency. Rather, it is believed that it is good to use an oscillation circuit having a simple circuit configuration by alleviating the stability of the carrier frequency and to simplify an overall device configuration. However, simply alleviating the stability of the carrier frequency may be achieved only with a modulation and demodulation scheme, but frequency variation (a difference between the carrier frequency used in the transmission circuit and the carrier frequency used in the reception circuit) becomes a problem and appropriate signal transmission may not be performed (appropriate demodulation may not be performed).

On the other hand, if an injection locking scheme is applied, when radio signal transmission is performed between devices or within the device (housing), the transmission target signal can be appropriately demodulated at the receiving side even when stability of a frequency of a carrier signal for modulation is alleviated. Since the stability of the frequency of the carrier signal may be alleviated, an oscillation circuit having a simple circuit configuration can be used and an overall device configuration can be simplified. Since the stability of the frequency of the carrier signal can be alleviated, an overall oscillation circuit including a tank circuit (or a frequency conversion unit) may be formed on the same semiconductor substrate. A one-chip oscillation circuit (semiconductor integrated circuit) embedding a tank circuit or a one-chip communication circuit (semiconductor integrated circuit) embedding a tank circuit is realized. Hereinafter, this will be described in detail.

As a solution to a problem associated with embodiment 1 (the first example of the modulation function unit and the demodulation function unit), the demodulation function unit 8400C of the third example employs an injection locking scheme. The injection locking scheme is used as a carrier synchronization means such that a simple circuit with low power consumption can be configured. When the injection locking scheme is used, preferably, a modulation target signal is subjected to an appropriate correction process in advance so that the injection locking is facilitated at the receiving side. Typically, a component near DC of the modulation target signal is suppressed and then modulated, that is, a low frequency component near DC is suppressed (cut) and then modulated, such that a modulation signal component near a carrier frequency fc can be reduced as much as possible and the injection locking is facilitated at the receiving side. In the case of a digital scheme, for example, DC-free coding is performed so that a DC component is not generated due to continuation of the same codes.

In addition, it is desirable to transmit a reference carrier frequency corresponding to a carrier signal used for modulation, together with the transmission signal modulated into the millimeter wave band (a modulated signal), to be used as an injection locking reference at the receiving side. The reference carrier signal is a signal whose frequency and phase (and more preferably amplitude) are always constant (invariant), which corresponds to the carrier signal used for modulation output from the transmission-side local oscillation unit 8304. Typically, the reference carrier signal is a carrier signal used for modulation, but may be at least synchronized to the carrier signal and the present invention is not limited thereto. For example, the reference carrier signal is a signal at a different frequency (e.g., harmonic signal) or at the same frequency synchronized to the carrier signal used for modulation, but may be a signal having a different phase (e.g., an orthogonal carrier signal orthogonal to the carrier signal used for modulation).

In some modulation schemes or modulation circuits, when a carrier signal is contained in an output signal of the modulation circuit (e.g., standard amplitude modulation or ASK), a carrier may be suppressed (e.g., amplitude modulation, ASK or PSK of a carrier suppression scheme). Accordingly, a circuit configuration for transmitting the reference carrier signal together with the signal modulated into the millimeter wave band from the transmission side may be a circuit configuration according to a type of reference carrier signal (whether a carrier signal used for modulation is to be used as a reference carrier signal), a modulation scheme, or a modulation circuit.

Modulation Function Unit

Third Example

In FIG. 16, a configuration example of a third example of the modulation function unit 8300C and a peripheral circuit is shown. A modulation target signal processing unit 8301 is provided in a preceding stage of the modulation function unit 8300C (frequency mixing unit 8302). Each example shown in FIG. 16 is a configuration example corresponding to a case of a digital scheme, and the modulation target signal processing unit 8301 performs DC-free coding such as 8-9 conversion coding (8B/9Bcoding), 8-10 conversion coding (8B/10Bcoding) or a scrambling process on data supplied from a parallel-serial conversion unit 8114 in order to prevent a DC component from being generated due to continuation of the same codes. Although not shown, in an analog modulation scheme, a modulation target signal may be subjected to a high pass filtering process (or a band pass filtering process) in advance.

Here, in basic configuration 1 shown in FIG. 16(A), a reference carrier signal processing unit 8306 and a signal synthesis unit 8308 are provided, and a manipulation to synthesize (mix) an output signal (transmission signal) of a modulation circuit (a first frequency conversion unit) and a reference carrier signal is performed. This is a universal scheme that does not depend on a type of reference carrier signal, a modulation scheme, or a modulation circuit. However, according to a phase of the reference carrier signal, the synthesized reference carrier signal may be detected as a DC offset component upon demodulation at the receiving side and affect reproducibility of a baseband signal. In this case, the DC component is suppressed at the receiving side. In other words, it is desirable to use a reference carrier signal in a good phase relationship even when a DC offset component is not eliminated upon demodulation.

The reference carrier signal processing unit 8306 adjusts phase or amplitude of the modulation carrier signal supplied from the transmission-side local oscillation unit 8304, as necessary, and supplies an output signal as a reference carrier signal to the signal synthesis unit 8308. For example, in essence, in the case of a scheme in which a carrier signal with a constant frequency or phase is not contained in an output signal of the frequency mixing unit 8302 (a scheme for modulating frequency or phase) or when a harmonic signal of a carrier signal used for modulation or an orthogonal carrier signal is used as the reference carrier signal, basic configuration 1 is employed.

In this case, a harmonic signal of a carrier signal used for modulation or an orthogonal carrier signal can be used as the reference carrier signal and the amplitude or phase of the transmission signal and the reference carrier signal can be separately adjusted. That is, the amplification unit 8117 performs gain adjustment based on the amplitude of the transmission signal and, in this case, simultaneously adjusts the amplitude of the reference carrier signal, but the reference carrier signal processing unit 8306 can adjust only the amplitude of the reference carrier signal to a preferred amplitude in relation to the injection locking.

In basic configuration 1, the signal synthesis unit 8308 is provided to synthesize the transmission signal with the reference carrier signal, but this is not essential. As in basic configuration 2 shown in FIG. 16(B), the transmission signal and the reference carrier signal may be sent to the receiving side via separate antennas 8136_1 and 8136_2 and preferably via separate millimeter wave signal transmission paths 9 so that interference does not occur. In basic configuration 2, a reference carrier signal also having amplitude that is always constant can be transmitted to the receiving side and basic configuration 2 is an optimal scheme in terms of ease of the injection locking.

Basic configuration 1 and basic configuration 2 have an advantage in that the amplitude or phase of the carrier signal used for modulation (in other words, a transmitted transmission signal) and the reference carrier signal can be separately adjusted. Accordingly, basic configuration 1 and basic configuration 2 are configurations suitable for preventing a DC offset from being generated in a demodulation output by causing a modulation axis carrying transmission target information and an axis of the reference carrier signal used for injection locking (reference carrier axis) to be not in phase, but with different phases.

When a carrier signal whose frequency or phase is always constant can be contained in an output signal of frequency mixing unit 8302, basic configuration 3 shown in FIG. 16(C) in which the reference carrier signal processing unit 8306 and the signal synthesis unit 8308 are not included may be employed. Only the transmission signal modulated into the millimeter wave band by the frequency mixing unit 8302 may be transmitted to the receiving side, the carrier signal contained in the transmission signal may be treated as the reference carrier signal, and another reference carrier signal need not be added to the output signal of the frequency mixing unit 8302 and transmitted to the receiving side. For example, in the case of a scheme of modulating amplitude (e.g., ASK scheme), basic configuration 3 may be employed. In this case, preferably, a DC-free process is performed in advance.

However, even in the amplitude modulation or the ASK, the frequency mixing unit 8302 is positively realized as a circuit of a carrier suppression scheme (e.g., a balanced modulation circuit or a double balanced modulation circuit), and the reference carrier signal may be transmitted together with the output signal (a transmission signal), as in basic configuration 1 or basic configuration 2.

In any of basic configurations 1 to 3, a scheme for receiving, from the receiving side, information based on the injection locking detection result at the receiving side and adjusting the frequency of the modulation carrier signal or the phase of the millimeter wave (particularly, a signal used for an injection signal at a receiving side, such as the reference carrier signal or the transmission signal) or the reference carrier signal can be employed. Information transmission from the receiving side to the transmission side need not necessarily be performed in the millimeter wave, but may be performed in any scheme, such as via a cable or wirelessly. Since optimal information for suitably realizing injection locking is notified from the receiving side, for example, the first set value determination unit 7110 of the first set value processing unit 7100G receives the information, determines an optimal set value based on this information, and holds the determined value in the first set value storage unit 7130 in advance. The first operation control unit 7150 reads the set value stored in the first set value storage unit 7130, and controls the transmission-side local oscillation unit 8304, the reference carrier signal processing unit 8306, the amplification unit 8117 and the like based on the set value. By doing so, the transmission side can adjust, for example, the carrier signal level to an appropriate level so that the receiving side can suitably realize the injection locking. A second set value processing unit 7200G at a receiving side that will be described later may directly control respective function units at a transmission side (some or all of function units as control targets) without providing the first set value processing unit 7100G.

In any of basic configurations 1 to 3, the frequency of the modulation carrier signal (or the reference carrier signal) is adjusted by controlling the transmission-side local oscillation unit 8304. In basic configurations 1 and 2, the amplitude or phase of the reference carrier signal is adjusted by controlling the reference carrier signal processing unit 8306 or the amplification unit 8117. Further, in basic configuration 1, the amplitude of the reference carrier signal may be adjusted by the amplification unit 8117 for adjusting the transmission power, but in this case, there is a drawback in that the amplitude of the transmission signal is adjusted together.

In basic configuration 3 suitable for a scheme of modulating amplitude (analog amplitude modulation or digital ASK), a DC component for the modulation target signal is adjusted, but the carrier frequency component (corresponding to amplitude of the reference carrier signal) in the transmission signal is adjusted by controlling a modulation degree (modulation rate). For example, a case in which a signal in which a DC component is added to a transmission target signal is modulated is considered. In this case, when a modulation degree is constant, the DC component is controlled to thereby adjust the amplitude of the reference carrier signal. In addition, when the DC component is constant, the modulation degree is controlled to thereby adjust the amplitude of the reference carrier signal.

However, in this case, a signal in which the transmission signal obtained by modulating the carrier signal with the transmission target signal is mixed with the carrier signal used for modulation is automatically transmitted only by transmitting only the transmission signal output from the frequency mixing unit 8302 to the receiving side without using the signal synthesis unit 8308. Inevitably, the reference carrier signal is carried on the same axis as a modulation axis (in phase with the modulation axis) carrying the transmission target signal of the transmission signal. At the receiving side, the carrier frequency component in the transmission signal is used as the reference carrier signal for injection locking. Further, when considered on a phase plane, the modulation axis carrying the transmission target information and an axis of the carrier frequency component (reference carrier signal) used for injection locking are in phase, and a DC offset caused by the carrier frequency component (reference carrier signal) is generated in the demodulation output.

Although not shown, in the case of the scheme for modulating phase or frequency, only the modulation signal modulated (frequency-converted) into the millimeter wave band by the modulation function unit 8300 (e.g., using the orthogonal modulation) may be transmitted. However, whether the injection locking is obtained at the receiving side is associated with an injection level (an amplitude level of the reference carrier signal input to an oscillation circuit of an injection locking scheme), a modulation scheme, a data rate, a carrier frequency, or the like, and an application range is limited.

Demodulation Function Unit

Third Example

In FIG. 17, a configuration example of a third example of the demodulation function unit 8400C and a peripheral circuit is shown. A demodulation function unit 8400C of the third example includes a receiving-side local oscillation unit 8404, and supplies an injection signal to the receiving-side local oscillation unit 8404 to acquire an output signal corresponding to a carrier signal used for modulation at the transmission side. Typically, an oscillation output signal synchronized to the carrier signal used at the transmission side is acquired. The received millimeter wave transmission signal and the carrier signal for demodulation (recovered carrier signal) based on the output signal of the receiving-side local oscillation unit 8404 are multiplied (locking detected) by the frequency mixing unit 8402 to acquire a locking detection signal. A high frequency component of this locking detection signal is eliminated by the filtering processing unit 8410 and a waveform (baseband signal) of the input signal transmitted from the transmission side is obtained. Other descriptions are the same as in the first example.

The frequency mixing unit 8402 performs frequency conversion (down-conversion and demodulation) through locking detection. Advantages are obtained in that phase modulation or frequency modulation can be applied, for example, through development into orthogonal detection with an excellent bit error rate characteristic.

When a recovered carrier signal based on an output signal of the receiving-side local oscillation unit 8404 is supplied to the frequency mixing unit 8402 to perform demodulation, it is necessary to consider the phase shift and a phase adjustment circuit must necessarily be provided in a locking detection system. This is, for example, because there is a phase difference between the received transmission signal and the oscillation output signal output by the receiving-side local oscillation unit 8404 through injection locking.

In this example, a phase and amplitude adjustment unit 8430 including a functional unit (amplitude adjustment unit) for adjusting injection amplitude as well as a functional unit (phase adjustment unit) of the phase adjustment circuit is provided in the demodulation function unit 8400C. The phase adjustment unit may be provided for either of an injection signal to the receiving-side local oscillation unit 8404 and an output signal of the receiving-side local oscillation unit 8404 or may be applied to both of the signals. The receiving-side local oscillation unit 8404 and the phase and amplitude adjustment unit 8430 constitutes a carrier recovery unit 8403, which functions as (a second) carrier signal generation unit at a demodulation side for generating a demodulation carrier signal synchronized with the modulation carrier signal and supplying the a demodulation carrier signal to the frequency mixing unit 8402.

As indicated by a dotted line in FIG. 17, a DC component suppression unit 8407 for eliminating a DC offset component that may be contained in a locking detection signal according to a phase of the reference carrier signal synthesized in the transmission signal (specifically, when the modulation signal and the reference carrier signal are in phase) is provided in a subsequent stage of the frequency mixing unit 8402. The DC component suppression unit 8407 suppresses an unnecessary DC component (DC offset component) contained in the locking detection signal output from the frequency mixing unit 8402. For example, when the reference carrier signal is transmitted together with a modulation signal from the transmission side to the receiving side, a great DC offset component may be generated in the locking detection signal according to a phase relationship between the modulation signal and the reference carrier signal. The DC component suppression unit 8407 functions to eliminate the DC offset component.

When the injection signal is supplied to the receiving-side local oscillation unit 8404, the received millimeter wave signal may be supplied as the injection signal to the receiving-side local oscillation unit 8404, as in basic configuration 1 shown in FIG. 17(A). If a low frequency component of the modulation target signal is suppressed (e.g., DC-free coding is performed) in advance and then modulated at the transmission side such that a modulation signal component does not exist near the carrier frequency, basic configuration 1 may be used.

As in basic configuration 2 shown in FIG. 17(B), a frequency separation unit 8401 may be provided to frequency-separate the transmission signal and the reference carrier signal from the received millimeter wave signal and supply the separated reference carrier signal component as the injection signal to the receiving-side local oscillation unit 8404. Since a frequency component unnecessary for injection locking is suppressed in advance and then supplied, it is easy to obtain the injection locking.

A basic configuration 3 shown in FIG. 17(C) corresponds to the case in which the transmission side employs basic configuration 2 shown in FIG. 16(B). The transmission signal and the reference carrier signal are received using separate antennas 8236_1 and 8236_2 and preferably separate millimeter wave signal transmission paths 9 so that interference does not occur. Basic configuration 3 at the receiving side is an optimal scheme in that a reference carrier signal with amplitude that is also always constant can be supplied to the receiving-side local oscillation unit 8404 and it is easy to obtain the injection locking.

The millimeter wave signal received by the antenna 8236 is supplied to the frequency mixing unit 8402 and the receiving-side local oscillation unit 8404 by a divider (splitter) that is not shown. The receiving-side local oscillation unit 8404 functions to perform injection locking and outputs a recovered carrier signal synchronized to a carrier signal used for modulation at the transmission side.

Whether the injection locking is obtained at the receiving side (the recovered carrier signal synchronized to a carrier signal used for modulation at the transmission side can be acquired) is associated with an injection level (an amplitude level of the reference carrier signal input to an oscillation circuit of an injection locking scheme), a modulation scheme, a data rate, a carrier frequency, or the like. In addition, it is important to reduce components in a band in which injection locking is possible in the transmission signal. For this, it is desirable to cause a center (average) frequency of the transmission signal to be substantially the same as the carrier frequency and a center (average) phase to be substantially the same as zero (an origin on a phase plane) by performing DC-free coding at the transmission side.

Although not shown, in a scheme in which the transmission side modulates a phase or a frequency, the same configuration as basic configuration 1 may be employed. However, a configuration of the demodulation function unit 8400 is, in fact, a demodulation circuit corresponding to phase modulation or frequency modulation, such as an orthogonal detection circuit.

In any of basic configurations 1 to 3, it is important to control a locking range by controlling an injection voltage V1 or a free-running oscillation frequency fo, in other words, to adjust the injection voltage V1 or the free-running oscillation frequency fo so that the injection locking is obtained. For example, an injection locking control unit 8440 for performing a process based on a signal of a subsequent stage of the frequency mixing unit 8402 (in the example of FIG. 17, a signal of a preceding stage of the DC component suppression unit 8407) is provided. The injection locking control unit 8440 has a function of an injection locking detection unit for detecting information indicating an injection locked state of the carrier recovery unit 8403 (the receiving-side local oscillation unit 8404). In the present embodiment, the injection locking control unit 8440 may be configured of a second set value processing unit 7200G, as necessary. This will be described in detail later.

The injection locking control unit 8440 judges the injection locked state based on the locking detection signal (baseband signal) acquired by the frequency mixing unit 8402 and controls each unit as an adjustment target so that the injection locking is obtained, based on the judgment result. In this case, either or both of a scheme for coping at the receiving side and a scheme for coping at the transmission side by supplying information contributing to control (a detection signal and the like that is a source of control information, as well as the control information) to the transmission side, as indicated by a dotted line in FIG. 17, may be employed. In any case, an injection locking adjustment unit for performing locking adjustment so that the carrier signal for demodulation generated by the receiving-side local oscillation unit 8404 is synchronized with the carrier signal for modulation generated by the transmission-side local oscillation unit 8304 is provided. For example, the reference carrier signal processing unit 8306 or the injection locking control unit 8440 function as the injection locking adjustment unit. In the scheme for coping at the receiving side, since the injection locking cannot be obtained at the receiving side when the millimeter wave signal (particularly, the reference carrier signal component) is not transmitted at a certain intensity, there are drawbacks in power consumption or interference resistance, but there is an advantage in that it is possible to cope solely at the receiving side. On the other hand, in the scheme for coping at the transmission side, information transmission from the receiving side to the transmission side becomes necessary, but there are advantages in that the millimeter wave signal can be transmitted with such a minimum power that the injection locking can be obtained at the receiving side, power consumption can be reduced, and interference resistance can be improved.

As the injection locking scheme is applied in signal transmission within a housing (device) or signal transmission between devices, the following advantages are obtained. The transmission-side local oscillation unit 8304 at the transmission side can loosen a requirement of stability of the frequency of the carrier signal used for modulation. The receiving-side local oscillation unit 8404 at a side of performing injection locking needs to have a low Q value to follow a frequency variation at the transmission side. A detailed description is omitted, but in the injection locking scheme, the Q value has an influence on the locking range and when the Q value is small, the locking range is broadened. This is convenient when the entire receiving-side local oscillation unit 8404 including a tank circuit (an inductance component and a capacitance component) is formed on a CMOS. At a receiving side, the receiving-side local oscillation unit 8404 may have a small Q value, but the same applies to the transmission-side local oscillation unit 8304 at the transmission side, and the transmission-side local oscillation unit 8304 may have low frequency stability and a small Q value.

A CMOS is further miniaturized and an operation frequency of the CMOS increases. It is desirable to use a high carrier frequency to realize a small transmission device in a broader band. Since the injection locking scheme of the present example can loosen a requirement for oscillation frequency stability, a carrier signal at a higher frequency can be easily used. When a frequency is high but low frequency stability is allowed (in other words, a small Q value), it is unnecessary to use a high-stability frequency multiplication circuit or a PLL circuit for carrier synchronization in order to realize a carrier signal with high stability at a high frequency, and a communication function can be briefly realized with a small circuit scale at a higher carrier frequency. Since the receiving-side local oscillation unit 8404 acquires the recovered carrier signal synchronized to a carrier signal used at the transmission side and supplies the carrier signal to the frequency mixing unit 8402 to perform locking detection, a band pass filter for wavelength selection may not be provided in a preceding stage of the frequency mixing unit 8402. For a reception frequency selection operation, in fact, reception frequency selection is easy when control for completely synchronizing local oscillation circuits for transmission and reception (so that the injection locking is obtained) is performed. In a millimeter wave band, a time taken for injection locking is shorter in comparison with a low frequency and the reception frequency selection operation can be completed in a short time.

Since the local oscillation circuits for transmission and reception are completely synchronized, a changed component of the carrier frequency at the transmission side is eliminated. A frequency shift scheme of the present embodiment that will be described later is vulnerable to phase shift, but this drawback is resolved when the injection locking scheme is applied. When the injection locking is applied together with locking detection, interference does not occur when a plurality of transmission and reception pairs simultaneously perform independent transmission, for example, when multi-channel or full-duplex bi-directionality is realized, even when a band pass filter for wavelength selection is not used at a receiving side.

FIG. 18 is a diagram showing an example of a configuration of the phase and amplitude adjustment unit 8406. Here, transmission information and a reference carrier signal are assumed to be in an orthogonal relationship. Either of the configuration in which only the phase adjustment is performed as in the first example shown in FIG. 18(A) and the configuration in which both the phase and the amplitude are adjusted as in the second example shown in FIG. 18(B) may be employed as the phase and amplitude adjustment unit 8406. When both the phase and the amplitude are adjusted, the adjustment may be performed at the injection side of the receiving-side local oscillation unit 8404 or at an oscillation output. As in the third example shown in FIG. 18(C), in order to adjust whether the injection locking is appropriately functioned, the injection amplitude may be adjusted at the injection side of the receiving-side local oscillation unit 8404.

Figure 19:
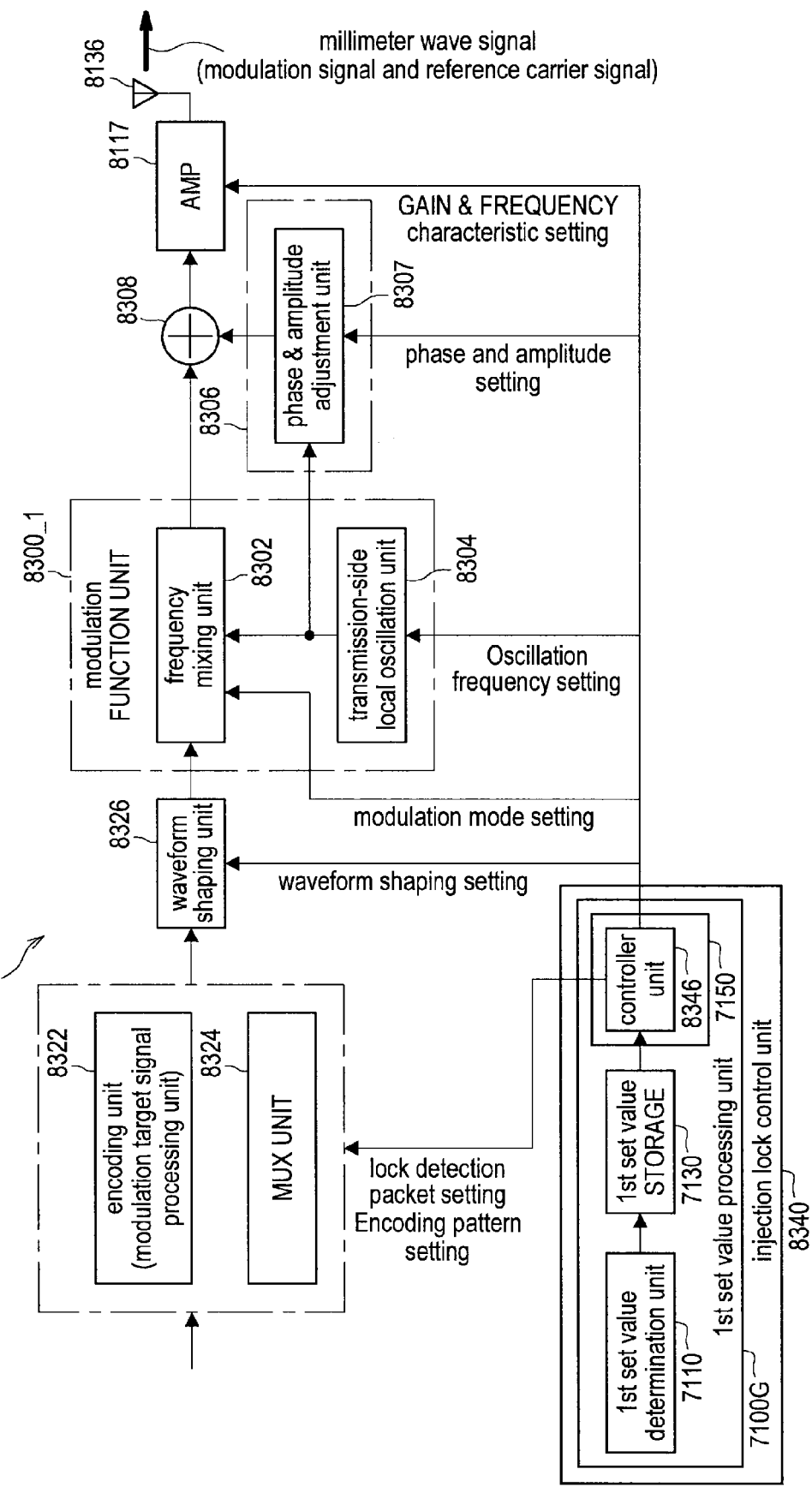
FIG. 19 is a diagram illustrating a first example of a configuration example of a transmitter to which an injection locking scheme is applied.
Figure 20:
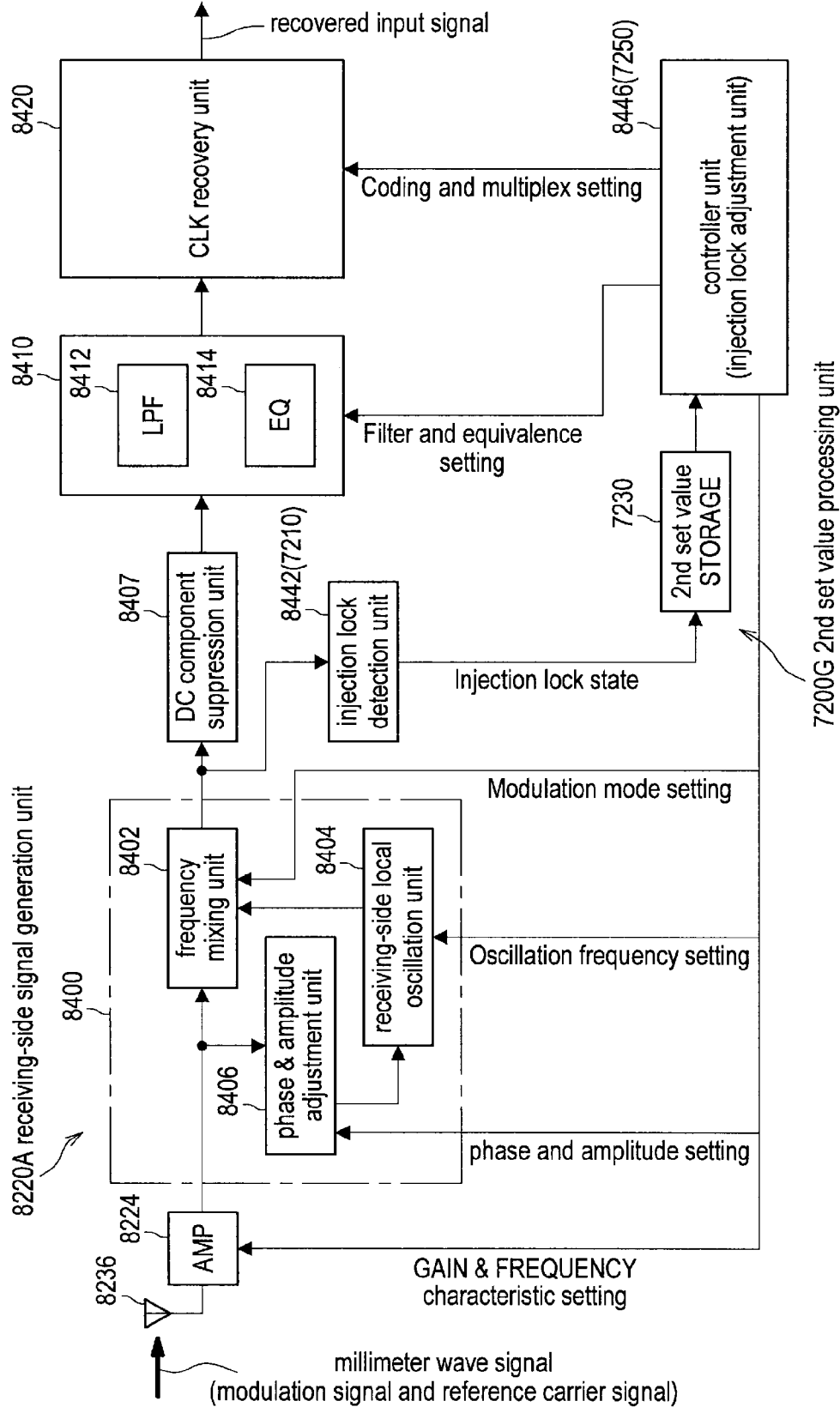
FIG. 20 is a diagram illustrating a first example of a configuration example of a receiver to which an injection locking scheme is applied.

FIG. 19 is a diagram illustrating a first example of a configuration example of a transmitter side to which the injection locking scheme is applied. FIG. 20 is a diagram illustrating a first example of a configuration example of a receiver side to which the injection locking scheme is applied. The first example is an aspect in which a scheme for performing control so that the injection locking is obtained at a receiving side is applied.

In FIG. 19, a configuration of the transmission-side signal generation unit 8110 of the first example (corresponding to the transmission-side signal generation unit 110) is shown. The transmission-side signal generation unit 8110 includes an encoding unit 8322, a multiplexer unit 8324, and a waveform shaping unit 8326 between a parallel-serial conversion unit 8114 and a modulation function unit 8300 that are not shown. It is unnecessary to include all the functional units, which may be provided when such a function is necessary.

The transmission-side signal generation unit 8110 includes an injection locking control unit 8340 for controlling each functional unit. The injection locking control unit 8340 of the present configuration employs a configuration of the first set value processing unit 7100G, and the first set value determination unit 7110 determines a set value suitable for injection locking in advance, which is stored in the first set value storage unit 7130. The controller unit 8346 is one example of the first operation control unit 7150 performing encoding or multiplex setting, waveform shaping setting, modulation mode setting, oscillation frequency setting, setting of a phase or amplitude of the reference carrier signal, setting of a gain and a frequency characteristic of the amplification unit 8117, setting of an antenna characteristic, etc. based on the set value stored in the first set value storage unit 7130. Each setting information is supplied to a corresponding functional unit. The injection locking control unit 8340 employs the first basic configuration as the first set value processing unit 7100G, but may include the first I/O interface unit 7170 in place of the first set value determination unit 7110, as in the second basic configuration.

The encoding unit 8322 performs a coding process, such as error correction, on data serialized by the parallel-serial conversion unit 8114 that is not shown, based on the setting information for an encoding pattern from the controller unit 8346. In this case, the encoding unit 8322 applies, as a function of the modulation target signal processing unit 8301, DC-free coding such as 8-9 conversion code or 8-10 conversion code, such that a modulation signal component does not exist near the carrier frequency and the injection locking at the receiving side is facilitated.

The multiplexer unit 8324 packetizes data. When the injection locking detection unit at the receiver side performs injection locking detection with a known pattern correlation, the multiplexer unit 8324 regularly inserts a known signal waveform or a known data pattern (e.g., pseudo-random signal; PN signal) base on the setting information for the packet for locking detection from the controller unit 8346.

The waveform shaping unit 8326 performs a waveform shaping process such as frequency characteristic correction, pre-emphasis, and band limit, based on the setting information for the waveform shaping from the controller unit 8346.

The transmission-side signal generation unit 8110 includes a modulation function unit 8300 including a frequency mixing unit (modulation circuit) 8302 and a transmission-side local oscillation unit (transmission side oscillation unit) 8304. In addition, the transmission-side signal generation unit 8110A includes a reference carrier signal processing unit 8306 including a phase and amplitude adjustment circuit 8307, and a signal synthesis unit 8308, in addition to the modulation function unit 8300. In this example, the reference carrier signal processing unit 8306 uses the carrier signal output from the transmission-side local oscillation unit 8304 as a reference carrier signal, adjusts amplitude and phase of the reference carrier signal using the phase and amplitude adjustment circuit 8307, and supplies the resultant reference carrier signal to the signal synthesis unit 8308.

Here, in the configuration shown in FIG. 19, the transmission-side local oscillation unit 8304 generates a carrier signal used for modulation on the CMOS chip using a tank circuit on the CMOS chip. Although not shown, when there is a clock signal used as a reference in the first communication device 100, the modulation function unit 8300 may include a frequency multiplication unit 8303 in a preceding stage of the transmission-side local oscillation unit 8304. The frequency multiplication unit 8303 multiplies "a clock signal used as a reference" supplied from a clock signal generation unit that is not shown, and supplies a multiplication signal to the transmission-side local oscillation unit 8304. In this case, the transmission-side local oscillation unit 8304 functions as a synchronization oscillation circuit and generates a carrier signal used for modulation in synchronization with the multiplication signal.

The frequency mixing unit 8302 modulates the carrier signal generated by the transmission-side local oscillation unit 8304 with the processed input signal from the waveform shaping unit 8326 and supplies the resultant signal to the signal synthesis unit 8308. The phase and amplitude adjustment circuit 8307 sets a phase and an amplitude of a transmitted reference carrier signal based on phase and amplitude setting information from the controller unit 8346.

The signal synthesis unit 8308 is provided to transmit the reference carrier signal together with the modulation signal modulated into the millimeter wave band to the receiving side when there are one antenna 8136 and one antenna 8236. When the modulation signal generated by the frequency mixing unit 8302 and the reference carrier signal generated by the reference carrier signal processing unit 8306 are transmitted using separate antennas, the signal synthesis unit 8308 is unnecessary.

When the reference carrier signal is transmitted together with the signal modulated into the millimeter wave band to the receiving side, the signal synthesis unit 8308 synthesizes the modulation signal modulated into the millimeter wave band by the frequency mixing unit 8302 with the reference carrier signal from the phase and amplitude adjustment circuit 8307 and delivers a resultant signal to the amplification unit 8117. When only the modulation signal modulated into the millimeter wave band by the frequency mixing unit 8302 is transmitted to the receiving side, the signal synthesis unit 8308 delivers only the modulation signal modulated into the millimeter wave band by the frequency mixing unit 8302 to the amplification unit 8117 without performing the synthesis process. The amplification unit 8117 adjusts an amplitude or frequency characteristic of a transmission output of the millimeter wave signal received from the signal synthesis unit 8308, as necessary, and supplies a resultant signal to the antenna 8136.

As understood from the above-described description, when the reference carrier signal is transmitted together with the signal modulated into the millimeter wave band to the receiving side, whether the signal synthesis unit 8308 is to be functioned is associated with a modulation scheme or a circuit configuration of the frequency mixing unit 8302. The reference carrier signal can be transmitted together with the signal modulated into the millimeter wave band to the receiving side even when the signal synthesis unit 8308 is not caused to function, according to a modulation scheme or a circuit configuration of the frequency mixing unit 8302.

In the amplitude modulation or the ASK, the frequency mixing unit 8302 is positively used as a modulation circuit of a carrier suppression scheme, and the reference carrier signal generated by the transmission-side local oscillation unit 8304 may be transmitted together with an output of the frequency mixing unit 8302. In this case, harmonics of the carrier signal used for modulation can be used as the reference carrier signal and amplitude of the modulation signal and the reference carrier signal can be separately adjusted. That is, gain adjustment based on the amplitude of the modulation signal is performed in the amplification unit 8117 and in this case, amplitude of the reference carrier signal is simultaneously adjusted, but only the amplitude of the reference carrier signal may be adjusted in the phase and amplitude adjustment circuit 8307 so that a preferred amplitude is obtained in relation to the injection locking.

In FIG. 20, a configuration of the receiving-side signal generation unit 8220 (corresponding to the receiving-side signal generation unit 220) is shown. A demodulation function unit 8400, a DC component suppression unit 8407, a filtering processing unit 8410, and a clock recovery unit 8420 are the same as those described previously, and a description thereof will be omitted herein. Hereinafter, matters unique to the present configuration will be described.

The receiving-side signal generation unit 8220 includes a controller unit 8446 (one example of the second operation control unit 7250) for controlling each function unit. In addition, the receiving-side signal generation unit 8220 includes a DC component suppression unit 8407, an injection locking detection unit 8442 (one example of the second set value determination unit 7210), and a second set value storage unit 7230 in a subsequent stage of the demodulation function unit 8400. The controller unit 8446 has functions such as setting of a gain and frequency characteristic of the amplification unit 8224, setting of a phase or amplitude of a received reference carrier signal, setting of an oscillation frequency, setting of a modulation mode, setting of filter and equalization, and setting of coding and multiplexing. Each setting information is supplied to a corresponding function unit.

A circuit (e.g., a band pass filter circuit) for extracting only a reference carrier signal component may be installed in an injection signal side of the receiving-side local oscillation unit 8404 (e.g., a preceding stage of the phase and amplitude adjustment unit 8406). In this case, a modulation signal component and a reference carrier signal component are separated from the received millimeter wave signal and only the reference carrier signal component is supplied to the receiving-side local oscillation unit 8404, and accordingly, it becomes easy to obtain the injection locking.

The phase and amplitude adjustment unit 8406 sets the phase and the amplitude of the received reference carrier signal based on the phase and amplitude setting information from the controller unit 8446. While the configuration in which the phase and amplitude adjustment unit 8406 is arranged in an injection signal input terminal side of the receiving-side local oscillation unit 8404 is shown in FIG. 20, the phase and amplitude adjustment unit 8406 may be arranged on a signal path of the receiving-side local oscillation unit 8404 and the frequency mixing unit 8402 or both may be used.

The controller unit 8446 includes a functional unit of an injection locking adjustment unit for performing locking adjustment so that the demodulation carrier signal generated by the receiving-side local oscillation unit 8404 is synchronized to the modulation carrier signal, based on information indicating a state of the injection locking detected by the injection locking detection unit 8442. The injection locking detection unit 8442 and the functional unit (injection locking adjustment unit) related to injection locking adjustment of the controller unit 8446 constitute the injection locking control unit 8440.

Here, the injection locking control unit 8440 of the present configuration employs the configuration of the second set value processing unit 7200G, and the injection locking detection unit 8442 that is one example of the second set value determination unit 7210 stores information indicating a state of the detected injection locking (detection result) and a set value based on this information (detection result) in the second set value storage unit 7230. The controller unit 8446 that is one example of the second operation control unit 7250 operates each function unit of a control target (in this example, the amplification unit 224, the frequency conversion unit 225, the demodulation unit 226, and the like) based on the set value read from the second set value storage unit 7230. That is, the injection locking detection unit 8442 judges the injection locked state based on the baseband signal acquired by the frequency mixing unit 8402, and the judgment result is notified to the controller unit 8446 via the second set value storage unit 7230. "Injection locked state" refers to whether the output signal (oscillation circuit output) output from the receiving-side local oscillation unit 8404 is synchronized to the reference carrier signal at the transmission side. The oscillation circuit output being synchronized to the reference carrier signal at the transmission side is referred to as "injection locking is obtained."

The receiving-side signal generation unit 8220 controls at least one of the free-running oscillation frequency of the transmission-side local oscillation unit 8304 and the amplitude (injection amplitude) or phase (injection phase) of an injection signal directed to the receiving-side local oscillation unit 8404 so that the injection locking is obtained. A target to be controlled depends on a device configuration, and all elements need not necessarily be controlled. For example, the controller unit 8446 controls the free-running oscillation frequency of the receiving-side local oscillation unit 8404 by interworking with the detection result of the injection locking detection unit 8442 so that the injection locking is obtained, and controls injection amplitude and injection phase directed to the receiving-side local oscillation unit 8404 via the phase and amplitude adjustment unit 8406.

For example, first, the millimeter wave signal (the modulation signal or the reference carrier signal) transmitted from the transmission side via the millimeter wave signal transmission path 9 is via the antenna 8236 and is amplified by the amplification unit 8224. Amplitude and phase of a portion of the amplified millimeter wave signal are adjusted by the phase and amplitude adjustment unit 8406 and then injected to the receiving-side local oscillation unit 8404. In the frequency mixing unit 8402, the millimeter wave signal from the amplification unit 8224 is frequency-converted into a baseband signal with the output signal (recovered reference carrier signal) from the receiving-side local oscillation unit 8404. A portion of the converted baseband signal is input to the injection locking detection unit 8442, and information for judging whether the receiving-side local oscillation unit 8404 is synchronized to the reference carrier signal at the transmission side is acquired by the injection locking detection unit 8442 and notified to the controller unit 8446.

The controller unit 8446 makes a judgment as to whether the synchronization has been performed, for example, using one or both of the following two schemes, based on information of the "injection locked state" (referred to as injection locking judgment information) from the injection locking detection unit 8442.

1) The injection locking detection unit 8442 takes a correlation between the recovered waveform and a known signal waveform or a known data pattern and uses the correlation result as injection locking judgment information. The controller unit 8446 judges that the synchronization has been performed when a strong correlation is obtained.

2) The injection locking detection unit 8442 monitors the DC component of the demodulated baseband signal, and uses the monitoring result as injection locking judgment information. The controller unit 8446 judges that the synchronization has been performed when the DC component is stable.

While various schemes may be employed for the mechanism 1) or 2), a detailed description will be omitted herein. In addition, a mechanism other than 1) and 2) shown herein may be considered as a judgment scheme as to whether synchronization is performed, and may be employed in the present embodiment.

When the controller unit 8446 determines that the injection locking has not been obtained, the controller unit 8446 changes the oscillation frequency setting information for the receiving-side local oscillation unit 8404 or phase and amplitude and phase setting information for the amplitude adjustment unit 8406 so that synchronization of the carrier signal used for modulation at the transmission side and the signal (oscillation circuit output) output from the receiving-side local oscillation unit 8404 is obtained (so that the injection locking is obtained), according to a prescribed procedure. Then, the controller unit 8446 iteratively performs the procedure of judging the injection locked state again until good synchronization is obtained.

The injection locking of the receiving-side local oscillation unit 8404 is correctly performed and the baseband signal frequency-converted (locking detected) by the frequency mixing unit 8402 is supplied to the filtering processing unit 8410. An equalizer 8414 is provided in the filtering processing unit 8410 in addition to the low pass filter 8412. The equalizer 8414 includes an equalizer (i.e., waveform equalizing) filter for applying a reduced gain to a high frequency band of the received signal, for example, to reduce the inter-symbol interference. A high frequency component of the baseband signal is eliminated by the low pass filter 8412 and the high frequency component is corrected by the equalizer 8414. The clock recovery unit 8420 performs symbol synchronization and then recovers an original input signal based on the setting information for a coding pattern and the multiplex setting from the controller unit 8446.

A CMOS is further miniaturized and an operation frequency of the CMOS increases. It is desirable to use a high carrier frequency to realize a small transmission device in a broader band. Since the injection locking scheme of the present example can loosen a requirement for oscillation frequency stability, a carrier signal at a higher frequency can be easily used. The receiving-side local oscillation unit 8404 oscillating with injection locking needs to have a low Q to follow frequency variation of the transmission side. This is convenient when the entire receiving-side local oscillation unit 8404 including a tank circuit is formed on the CMOS. It is understood that an oscillation circuit having the same circuit configuration as the receiving-side local oscillation unit 8404 may be used as the transmission-side local oscillation unit 8304, and the entire transmission-side local oscillation unit 8304 including the tank circuit may be formed on the CMOS.

Figure 21:
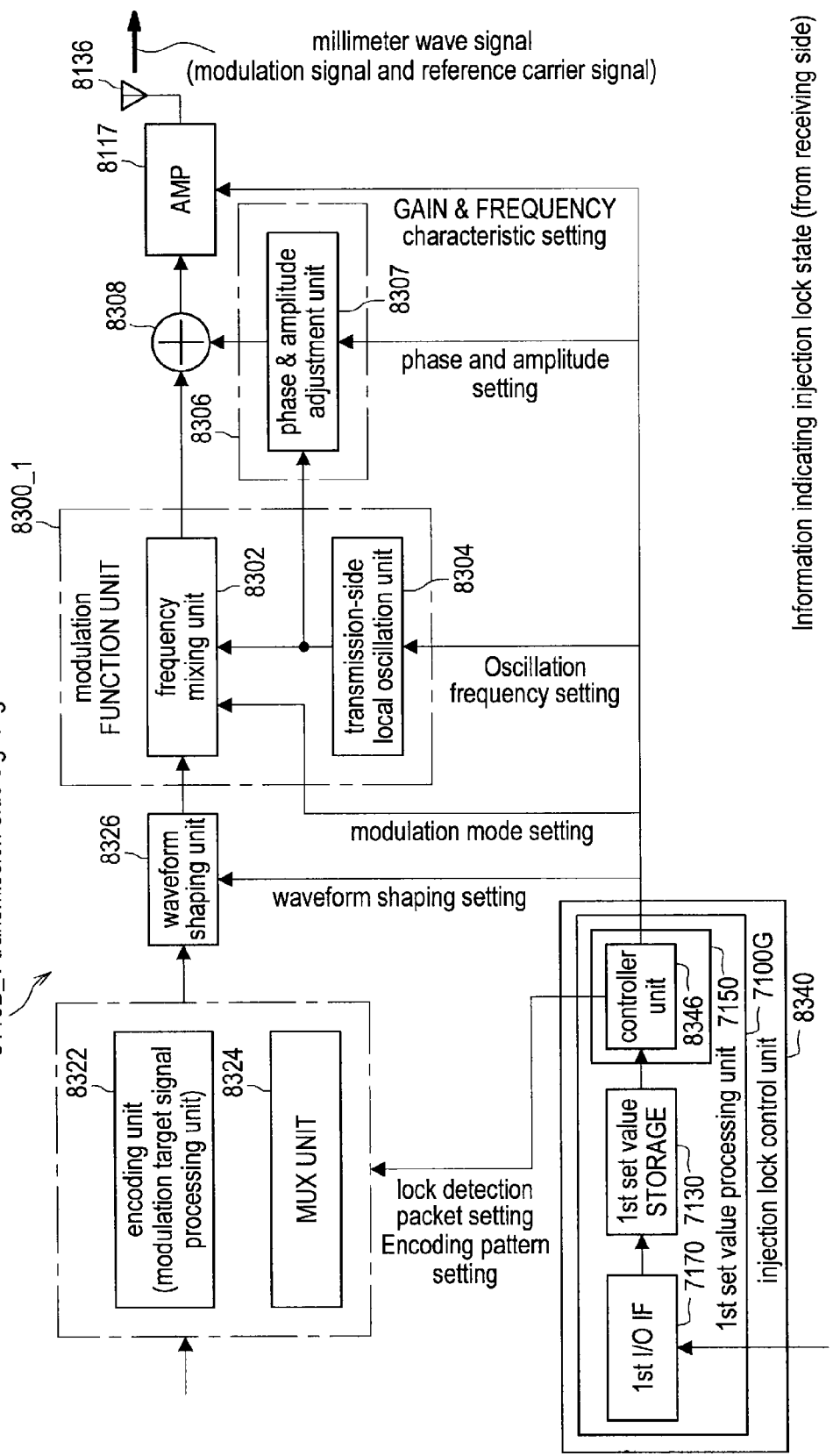
FIG. 21 is a diagram illustrating a second example (1) of a configuration example of a transmitter to which an injection locking scheme is applied.
Figure 22:
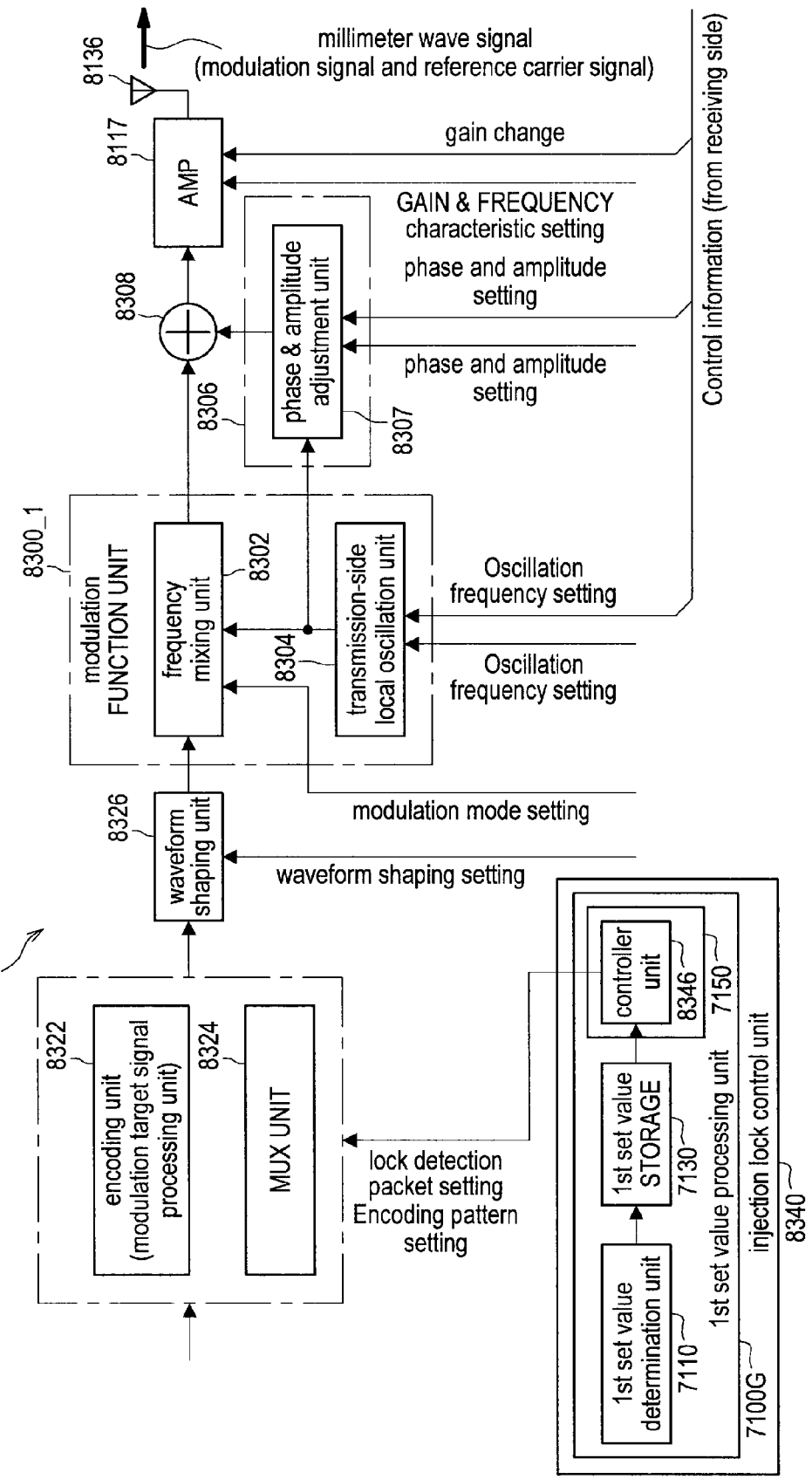
FIG. 22 is a diagram illustrating a second example (2) of a configuration example of a transmitter to which an injection locking scheme is applied.
Figure 23:
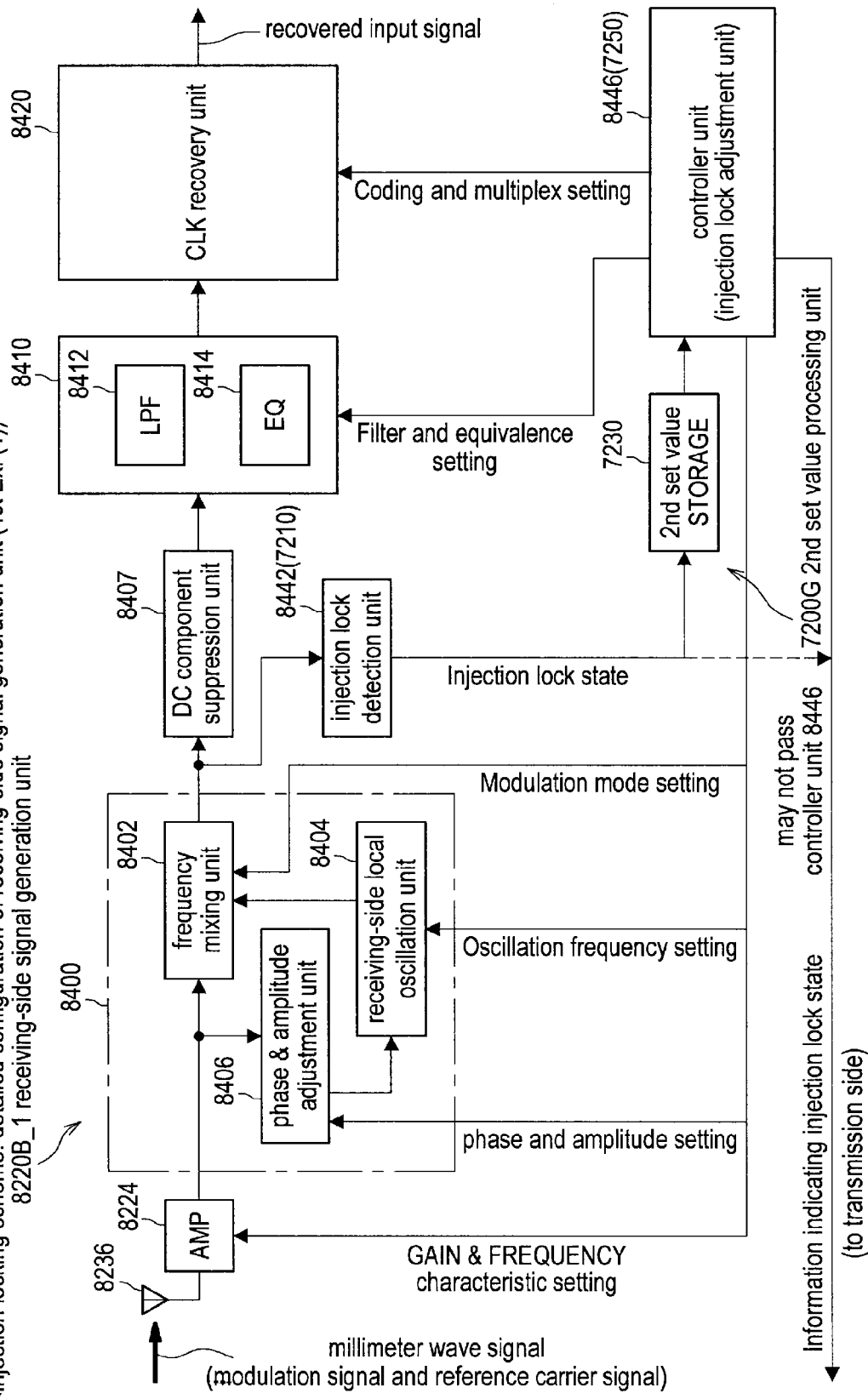
FIG. 23 is a diagram illustrating a second example (1) of a configuration example of a receiver to which an injection locking scheme is applied.
Figure 24:
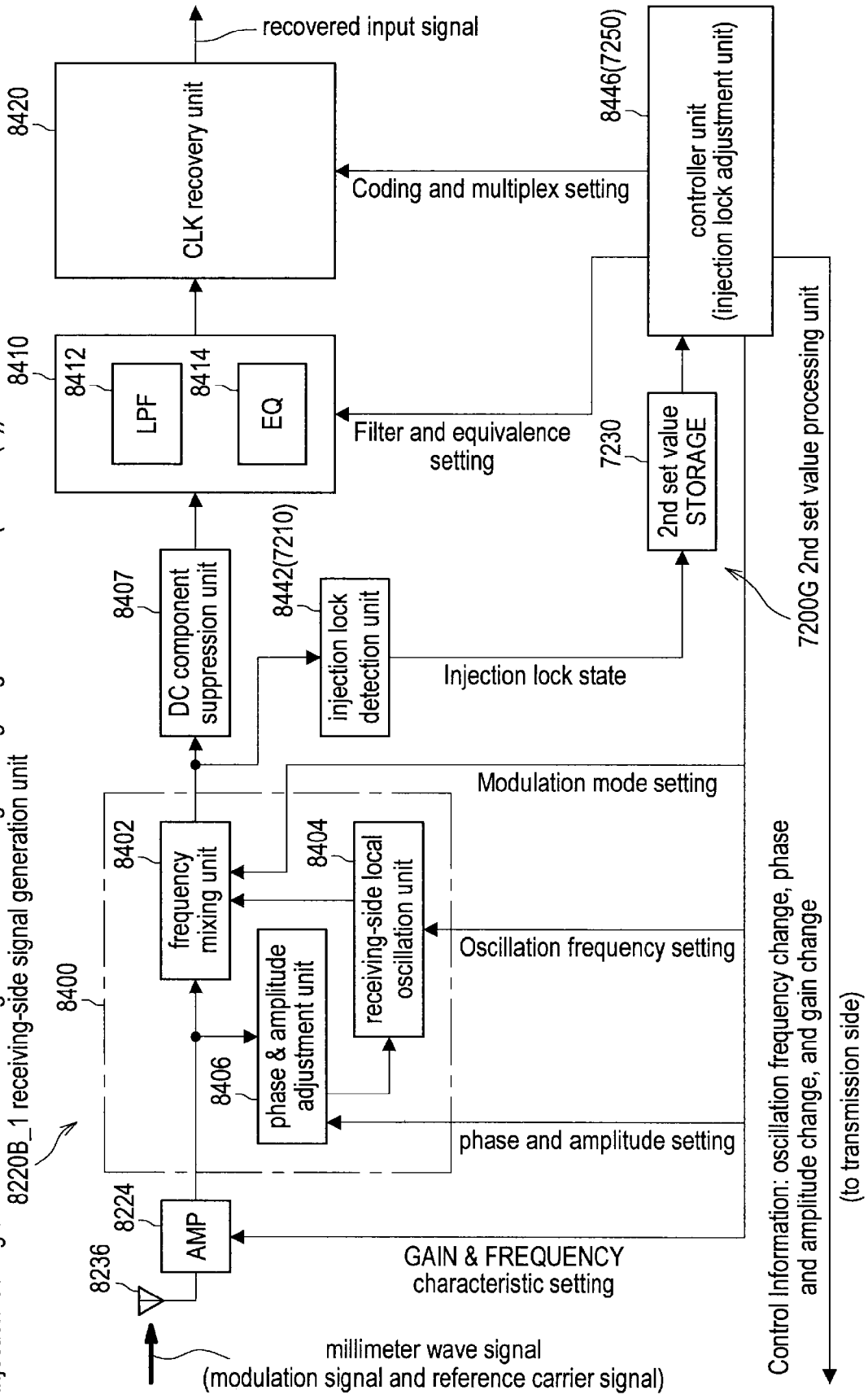
FIG. 24 is a diagram illustrating a second example (2) of a configuration example of a receiver to which an injection locking scheme is applied.

FIGS. 21 to 22 are diagrams illustrating a second example of a configuration example of a transmitter to which the injection locking scheme is applied. FIGS. 23 to 24 are diagrams illustrating a second example of a configuration example of a receiver to which the injection locking scheme is applied.

The second example is an aspect in which a scheme for adjusting a functional unit of a transmission side and performing control so that the injection locking is obtained is applied. Various configurations may be employed according to information to be transmitted from the receiving side to the transmission side or whether a control agent is arranged in the transmission side or the receiving side when adjusting the functional unit of a transmission side and performing control so that the injection locking is obtained. Hereinafter, two representative schemes, and particularly, only differences with the first example, will be described.

The second example (1) of FIGS. 21 and 23 is an aspect in which injection locking judgment information is sent to a transmission side and a control agent is at the transmission side. Specifically, the controller unit 8446 of the receiving-side signal generation unit 8220B_1 sends injection locking judgment information acquired by the injection locking detection unit 8442 to the injection locking control unit 8340 of the transmission-side signal generation unit 8110B_1. In fact, the controller unit 8446 does not become the control agent only by intervening in transmission of the injection locking judgment information to the transmission side. Alternatively, the injection locking detection unit 8442 may transmit the injection locking judgment information to the injection locking control unit 8340 of the transmission-side signal generation unit 8110B_1 without intervention of the controller unit 8446.

Here, the injection locking control unit 8340 of the present configuration employs a configuration of the first set value processing unit 7100G, and a first I/O interface unit 7170 receives the injection locking judgment information from the receiving side and stores the injection locking judgment information in the first set value storage unit 7130. A controller unit 8346, which is one example of the first operation control unit 7150 includes a function unit of an injection locking adjustment unit for performing locking adjustment, based on the information indicating a state of the injection locking detected by the injection locking detection unit 8442 at the receiving side, so that the demodulation carrier signal generated by the receiving-side local oscillation unit 8404 is synchronized to the modulation carrier signal. The injection locking detection unit 8442 and a functional unit (injection locking adjustment unit) for the injection locking adjustment of the controller unit 8346 constitute the same injection locking control unit as the injection locking control unit 8440. The controller unit 8346 controls the free-running oscillation frequency of the transmission-side local oscillation unit 8304 or transmission amplitude (transmission power) of the millimeter wave signal so that the injection locking is obtained. A scheme for a judgment as to whether the synchronization is obtained may be the same as the scheme of the controller unit 8446. The controller unit 8346 operates each function unit of a control target, as in the first example, based on the set value read from the first set value storage unit 7130.

If the controller unit 8346 judges that injection locking is not obtained, the controller unit 8346 changes, oscillation frequency setting information for the transmission-side local oscillation unit 8304 or amplitude and phase setting information for the phase and amplitude adjustment circuit 8307 and changes gain setting information for the amplification unit 8117 according to a prescribed procedure. When the amplitude modulation or the ASK scheme is employed, amplitude of a non-modulated component of the carrier signal contained in the millimeter wave signal may be adjusted by controlling a modulation degree. Then, the controller unit 8346 iteratively performs a procedure of judging the injection locked state again until good synchronization is obtained.

Meanwhile, a second example (2) of FIGS. 22 and 24 is a configuration in which a control agent is at a receiving side, and a control command is sent to a transmission so that the transmission side is controlled from the receiving side. Specifically, the controller unit 8446 judges that the synchronization has been obtained based on the injection locking judgment information acquired by the injection locking detection unit 8442. If it is judged that the injection locking is not obtained, a control command to control the modulation function unit 8300 and the amplification unit 8117 is sent to the transmission side. That is, the controller unit 8446 directly controls the modulation function unit 8300 and the amplification unit 8117. In other words, the controller unit 8346 performs each initial setting of the oscillation frequency and the phase or amplitude of the reference carrier signal for the modulation function unit 8300 and performs initial setting of the gain for the amplification unit 8117, but does not perform control for changing the setting information for the injection locking.

When the controller unit 8446 determines that the injection locking is not obtained, the controller unit 8446 changes the oscillation frequency setting information for the transmission-side local oscillation unit 8304 or the amplitude and phase setting information for the phase and amplitude adjustment circuit 8307 and changes the gain setting information for the amplification unit 8117 according to a prescribed procedure, similar to the controller unit 8346 of the first example. When the amplitude modulation or the ASK scheme is employed, the amplitude of a non-modulated component of the carrier signal contained in the millimeter wave signal may be adjusted by controlling a modulation degree. Then, the controller unit 8446 iteratively performs a procedure of judging the injection locked state again until good synchronization is obtained.

Here, since a communication environment is invariant (fixed) in "radio transmission within a device or between devices," parameter setting for injection locking may be invariant (fixed). For example, when the value stored in the first set value storage unit 7130 or the second set value storage unit 7230 is determined so that the injection locking state is optimal in product shipment, injection locking control may be executed in a subsequent operation based on the value stored in the first set value storage unit 7130 or the second set value storage unit 7230. It is unnecessary to perform constantly monitoring using the first set value storage unit 7130 or the second set value storage unit 7230 and perform control based on the monitoring result. Accordingly, since the control in the controller unit 8346 or the controller unit 8446 does not need to be dynamically, adaptively and frequently performed, unlike general radio communication, overhead due to the control can be reduced in comparison with the general radio communication and small size, low power consumption, and high speed can be realized.

[Relationship Between Injection Signal and Oscillation Output Signal]

In FIG. 25, a phase relationship among respective signals in injection locking is shown. Here, basically, the injection signal (here, reference carrier signal) is in phase with the carrier signal used for modulation.

As an operation of the receiving-side local oscillation unit 8404, two modes of an injection locking mode and an amplifier mode may be employed. When an injection locking scheme is employed, the injection locking mode is used as a basic operation, and the amplifier mode is used in a special case. The special case is a case in which the carrier signal used for modulation and the reference carrier signal differ in phase (typically, are in an orthogonal relationship) when the reference carrier signal is used for the injection signal. A phase difference between an output signal Vout (demodulation carrier signal) of the receiving-side local oscillation unit 8404 when the injection locking is performed and the free-running output Vo of the receiving-side local oscillation unit 8404 is $\psi$, and a phase difference between the injection signal Sinj to the receiving-side local oscillation unit 8404 and the free-running output Vo of the receiving-side local oscillation unit 8404 is "$\theta+\psi$."

When the receiving-side local oscillation unit 8404 operates in the injection locking mode, there is a phase difference between the received reference carrier signal and the oscillation output signal output from the receiving-side local oscillation unit 8404 by the injection locking, as shown. For the frequency mixing unit 8402 to perform orthogonal detection, it is necessary to correct this phase difference. As seen from FIG. 25, a phase shift amount by which the phase and amplitude adjustment unit 8406 performs phase adjustment so that an output signal of the receiving-side local oscillation unit 8404 is coincident with the phase of the modulation signal is "θ" in FIG. 25. In other words, the phase and amplitude adjustment unit 8406 may shift the phase of the output signal Vout when the receiving-side local oscillation unit 8404 operates in the injection locking mode such that a phase difference "θ" between the injection signal Sinj to the receiving-side local oscillation unit 8404 and the output signal Vout when the injection locking is performed can be canceled. However, although details will be described in embodiment 8, since there is a path difference between the reception signal input to the frequency mixing unit 8402 and the carrier signal input to the frequency mixing unit 8402 through the injection locking function, it is actually adequate to perform correction based on the path difference.

[Setting of Injection Amount and Free-Running Frequency]

Figure 27:
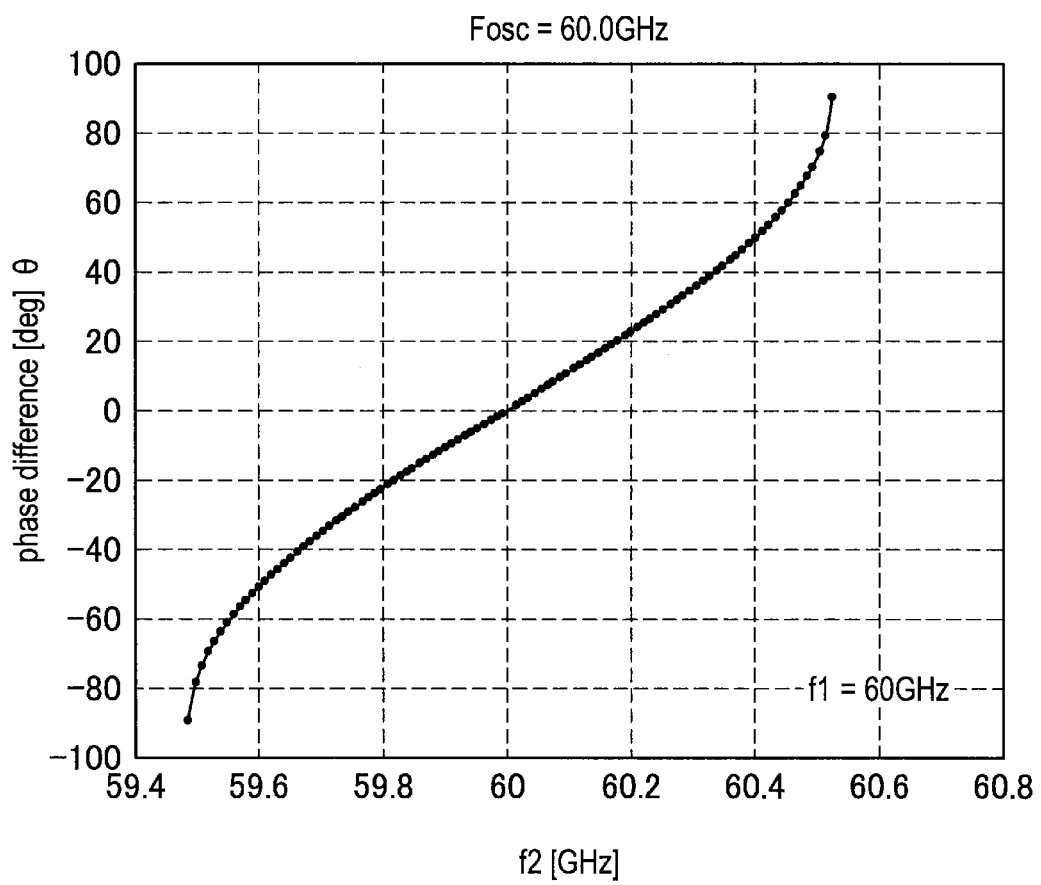
FIG. 27 is a diagram illustrating embodiment 7, in which one example of a relationship between a frequency difference between a modulation carrier signal and a demodulation carrier signal in free-running and a phase difference θ between an injection signal and a demodulation carrier signal in injection locking is shown.
Figure 28:
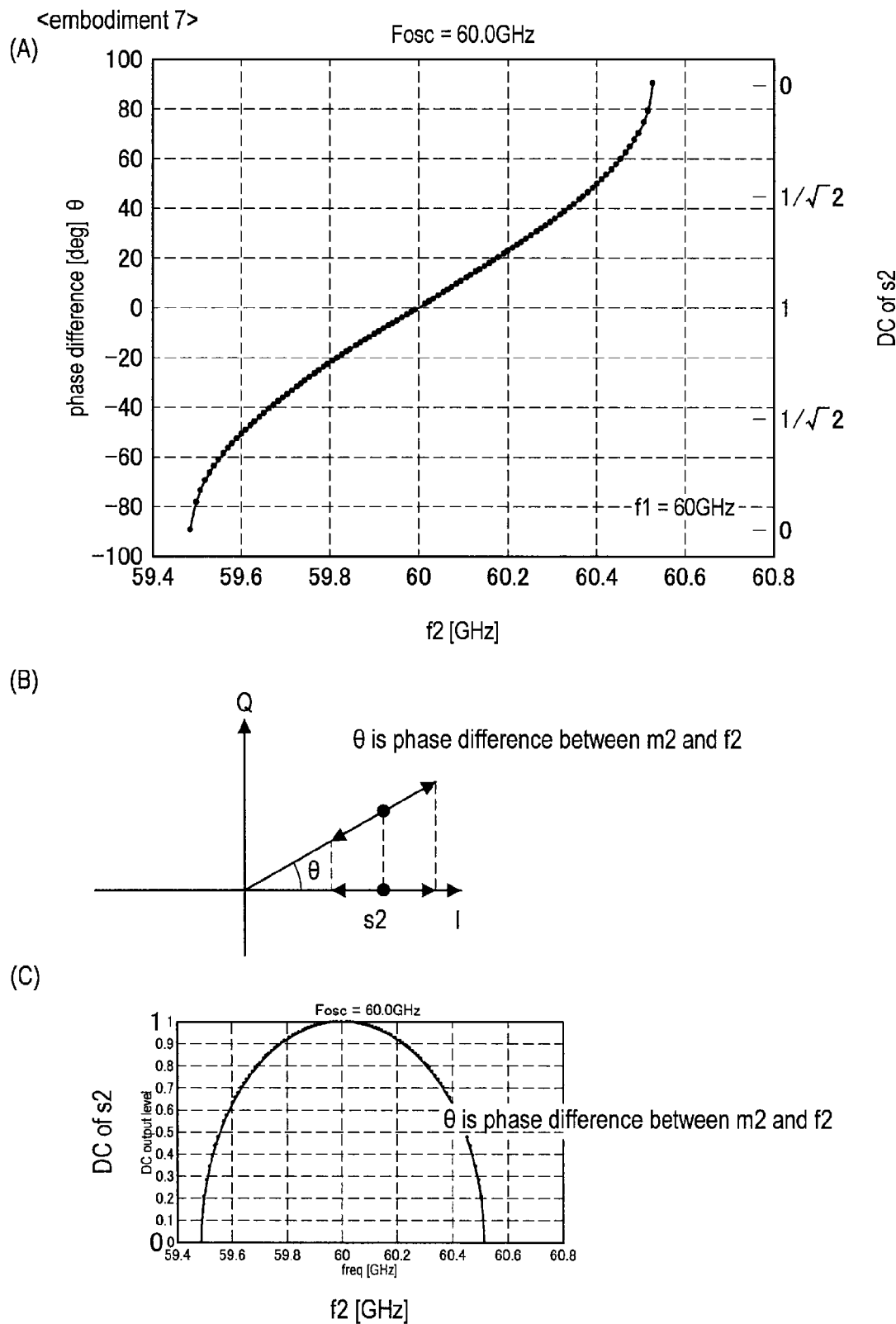
Figure 29:
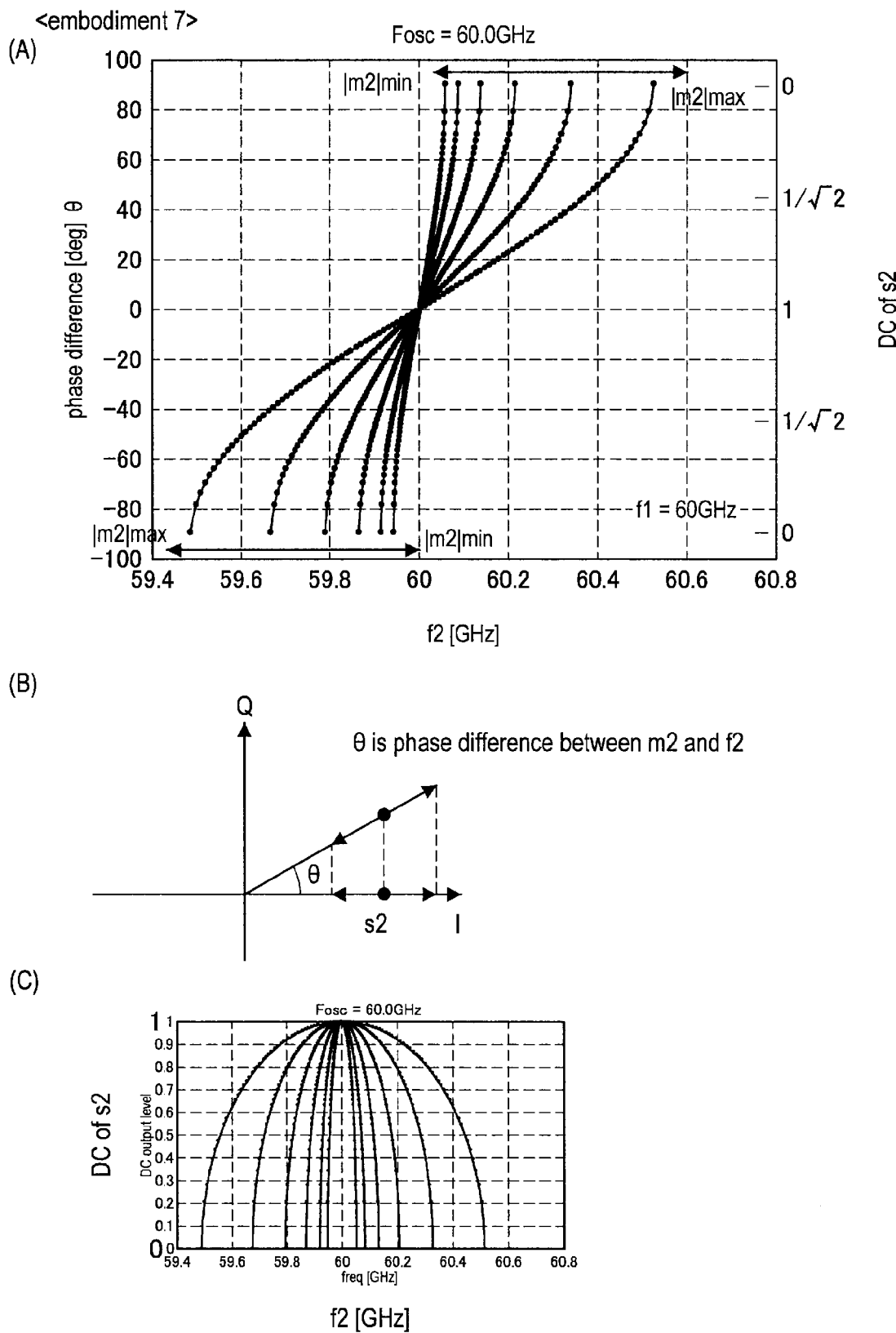
FIGS. 29(A) to 29(C) are diagrams illustrating embodiment 7, in which one example of a relationship between a reception level and a locking range is shown.

FIGS. 26 to 29 are diagrams illustrating a scheme for appropriately setting an injection amount of a signal for injection locking in embodiment 7. Here, FIG. 26 is a diagram showing a basic configuration of modulation and demodulation corresponding to the injection locking. FIG. 27 is a diagram showing one example of a relationship between a frequency difference between a carrier signal f1 used for modulation and a demodulation carrier signal upon free-running output from the receiving-side local oscillation unit 8404, and a phase difference θ between an injection signal and a carrier signal in injection locking. FIG. 28 is a diagram showing one example of a relationship between a phase difference θ between an injection signal and a demodulation carrier signal in injection locking and a DC component of a demodulation output s2. FIG. 29 is a diagram showing one example of a relationship between a reception level (in other words, an input level to the frequency mixing unit 8402) and a locking range.

As shown in FIG. 26, the phase and amplitude adjustment unit 8406 includes an amplitude adjustment unit 8434 that adjusts a size of a reception signal (i.e., an input demodulation target signal m2 input to the frequency mixing unit 8402) based on an amplification rate (gain A) and supplies the adjusted signal as an injection signal to the receiving-side local oscillation unit 8404. The injection locking detection unit 8442 of the injection locking control unit 8440 detects a DC component of the demodulation signal s2 and stores the detection result and a set value based on the detection result in the second set value storage unit 7230. Details of the set value based on the detection result of the injection locking detection unit 8442 will be described later. The controller unit 8446 that is one example of the second operation control unit 7250 has a function of the frequency control unit for controlling the free-running frequency of the receiving-side local oscillation unit 8404 based on the set value read from the second set value storage unit 7230a.

As understood from the above-described description, as a frequency (free-running frequency f2) of the carrier signal f2 (free-running carrier signal Vo) upon free-running output from the receiving-side local oscillation unit 8404 is closer to the frequency (modulation frequency f1) of the modulation carrier signal f1 output from the transmission-side local oscillation unit 8304 used for modulation at the transmission side, injection locking is easier. When there is an environment change such as a temperature change, a variation of the frequency f1 of the modulation carrier signal f1 or a free-running frequency f2 of the carrier signal f2 upon free-running (=free-running carrier signal Vo) or a variation of a reception level (in other words, an injection amount to the receiving-side local oscillation unit 8404) occurs, but locking can be stabilized by performing control such that the free-running frequency f2 of the carrier signal f2 upon free-running can be close to the modulation frequency f1.

Here, as shown in FIG. 27, a phase difference θ between an injection-locked carrier signal f2 (=injection locking output Vout) and the demodulation target signal m2 is determined by a difference between a frequency f1 the modulation carrier signal f1 (in other words, an input demodulation target signal m2 input to the frequency mixing unit 8402) and the free-running frequency f2 of the carrier signal f2 upon free-running output from the receiving-side local oscillation unit 8404. In other words, a phase offset of the carrier signal e from the injection-locked demodulation target signal m2 is a phase difference θ, a locking range fLOCK is represented as Equation (2-1) and the phase difference θ is represented as Equation (2-2) from reference A. In Equation (2) (Equation (2-1) and Equation (2-2)), Iinj denotes an injection signal level (A|m2|), Iosc denotes an oscillation level (|f2|) of the receiving-side local oscillation unit 8404 as an injection locking oscillator, and Q denotes a Q value of the receiving-side local oscillation unit 8404.

Reference A: Narasimha Lanka, et al., University of Minneapolis, "Understanding the Transient Behavior of Injection Lock LC Oscillators," IEEE2007 Custom Integrated Circuits Conference (CICC)

[Math. 2]

$$\left.\begin{array}{l} f_{Lock} = \dfrac{f_2}{2Q} \dfrac{I_{inj}}{I_{osc}} \quad (2\text{-}1) \\[6pt] \theta = \sin^{-1}\left(\dfrac{f_2 - f_1}{f_{Lock}}\right) \quad (2\text{-}2) \\[6pt] f_1: \text{ frequency of } f1 \text{ and } m2 \\ f_2: \text{ free-running frequency of } f2 \\ I_{inj}: \text{ injection signal level } (A|m2|) \\ I_{osc}: \text{ oscillation level } (|f2|) \\ Q: Q \text{ value of injection lock oscillator} \end{array}\right\} \quad (2)$$

Operation and Effects of Embodiment 7

As shown in FIG. 28, in a demodulation process in the demodulation function unit 8400, a size of a DC component of the demodulation signal s2 is determined by the phase difference θ. Accordingly, it can be seen that when the DC component of the demodulation signal s2 is maximum, the phase difference θ is "0" and a frequency difference between the modulation carrier signal f1 and a carrier signal f2 upon free-running output from the receiving-side local oscillation unit 8404 is eliminated. Accordingly, it is desirable to control the frequency of the carrier signal f2 upon free-running so that a DC component of a demodulation output s2 is great.

However, as shown in FIG. 29, a locking range is changed due to a reception level (i.e., the size of the input demodulation target signal m2 input to the frequency mixing unit 8402). Specifically, when the level of the demodulation target signal m2 is low, a change of the phase difference θ for a frequency difference between the modulation carrier signal f1 and the carrier signal f2 upon free-running is great, and when the level of the demodulation target signal m2 is high, the change of the phase difference θ for the frequency difference between the modulation carrier signal f1 and the carrier signal f2 upon free-running is small. Accordingly, it is desirable to optimally select a change amount (step) of the frequency of the carrier signal f2 upon free-running in order to rapidly find a maximum value of the DC component of the demodulation signal s2 while maintaining the locked state.

In consideration of the above, (the frequency control unit of) the controller unit 8446 or the amplitude adjustment unit 8434 may function as one example of the second operation control unit 7250 as follows. For example, an optimal step may be calculated from |m2| in advance and stored in the second set value storage unit 7230, and the frequency control unit of the controller unit 8446 may adjust a free-running frequency f2 of the carrier signal f2 based on the stored information. Alternatively, an optimal value of the gain adjustment in (the amplitude adjustment unit 8434 of) the phase and amplitude adjustment unit 8430 may be obtained so that the injection amount is constant and stored in the second set value storage unit 7230, and the amplitude adjustment unit 8434 may perform gain adjustment based on the stored information so that the injection amount is optimal.

Embodiment 8

FIGS. 30 to 32 are diagrams illustrating embodiment 8. Here, FIG. 30 is a diagram illustrating a phase difference between a reception signal supplied to the frequency mixing unit 8402 (i.e., a demodulation target signal m2 input to the frequency mixing unit 8402) and a demodulation carrier signal supplied to the frequency mixing unit 8402. FIG. 31 is a diagram illustrating a relationship between a phase difference between the reception signal supplied to the frequency mixing unit and the demodulation carrier signal and a DC component of the demodulation signal. FIG. 32 is a diagram illustrating a scheme for suppressing influence of a phase difference between the reception signal and the demodulation carrier signal supplied to the frequency mixing unit.

Embodiment 8 is characterized in that the injection locking is applied, similar to embodiment 7, but differs from embodiment 7 described above in that a phase difference of the injection locking is appropriately set by the second set value processing unit 7200H. Hereinafter, for simplicity of description, a form in which embodiment 7 is not applied is shown, but embodiment 8 may be applied to a form in which embodiment 7 is employed.

As described in embodiment 7, since there is a path difference between the reception signal (demodulation target signal m2) input to the frequency mixing unit 8402 and the carrier signal input to the frequency mixing unit 8402 through the injection locking function as shown in FIG. 30, in fact, influence of a phase difference φ corresponding to the path difference appears. Accordingly, it is advisable to perform correction in consideration of the phase difference φ.

Here, as shown in FIG. 31, a way in which a DC component of a demodulation output s2 varies is changed due to the phase difference φ. For example, in the example shown in FIG. 31(C), the phase difference p is zero, and a change of the DC component for a frequency difference between the modulation carrier signal f1 and a carrier signal f2 upon free-running is symmetric with respect to the frequency difference of zero. On the other hand, as the phase difference p increases in a positive direction, a peak position is shifted to a low frequency side of the free-running frequency f2. Reversely, as the phase difference p increases in a negative direction, the peak position is shifted to a high frequency side of the free-running frequency f2. In any case, the symmetry is collapsed.

Accordingly, for example, as shown in FIG. 32(A), a phase adjustment unit 8432 for correcting the influence of the phase difference φ may be provided, as the phase and amplitude adjustment unit 8406, in at least one of a path for an injection signal Sinj and a path for a carrier signal f2 (FIG. 32(A) shows a case in which the phase adjustment unit 8432 is provided in the path for the carrier signal f2). A phase correction amount by the phase adjustment unit 8432 is stored in the second set value storage unit 7230 of the second set value processing unit 7200H in advance so that the phase correction amount is optimal, and the phase adjustment unit 8432 may perform phase correction based on the stored information. Even in either of the path for the injection signal and the path for the carrier signal f2, the phase adjustment unit 8432 may correspond to a band of the frequency f2 for the carrier signal f2. As shown in FIG. 32(B), the phase adjustment unit 8432 may be provided in a system of the demodulation target signal m2 directed to the frequency mixing unit 8402. However, in this case, the phase adjustment unit 8432 needs to have a broadband property corresponding to a band of the overall demodulation target signal m2, as well as the band of the frequency f2 for the carrier signal f2.

Embodiment 9

Figure 33:
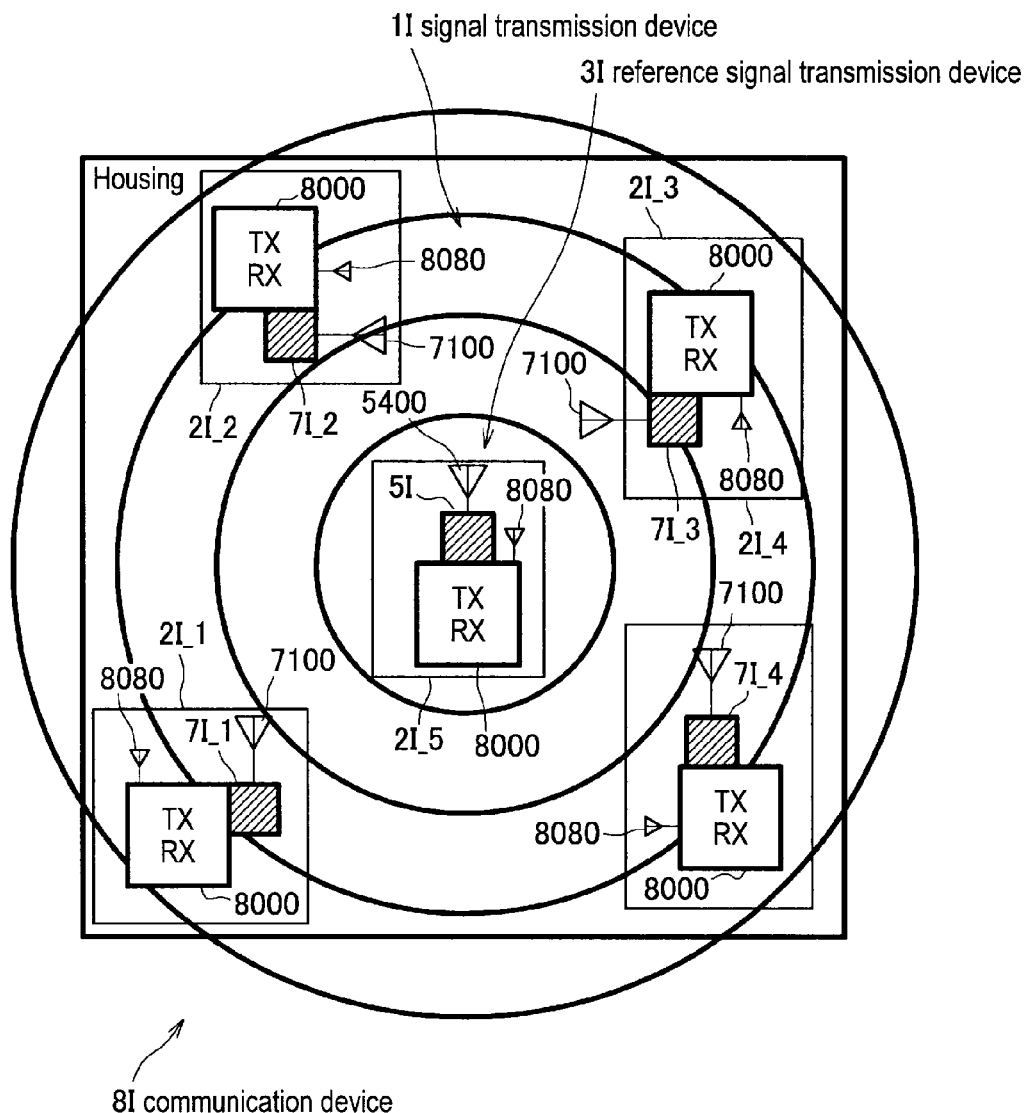
FIG. 33 is a diagram illustrating a communication device of embodiment 9 (spreading code scheme).

FIG. 33 is a diagram illustrating a communication device of embodiment 9. Embodiment 9 is an example in which the reference signal transmission device 3I is applied to the signal transmission device 1I to constitute the communication device 8I.

In embodiment 9, fixing of parameter setting is applied to radio communication of a spreading code scheme. The communication device 8I of embodiment 9 includes the signal transmission device 1I including a plurality of communication devices 2I for wirelessly transmitting a transmission target signal, and the reference signal transmission device 3I. A communication device 2I at a transmission side is referred to as a transmitter, a communication device 2I at a receiving side is referred to as receiver, and the transmitter and the receiver are collectively referred to as a transceiver.

The signal transmission device 1I performs communication using a spreading code scheme. A transmission band is a millimeter wave band. A sub-millimeter wave band with a short wavelength (0.1 to 1 mm) may be used in place of the millimeter wave band. As a reference for a code multiplexing scheme, reference B may be referred to.

Reference B: Proakis, "Digital Communications," in particular, Chapter 13 (Spread Spectrum Signals for Digital Communication), McGrawHill The communication device 2I includes a communication chip 8000. The communication chip 8000 may be either or both of a transmission chip 8001 (TX) and a reception chip 8002 (RX), which will be described later, or may be a communication chip in which functions of both the transmission chip 8001 and the reception chip 8002 are included in one chip for bidirectional communication. In a preferred aspect, the communication chip 8000 and a reference signal receiving device 7I are assembled in the communication device 2I as shown, but the present invention is not limited thereto. In the example of FIG. 33, the communication chip 8000 and the reference signal receiving device 7I are shown as separate functional units, but the communication chip 8000 may include functional units of the reference signal receiving device 7I.

The reference signal transmission device 3I of embodiment 9 includes a reference signal transmission device 5I (one example of the reference signal output device) for wirelessly transmitting a reference signal (in the present example, a signal that is a reference for a timing signal for, for example, a spreading code sequence) used by the communication device 2I, and a reference signal receiving device 7I provided for each communication device 2I. The example of FIG. 33 is shown as an example in which five communication devices 2I_1 to 2I_5, one reference signal transmission device 5I, and four reference signal receiving devices 7I_1 to 7I_4 are accommodated in a housing of one electronic device, but the numbers of the communication devices 2I and the reference signal receiving devices 7I are not limited to this example, and the devices need not necessarily be accommodated in a housing of one electronic device.

The spreading code sequence (spreading code period signal) is a reference clock of a symbol period Tsym, and is described as a symbol period signal Sig1. A spreading rate for the symbol period signal Sig1 is SF and a spreading code rate is T chip/sec (chip/s). When communication using a spreading code scheme is performed, the reference signal transmission device 5I transmits a reference signal (hereinafter referred to as reference clock) at the same frequency as the symbol period signal Sig1.

In this case, in the example of FIG. 33, since a radio frequency of a transmission target signal between the communication devices 2I differs from a radio frequency of the reference signal between each communication device 2I and the reference signal transmission device 5I, the communication device 2I uses separate antennas (an antenna 5400, an antenna 7100, and an antenna 8080) for a radio signal of the transmission target signal and a radio signal of the reference signal, but this is not essential. For example, one common antenna may be used based on the fact that each communication device 2I, the reference signal transmission device 5I, and the reference signal receiving device 7I transmit and receive synchronized signals.

In the signal transmission device 1I, first, the reference signal transmission device 5I wirelessly transmits a reference clock (reference signal) of a spreading code period and the communication device 2I (a transmitter and a receiver) receives this reference clock. That is, the reference signal transmission device 5I generates the reference clock synchronized to the spreading code sequence (a reference clock of the symbol period Tsym: symbol period signal Sig1), and transmits the reference clock, separate from transmission signal, to the reference signal receiving device 7I provided corresponding to each communication device 2I.

The reference signal receiving device 7I provided for each communication device 2I generates a symbol period signal Sig1 or a clock of a spreading code rate T chip/sec synchronized to the received reference clock of the symbol period Tsym. The communication device 2I generates a spreading code sequence in synchronization with the reference clock transmitted from the reference signal transmission device 5I (clock transmitter), and performs a spreading process or a reverse inverse spreading process based on this spreading code sequence.

In communication to which the spreading code scheme is applied, it is necessary to synchronize code timing of the transmission side to code timing of the receiving side. When the spreading code scheme is employed to perform radio communication, it is desirable to consider different events from normal outdoor communication in a state in which the communication environment is fixed to some extent (e.g., communication in a device or communication between devices at a relatively short distance).

For example, unlike outdoor communication such as so-called cellular communication, there are characteristics, such as 1) a situation of a propagation path is not changed, 2) there is no (very small) substantial change in reception power or timing, 3) a propagation distance is short, 4) a delay spread of a multipath is small, and 5) a need for use of a pseudo-random sequence in spreading code is low. 1) to 5) are collectively described as a characteristic of "radio transmission within a device or between devices." In the "radio transmission within a device or between devices," it is unnecessary to constantly check a situation of a propagation path and it is possible to use a prescribed spreading code sequence, as in normal code division multiplexing radio communication.

Thereby, the reference clock may be transmitted from the reference signal transmission device 5I to each reference signal receiving device 7I, each reference signal receiving device 7I may receive the reference clock, and each communication device 2I may generate a timing signal for a code division multiplexing process based on the reference clock received by the reference signal receiving device 7I. The communication device 2I performs timing correction based on the propagation delay checked in advance or other communication environment characteristics to obtain the above-described code timing synchronization. Since a complex scheme such as a matched filter is not used, a circuit scale or power consumption of the communication device 2I can be reduced.

Further, "radio transmission within a device or between devices" may be regarded as radio signal transmission in a static environment, and the communication environment characteristic may be regarded as being substantially invariant. This refers to the fact that "since the communication environment is invariant (fixed), parameter setting is invariant (fixed), as well." Accordingly, for example, a parameter indicating a communication environment characteristic is determined in product shipment and stored in a storage device such as a memory. In operation, phase correction may be executed based on this parameter. In the case of the present example, a phase correction mechanism is mounted, but a mechanism that constantly monitors the communication environment characteristic and performs phase correction based on the monitoring result is unnecessary. Accordingly, the circuit scale can be reduced and the power consumption can be reduced.

[Operation of Communication Device]

Figure 34:
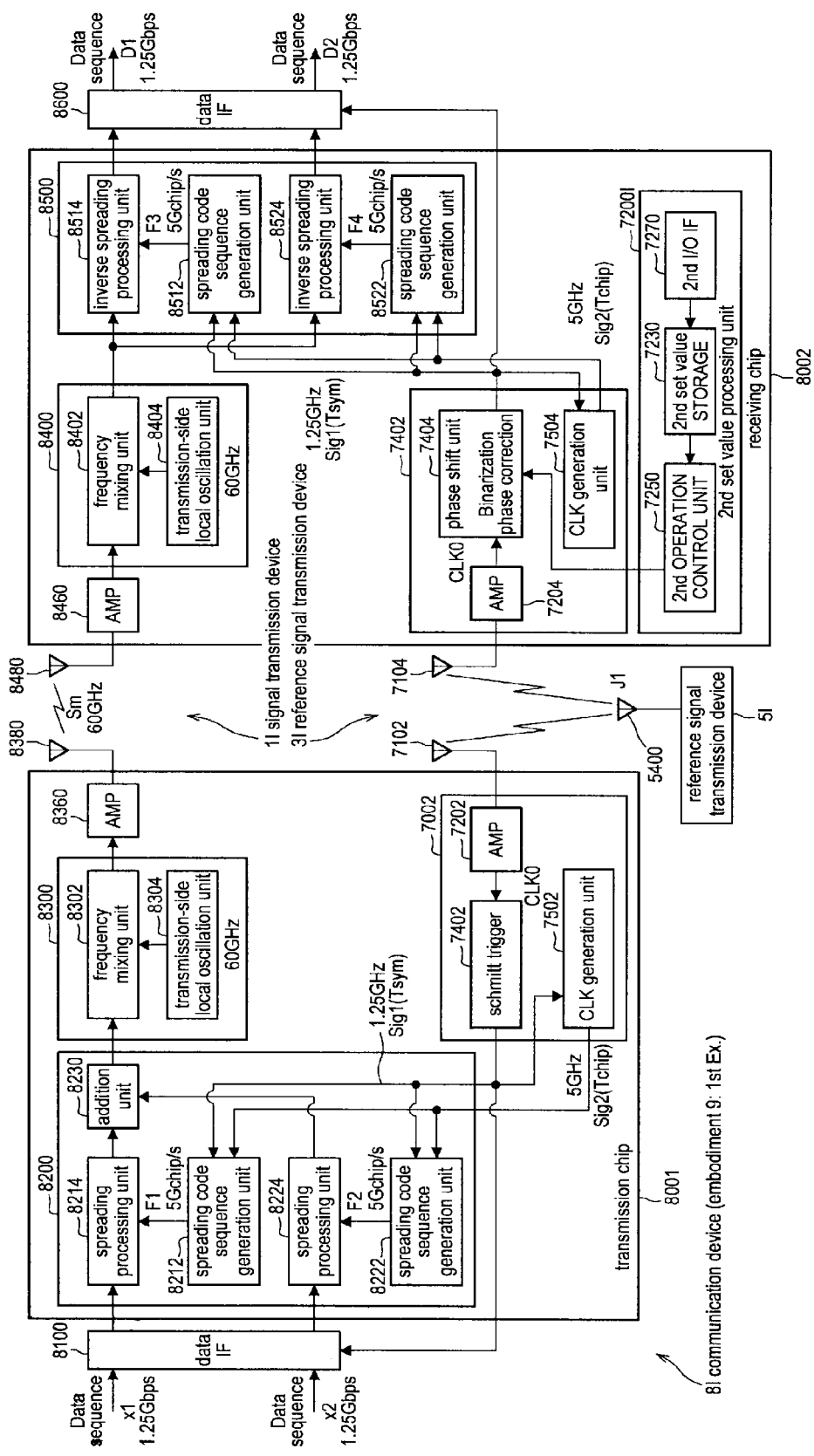
FIG. 34 is a diagram illustrating an overall operation in a communication device of embodiment 9 (a first example).
Figure 35:
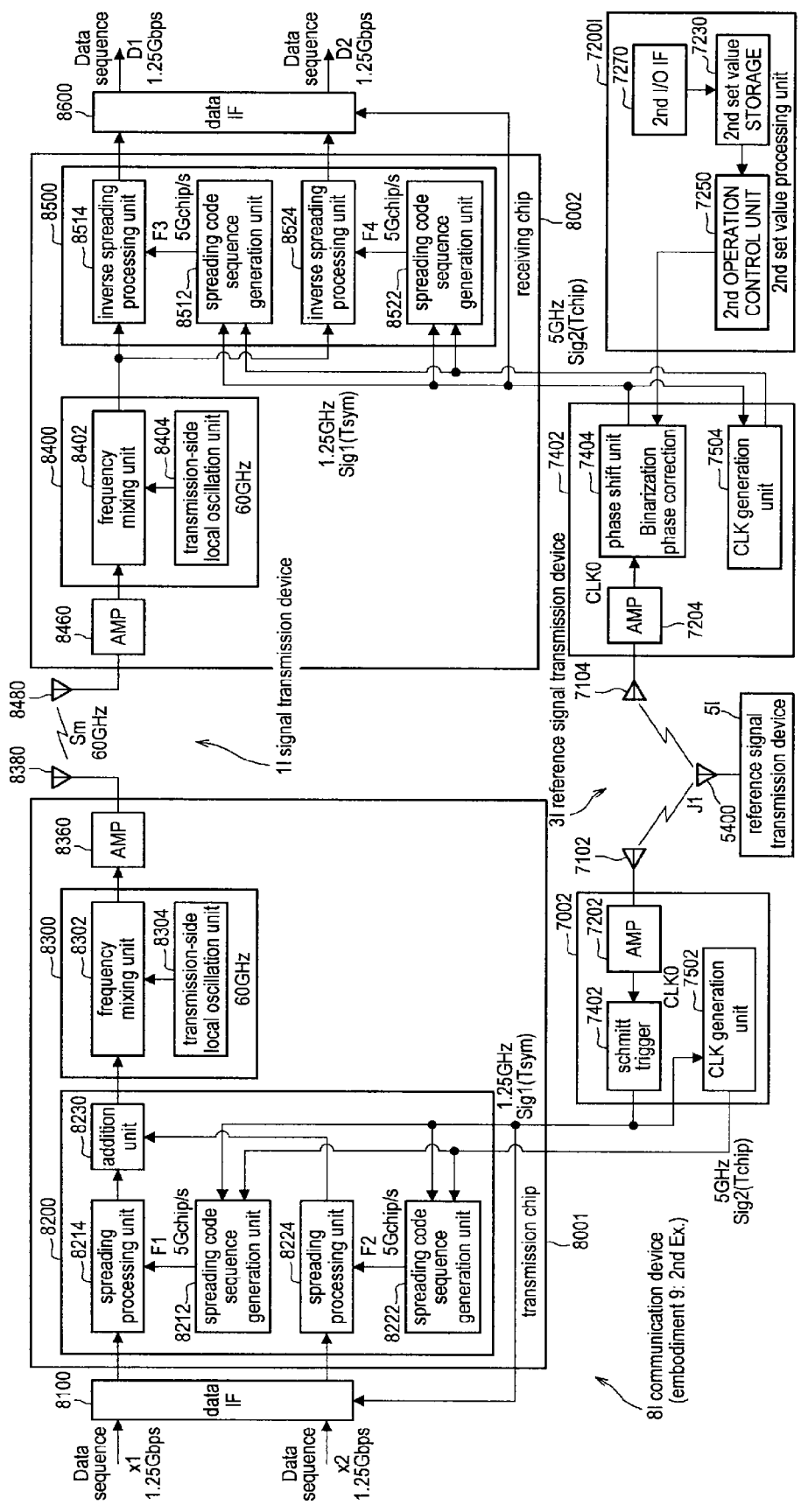
FIG. 35 is a diagram illustrating an overall operation in the communication device of embodiment 9 (a second example).

FIGS. 34 and 35 are diagrams illustrating an overall operation in the communication device 8I of embodiment 9. Here, a first example shown in FIG. 34 is an aspect in which either of the transmission side and the receiving side includes a clock generation unit using a reference signal receiving device 7I in a communication chip 8000, and a second example shown in FIG. 35 is an aspect in which either of the transmission side and the receiving side includes a clock generation unit using a reference signal receiving device 7I separately from a communication chip 8000. Although not shown, one of the transmission side and the receiving side may include a clock generation unit using a reference signal receiving device 7I in the communication chip 8000, and the other of the transmission side and the receiving side includes a clock generation unit using a reference signal receiving device 7I separately from the communication chip 8000. BPSK is employed as a modulation scheme. Since the only difference is whether the clock generation unit is embedded in the communication chip or not, hereinafter, the first example in which the clock generation unit is embedded in the communication chip 8000 will be described.

Further, when applied to signal transmission within a device (in a housing), respective units (and preferably, a reference signal transmission device 5I) of the transmission chip

8001 and the reception chip 8002 are accommodated in the same housing. In the housing, a radio signal transmission path capable of radio transmission is formed between a code spreading processing unit 8200 that is one example of the first signal processing unit and a code inverse spreading processing unit 8500 that is one example of the second signal processing unit. In addition, when applied to signal transmission between the devices, the transmission chip 8001 is accommodated in a housing of the first electronic device, and the reception chip 8002 is accommodated in a housing of the second electronic device. Preferably, the reference signal transmission device 5I is accommodated in a housing of either the first electronic device or the second electronic device. When the first electronic device and the second electronic device are arranged in determined positions, a radio signal transmission path capable of radio transmission is formed between a code spreading processing unit 8200 that is one example of the first signal processing unit and a code inverse spreading processing unit 8500 that is one example of the second signal processing unit.

The transmission chip 8001 (TX) and the reception chip 8002 (RX) requiring a reference signal REFCLK, a data interface unit 8100 included before the transmission chip 8001, and a data interface unit 8600 included after the reception chip 8002 constitute a basic configuration of the signal transmission device 1I. A code spreading processing unit 8200 and a modulation function unit 8300 are provided in the transmission chip 8001. A demodulation function unit 8400 and a code inverse spreading processing unit 8500 are provided in the reception chip 8002. A symbol period signal Sig1 and a spreading code rate signal Sig2 are supplied as the reference signal REFCLK from a clock generation unit that will be described to each of the code spreading processing unit 8200 and the code inverse spreading processing unit 8500. In the present configuration, as will be described later, a reference signal receiving device 7I is used as the clock generation unit.

[Data Interface Unit: Transmission Side]

The data interface unit 8100 at the transmission side receives a first data sequence×1 and a second data sequence×2 and delivers each data sequence to the transmission chip 8001 (particularly, the code spreading processing unit 8200). For example, data of 1.25 Gigabit/sec (Gbps) is supplied to the code spreading processing unit 8200 via the data interface unit 8100.

[Code Spreading Processing Unit]

The code spreading processing unit 8200 at the transmission side uses the symbol period signal Sig1 and the spreading code rate signal Sig2 supplied from the reference signal receiving device 7I that is not shown, multiplies two orthogonal spreading code sequences by both data sequence×1 and data sequence×2, adds resultant sequences, and delivers to the modulation function unit 8300.

[Modulation Functional Unit]

A transmission target signal (baseband signal: for example, a 12-bit image signal) is converted, into a high-speed serial data sequence by a signal generation unit, which is not shown, and supplied to the modulation function unit 8300. The modulation function unit 8300 is one example of a signal processing unit for performing signal processing based on the multiplication reference signal CLK2 (low frequency reference signal), and modulates the signal from the parallel-serial conversion unit as a modulation signal into a modulated millimeter wave band signal according to a prescribed modulation scheme.

As the modulation function unit 8300, various circuit configurations may be employed according to modulation schemes, but, for example, a configuration including a 2-input type frequency mixing unit 8302 (referred to as a frequency conversion unit, mixer circuit, multiplier or the like) and a transmission-side local oscillation unit 8304 (a first carrier signal generation unit) may be employed. The frequency mixing unit 8302 modulates a signal output from the code spreading processing unit 8200 with a carrier signal Lo_TX generated by the transmission-side local oscillation unit 8304.

The transmission-side local oscillation unit 8304 generates a carrier signal Lo_TX (modulation carrier signal) used for modulation. The transmission-side local oscillation unit 8304 is one example of a second high frequency reference signal output unit for generating a carrier signal at a higher frequency (one example of the second high frequency reference signal) synchronized to a multiplication reference signal CLK2 generated by a reference signal recovery unit. The transmission-side local oscillation unit 8304 may generate the carrier signal Lo_TX based on the multiplication reference signal CLK2_TX. The transmission-side local oscillation unit 8304 may employ any circuit configuration, but, is very preferably configured of, for example, a PLL or a DLL.

The frequency mixing unit 8302 multiplies (modulates) the signal from the parallel-serial conversion unit by the carrier signal Lo_TX of the millimeter wave band generated by the transmission-side local oscillation unit 8304 to generate a transmission signal in a millimeter wave band (a modulated signal) and supplies the transmission signal to the amplification unit 8360. The transmission signal is amplified by the amplification unit 8360 and a radio signal Sm in the millimeter wave band is radiated from the transmission antenna 8380.

[Demodulation Functional Unit]

The demodulation function unit 8400 may use various circuit configurations in a range according to the modulation scheme of the transmission side, but at least, employs a circuit configuration corresponding to the modulation scheme of the modulation function unit 8300. The demodulation function unit 8400 is one example of a signal processing unit for performing signal processing based on the multiplication reference signal CLK2 (low frequency reference signal). The demodulation function unit 8400 includes, for example, a 2-input type frequency mixing unit 8402 and a receiving-side local oscillation unit 8404 (the second carrier signal generation unit), and performs signal demodulation from the reception signal received by the antenna 8236 using a so-called locking detection scheme.

The frequency mixing unit 8402 demodulates the signal output from the amplification unit 8460 with the carrier signal Lo_RX generated by the receiving-side local oscillation unit 8404. Although not shown, for example, a low pass filter (LPF) may be provided in a subsequent stage of the frequency mixing unit 8402 to eliminate a harmonic component contained in the multiplication output. In the locking detection scheme, the carrier is recovered by the receiving-side local oscillation unit 8404 rather than the frequency mixing unit 8402, and demodulation is performed using the recovered carrier. In communication using locking detection, transmission and reception carrier signals need to have been frequency locked and phase locked.

The receiving-side local oscillation unit 8404 is one example of a second high frequency reference signal output unit for generating a carrier signal at a higher frequency (one example of the second high frequency reference signal) synchronized to the multiplication reference signal CLK2 generated by the reference signal recovery unit. The receiving-side local oscillation unit 8404 may generate a carrier signal based on the multiplication reference signal CLK2_RX. The receiving-side local oscillation unit 8404 may employ various circuit configurations, but is very preferably configured of, for example, a PLL or a DLL.

[Code Inverse Spreading Processing Unit]

The code inverse spreading processing unit 8500 at a receiving side uses a symbol period signal Sig1 and a spreading code rate signal Sig2 supplied from a reference signal receiving device 7I that is not shown, uses a known spreading code sequence, detects timing of a spreading code sequence in the reception signal (baseband signal) demodulated by the demodulation function unit 8400, performs integration by multiplying the reception signal by the spreading code sequence, and delivers the resultant signal to the data interface unit 8600 that performs inverse spreading. Thereby, in the spreading code scheme, a code synchronization mechanism is necessary.

[Data Interface Unit: Receiving Side]

The data interface unit 8600 at the receiving side receives the first data sequence D1 and the second data sequence D2 from the reception chip 8002 (code inverse spreading processing unit 8500), and delivers the first data sequence D1 and the second data sequence D2 to a subsequent-stage circuit. For example, data of 1.25 Gigabit/sec (Gbps) supplied from the code spreading processing unit 8500 is delivered to the subsequent stage via the data interface unit 8600.

[Transmission Side]

In the transmission chip 8001, the code spreading processing unit 8200 includes a spreading code sequence generation unit 8212 and a spreading processing unit 8214 corresponding to the data sequence×1, and includes a spreading code sequence generation unit 8222 and a spreading processing unit 8224 corresponding to the data sequence×2, and also includes an addition unit 8230. Further, the transmission chip 8001 includes a clock generation unit 7002 (one example of the first clock generation unit) using a reference signal receiving device 7I. The clock generation unit 7002 includes an amplification unit 7202 (corresponding to the amplification unit 7200), a Schmitt trigger 7402 (one example of the reference signal recovery unit), and a clock generation unit 7502 (corresponding to one example of the multiplication reference signal output unit).

The Schmitt trigger 7402 includes a function of a binarization unit for acquiring a reference clock (symbol period signal Sig1) as binary data. Specifically, the Schmitt trigger 7402 waveform-shapes the reference signal CLK0 (based on the reference signal J1) amplified by the amplification unit 7202 to acquire a symbol period signal Sig1 of a period Tsym and supplies the symbol period signal Sig1 to the data interface unit 8100, the spreading code sequence generation unit 8212, and the spreading code sequence generation unit 8222.

The clock generation unit 7502 generates a reference clock of a period Tchip (spreading code rate signal Sig2) synchronized to the symbol period signal Sig1 supplied from the Schmitt trigger 7402, and supplies the spreading code rate signal Sig2 to the spreading processing unit 8214 and the spreading processing unit 8224. A frequency relationship of the symbol period signal Sig1 and the spreading code rate signal Sig2 is Tsym=SF×Tchip. The symbol period signal Sig1 and the spreading code rate signal Sig2 generated by the clock generation unit 7002 are one example of the first reference clock for the first signal processing (code spreading process) for a radio communication process of a spreading code scheme.

The data interface unit 8100 outputs the data sequence×1 and the data sequence×2 to the code spreading processing unit 8200 in synchronization with the symbol period signal Sig1.

The spreading code sequence generation unit 8212 outputs a spreading code F1 in which a clock period is the same as a code sequence period, to the spreading processing unit 8214 based on the symbol period signal Sig1 and the spreading code rate signal Sig2 supplied from the clock generation unit 7002. The spreading processing unit 8214 multiplies the data sequence×1 supplied in synchronization with the symbol period signal Sig1 via the data interface unit 8100 by the spreading code F1 supplied from the spreading code sequence generation unit 8212 to perform code spreading, and supplies the processed data to the addition unit 8230. Similarly, the spreading code sequence generation unit 8222 outputs a spreading code F2 in which the clock period is the same as the code sequence period, to the spreading processing unit 8224 based on the symbol period signal Sig1 and the spreading code rate signal Sig2 supplied from the clock generation unit 7002. The spreading processing unit 8224 multiplies the data sequence×2 supplied in synchronization with the symbol period signal Sig1 via the data interface unit 8100 by the spreading code F2 supplied from the spreading code sequence generation unit 8222 to perform code spreading, and supplies the processed data to the addition unit 8230.

[Receiving Side]

In the reception chip 8002, the code inverse spreading processing unit 8500 includes a spreading code sequence generation unit 8512 and an inverse spreading processing unit 8514 corresponding to the recovered data sequence D1, and includes a spreading code sequence generation unit 8522 and an inverse spreading processing unit 8524 corresponding to the recovered data sequence D2. The reception chip 8002 includes a clock generation unit 7004 (one example of the second clock generation unit) using a reference signal receiving device 7I. The clock generation unit 7004 includes an amplification unit 7204 (corresponding to the amplification unit 7200), a phase shift unit 7404 (one example of the reference signal recovery unit) functioning as a phase correction circuit, and a clock generation unit 7504 (one example of the multiplication reference signal output unit).

The clock generation unit 7504 generates a reference clock of a period Tchip (spreading code rate signal Sig2) synchronized to the symbol period signal Sig1 supplied from the phase shift unit 7404, and supplies the spreading code rate signal Sig2 to the inverse spreading processing unit 8514 and the inverse spreading processing unit 8524. A frequency relationship of the symbol period signal Sig1 and the spreading code rate signal Sig2 is Tsym=SF×Tchip. The symbol period signal Sig1 and the spreading code rate signal Sig2 generated by the clock generation unit 7004 is one example of the second reference clock for the second signal processing (code inverse spreading process) for a radio communication process of a spreading code scheme.

The spreading code sequence generation unit 8512 outputs a spreading code F3 in which the clock period is the same as the code sequence period to the inverse spreading processing unit 8514 based on the symbol period signal Sig1 and the spreading code rate signal Sig2 supplied from the clock generation unit 7004. The inverse spreading processing unit 8514 multiplies the baseband demodulated by the demodulation function unit 8400 by the spreading code F3 supplied from the spreading code sequence generation unit 8512 to perform code inverse spreading and supplies the processed data to the data interface unit 8600. Similarly, the spreading code sequence generation unit 8522 outputs the spreading code F4 to the inverse spreading processing unit 8524. The inverse spreading processing unit 8524 multiplies the baseband demodulated by the demodulation function unit 8400 by the spreading code F4 supplied from the spreading code sequence generation unit 8522 to perform code inverse spreading, and supplies the processed data to the data interface unit 8600.

The data interface unit 8600 uses inverse spreading-processed data supplied from the inverse spreading processing unit 8514 and the inverse spreading processing unit 8524 as data sequence D1 or data sequence D2, and outputs the data in synchronization with the symbol period signal Sig1.

Although not shown, the spreading code sequence generation unit 8212, the spreading code sequence generation unit 8222, the spreading code sequence generation unit 8512, and the spreading code sequence generation unit 8522 may include a plurality of registers for storing each value ai of a spreading code sequence a{a0, a1, a2, ..., aN−1}, a multiplication unit for frequency-multiplying a reference clock (herein, a symbol period signal Sig1) with a prescribed value (herein, SF), and a selection unit (selector). Each value ai of the spreading code sequence a{a0, a1, a2, ..., aN−1} from the register is input to each input terminal of the selection unit. The output signal of the multiplication unit is supplied as an output switching signal to the control input terminal of the selection unit. The multiplication unit multiplies, for example, a symbol period signal Sig1 at 1.25 GigaHz (GHz) by 4 to generate an output switching signal at 5 GigaHz, and supplies the output switching signal to the control input terminal of the selection unit 8806. The selection unit selects and outputs any one of the value ai of the spreading code sequence a{a0, a1, a2, ..., aN−1} from the register in order based on the output switching signal from the multiplication unit, to thereby to output a spreading code F@ (@ is 1, 2, 3, 4) in which the clock period (symbol period Tsym) is the same as the code sequence period.

In the signal transmission device 1I, for example, a spreading rate SF=4, a chip rate is 5 Gigachip/sec (Gchip/s), and the modulation scheme is BPSK. Accordingly, a transmission speed of the transmission target data is 1.25 Gigabit/sec. The reference signal transmission device 5 transmits a reference signal CLK0 (corresponding to the reference signal J1) at 1.25 GigaHz that is the same as the symbol period signal Sig1. Each of the data interface unit 8100, the transmission chip 8001, the reception chip 8002, and the data interface unit 8600 operates in synchronization with the reference signal CLK0 transmitted from the reference signal transmission device 5.

For example, at the transmission side, the reference signal CLK0 is received, and amplified by the amplification unit 7202, and waveform-shaped by the Schmitt trigger 7402 to thereby obtain a symbol period signal Sig1 of a period Tsym. Further, the clock generation unit 7502 generates a spreading code rate signal Sig2 of a period Tchip in synchronization with the symbol period signal Sig1. Similarly, at the receiving side, the reference clock (the symbol period signal Sig1 and the spreading code rate signal Sig2) is received, but the phase of the reference clock can be adjusted by the phase shift unit 7404.

The data interface unit 8100 outputs a data sequence×1 and a data sequence×2 in synchronization with the symbol period signal Sig1. The spreading processing unit 8214 and the spreading processing unit 224 outputs a spreading code F1 or a spreading code F2 in which the clock period is the same as the code sequence period in synchronization with each other. The spreading processing unit 8214 and the spreading processing unit 8224 multiplies a data sequence D1 or a data sequence D2 by corresponding spreading code F1 or spreading code F2 to thereby perform spreading. Then, the modulation function unit 8300 performs frequency-conversion into a given frequency (e.g., 60 GigaHz) and transmission.

The reception chip 8002 receives the radio signal transmitted from the transmission chip 8001, the demodulation function unit 8400 converts the radio signal into a baseband, and (the inverse spreading processing unit 8514 or the inverse spreading processing unit 8524 of) the code inverse spreading processing unit 8500 performs inverse spreading. Since timing of the spreading code sequence in this case is determined by signal propagation delay from the reference signal transmission device 5 to the transmission chip 8001 or the reception chip 8002, the timing is corrected by the phase shift unit 7404.

Operation and Effects of Embodiment 9

When signal transmission is performed using a radio signal, a plurality of signals may be multiplexed and transmitted. As one example, for example, code division multiplexing for multiplying orthogonal code sequences by a data sequence for addition multiplexing and transmission is known. The code division multiplexing scheme is characterized in that it can multiplex a plurality of data sequences into a single carrier. For example, a wireless transmission device using a millimeter wave is realized by applying a code division multiplexing scheme, thus realizing high speed data transmission. In particular, when such a device is used in communication within a device (between chips, between substrates, between modules, and the like), a transmission path using a conductor is unnecessary, a freedom degree of an arrangement of, for example, a substrate can be improved, mounting cost can be reduced, and an EMI problem noticeable, for example, in LVDS can be reduced. A flexible substrate has a problem of reliability of a connector unit, but the reliability can be improved by radio transmission.

Within a device or between devices, a plurality of signals with different transmission rates or data widths are transmitted between communication circuits. Methods of multiplexing the signals largely include four schemes of frequency division multiplexing, time division multiplexing, space division multiplexing, and code division multiplexing. Here, in a device for transmission within a device or between devices, one or some of the four multiplexing schemes may be used.

Frequency division duplexing is a scheme of transmitting a plurality of data using different carrier frequencies, and it is necessary to prepare a plurality of transmitters and receivers with different carrier frequencies. Time division multiplexing is a transmission scheme using different transmission timings of a plurality of data, and a mechanism for defining transmission timings of respective data is necessary in both a transmitter and a receiver. Space division multiplexing is a scheme of transmitting a plurality of data via a plurality of isolated propagation paths. For example, a plurality of transmission lines are prepared and the directivity of the antenna is used. Code division multiplexing is a scheme of multiplying orthogonal code sequences by a data sequence for addition multiplexing and transmission, as described above, and data sequences with different transmission rates can be multiplexed, but a spreading code synchronization mechanism is necessary. In a receiver of an existing spreading code scheme in which embodiment 9 is not employed, for example, matched filters are used, but a receiver becomes complex and there are drawbacks in power consumption or circuit scale.

Meanwhile, the signal transmission device 1I of embodiment 9 includes a communication device 8I including a transceiver, and a reference signal transmission device 3I including a reference signal transmission device 5I and a reference signal receiving device 7I. A reference clock transmitted from the reference signal transmission device 5I is supplied to a transmission chip 8001 as a transmitter, and input to the spreading code sequence generation unit 8212 and the spreading code sequence generation unit 8222 of the code spreading processing unit 8200. Similarly, in the receiving side, a reference clock that is a reference of a symbol period signal Sig1 and a spreading code rate signal Sig2 transmitted from the reference signal transmission device 5I is supplied to the reception chip 8002 as a receiver, and input to the spreading code sequence generation unit 8512 and the spreading code sequence generation unit 8522 of the code inverse spreading processing unit 8500.

Accordingly, a spreading code dealt by a transceiver is synchronized to one period of the symbol period signal Sig1. Accordingly, a circuit for detecting timing of a code for inverse spreading, such as a matched filter, is unnecessary in the receiver. That is, the reference clock that is a reference of the symbol period signal Sig1 or the spreading code rate signal Sig2 is transmitted from the reference signal transmission device 5 of the reference signal transmission device 3, The reference clock is received by the transmitter and the receiver to synchronize the spreading code sequence such that a synchronization mechanism of the receiver can be simplified. Accordingly, the power consumption or the circuit size can be suppressed. For example, since the code division multiplexing scheme is used for in-device transmission, an advantage is obtained in that a plurality of data sequences with different data rates can be multiplexed.

Further, the signal transmission device 1I of embodiment 9 includes a second set value processing unit 72001. The second set value processing unit 72001 includes a second I/O interface unit 7270, a second set value storage unit 7230, and a second operation control unit 7250. A set value of a prescribed correction amount defined based on a communication environment characteristic such as signal propagation delay from the reference signal transmission device 5I to the transmitter (particularly, the transmission chip 8001) or the receiver (particularly, the reception chip 8002) is stored in the second set value storage unit 7230 via the second I/O interface unit 7270 in advance. The second operation control unit 7250 notifies (sets) the phase shift unit 7404 of the stored set value of the correction amount.

The phase shift unit 7404 includes a function of a binarization unit for acquiring a reference clock (the symbol period signal Sig1) as binary data, and a function of a phase correction unit for correcting the phase of the acquired symbol period signal Sig1. Specifically, the binarization unit of the phase shift unit 7404 waveform-shapes the reference signal CLK0 amplified by the amplification unit 7204 to acquire the symbol period signal Sig1 of a period Tsym, and supplies the symbol period signal Sig1 to the spreading code sequence generation unit 8512, the spreading code sequence generation unit 8522, and the data interface unit 8600. In this case, the phase correction unit of the phase shift unit 7404 performs phase correction according to a correction amount notified from the second operation control unit 7250. That is, the phase shift unit 7404 performs phase correction according to the prescribed correction amount defined based on a communication environment characteristic such as the signal propagation delay from the reference signal transmission device 5I to the transmitter (particularly, the transmission chip 8001) or the receiver (particularly, the reception chip 8002). Since it is not a mechanism for constantly monitoring the communication environment characteristic and performing phase correction based on the monitoring result, a circuit scale can be reduced and power consumption can be reduced.

Variant of Embodiment 9

As a variant, although not shown, for example, a reference clock may be received in place of the second data sequence×2 and supplied to the transmission chip 8001. In the communication device 8I (the signal transmission device 1I and the reference signal transmission device 3I), a reference signal transmission device 5I is provided in the communication device 2I at either of the transmission side and the receiving side, and a signal generated by an oscillator (a reference oscillator, a local oscillation circuit, or the like) used in the communication device 2I is used as a reference reference clock (corresponding to the reference signal J1) transmitted to the other communication device 2I. This is an example suitable when applied to a signal transmission device that transmits the clock together with data (the transmission target signal). In this case, the reference signal transmission device 5I may not include a function of generating, particularly, the reference signal J1, and simply functions as a reference signal output unit for outputting a reference signal. It is possible to realize a simpler device than the device in embodiment 9 described above.

For example, a data sequence to be transmitted and a reference clock (synchronization clock) synchronized to the data sequence are input to the transmission chip 8001 of the communication device 2I at a transmission side. In this case, the input synchronization clock is directly transmitted to the reference signal transmission device 5I, which transmits the synchronization clock. Unlike embodiment 9 described above, the transmission chip 8001 includes a part other than the clock generation unit 7002, and the reception chip 8002 includes a part other than the clock generation unit 7004. The reference signal receiving device 7I has the same configuration as the clock generation unit 7004. In this case, the transmission chip 8001 synchronizes the spreading code sequence using the synchronization clock and wirelessly transmits the synchronization clock from the reference signal transmission device 5I. The communication device 2I at a receiving side receives the synchronization clock transmitted from the reference signal transmission device 5I, and the reception chip 8002 includes the demodulation function unit 8400 and the code inverse spreading processing unit 8500 of embodiment 9, and performs an inverse spreading process based on the synchronization clock generated by the reference signal receiving device 7I. The signal from the code inverse spreading processing unit 8500 and the clock from the reference signal receiving device 7I are supplied to the data interface unit 8600.

As another variant, base on the above-described embodiment 9, a carrier signal generated by the local oscillation circuit (the transmission-side local oscillation unit 8304 and receiving-side local oscillation unit 8404) in at least one (one, the other or both; preferably both) of the transmission side and the receiving side is synchronized to the reference signal J1 transmitted from the reference signal transmission device 5I. That is, this is a method for synchronizing the local oscillator to the reference signal J1 transmitted from the reference signal transmission device 5I. In this synchronization process, it is desirable to apply the injection locking scheme.

While timing synchronization to a chip rate of a spreading code sequence has been described in the above-described embodiment 9, it is desirable to also obtain carrier frequency synchronization in the code division multiplexing scheme. While the description in embodiment 9 has been given on the premise that carrier signal synchronization is obtained by a general scheme at the receiving side, a synchronization process in this variant is performed based on the reference signal J1 transmitted from the reference signal transmission device 5I. In this example, in the communication device 2I at both the transmission side and the receiving side, the local oscillator is synchronized to the reference signal J1 transmitted from the reference signal transmission device 5I. The symbol period signal Sig1 is generated based on the reference signal J1 transmitted from the reference signal transmission device 5I by the clock generation unit 7002 (the Schmitt trigger 7402) at the transmission side or the clock generation unit 7004 (the phase shift unit 7404) at the receiving side, but the symbol period signal Sig1 is used as a reference clock for each local oscillation circuit (e.g., with a PLL configuration or an injection locking configuration).

Embodiment 10

Figure 36:
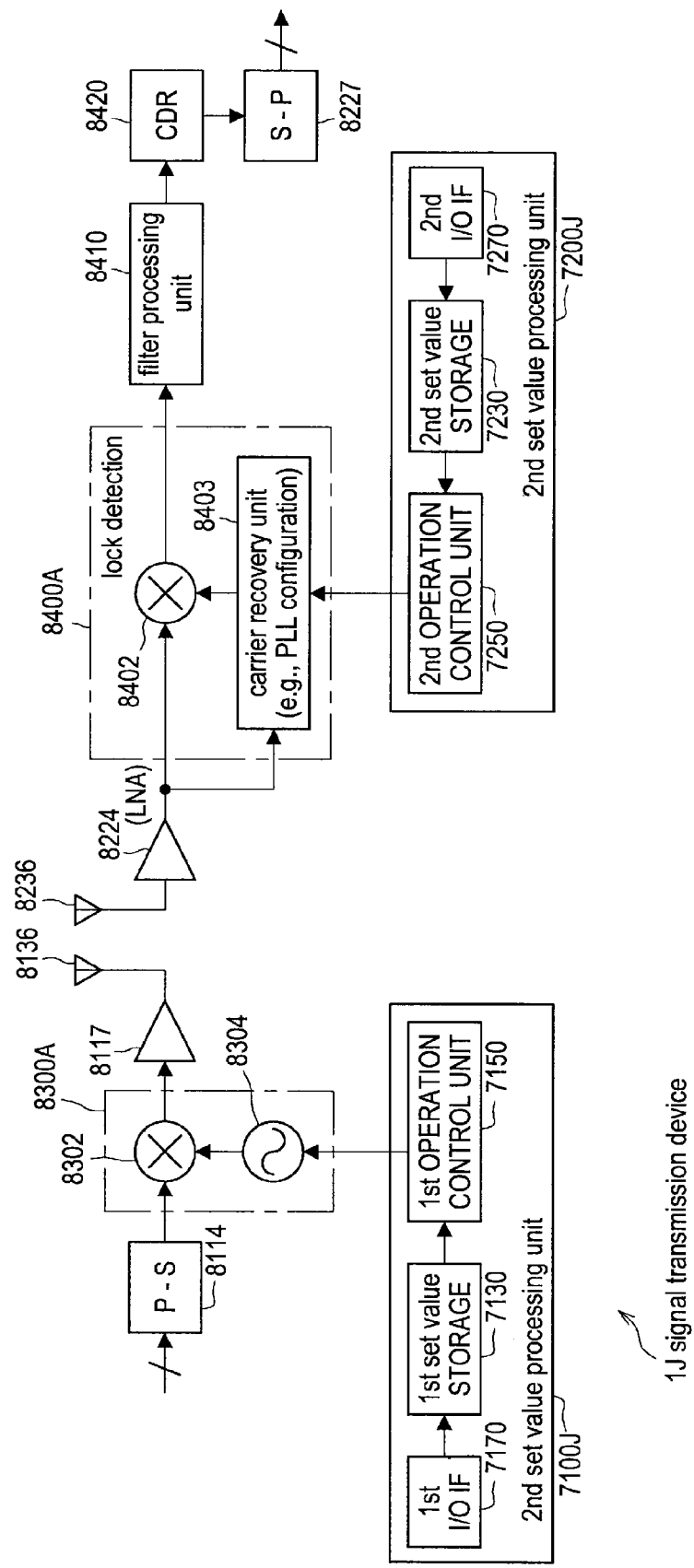
FIG. 36 is a diagram showing an overall overview of a wireless transmission device to which embodiment 10 is applied.

FIGS. 36 and 37 are diagrams illustrating embodiment 10. Here, FIG. 36 is a diagram showing an overall overview of a signal transmission device 1J to which embodiment 10 is applied. FIG. 37 is a diagram showing a frequency-amplitude characteristic example illustrating frequency shift from a carrier in a transmission side Tx and a receiving side Rx. Specifically, FIG. 37(A) is a diagram illustrating a comparative example to which embodiment 10 is not applied, FIG. 37(B) is a diagram illustrating a first basic example of embodiment 10, and FIG. 37(C) is a diagram illustrating a second basic example of embodiment 10.

In embodiment 10, fixing of parameter setting is applied when high speed correspondence of transmission data is achieved. First, when each of a transmission system and a receiving system is caused to be capable of broadband transmission without broadening an actual transmission band, operation setting for high speed of transmission data is performed by the first set value processing unit 7100J or a second set value processing unit 7200J. Broadening a bandwidth of the transmission system or the receiving system or setting a use band of a carrier frequency to a band with a shorter wavelength for high speed of transmission data is limited by a device configuration. There is a need for a scheme for realizing high speed of transmission data without broadening the bandwidth of the transmission system or the receiving system or changing the use band of the carrier frequency, but it is difficult to satisfy this need and embodiment 10 provides a solution scheme.

In the scheme of embodiment 10, a carrier frequency is shifted from a center of the band to realize high-speed transmission in a transmission characteristic between transmission and reception (comprehensive communication characteristic) having the same bandwidth as a case in which embodiment 10 is not applied. In other words, the scheme corresponds to broadband transmission using asymmetry of a transmission frequency characteristic between transmission and reception with respect to a carrier frequency. As the scheme for shifting the carrier frequency from a band center of the transmission frequency characteristic between transmission and reception, there are a first frequency shift scheme for shifting any one of a Tx (transmission) band and a Rx (reception) band from the carrier frequency, and a second frequency shift scheme for shifting both of the Tx band and the Rx band in the same direction from the carrier frequency. In any case, a frequency characteristic of a Tx system and an Rx system is shifted from the carrier (carrier) such that broadband transmission can be realized. A broader signal band can be obtained in comparison with a combination of the transmission unit and the reception unit having the same bandwidth as the case in which embodiment 10 is not applied and high-speed transmission can be realized. This scheme is very effective as a scheme for realizing a high data rate in a limited band. Hereinafter, such a scheme of embodiment 10 is simply referred to as "frequency shift scheme."

As shown in FIG. 36, a first set value processing unit 7100J for controlling an operation (particularly, a carrier signal output operation of a transmission-side local oscillation unit 8304) of a modulation function unit 8300 (e.g., a modulation function unit 8300A) that is a functional unit for defining a carrier frequency in a modulation process is included in the transmission side. The modulation function unit 8300A is one example of a signal processing unit, the transmission-side local oscillation unit 8304 is one example the first carrier signal generation unit for generating a carrier signal for modulation, and a frequency mixing unit 8302 is one example of the first frequency conversion unit for frequency-converting a transmission target signal with a carrier signal for modulation generated by the first carrier signal generation unit (transmission-side local oscillation unit 8304) to generate a transmission signal. The first set value processing unit 7100J inputs a set value for defining a shift amount of the frequency of the carrier signal from the band center of the transmission characteristic to the modulation function unit 8300 (specifically, transmission-side local oscillation unit 8304) that is one example of a signal processing unit. The first set value processing unit 7100J employs the second basic configuration, but may include the first set value determination unit 7110 in place of a first I/O interface unit 7170, as in the first basic configuration.

A second set value processing unit 7200J for controlling an operation of the demodulation function unit 8400 (e.g., demodulation function unit 8400A) that is a functional unit for defining a carrier frequency in a demodulation process (particularly, a carrier signal output operation of a receiving-side local oscillation unit 8404) is included in the receiving side. The demodulation function unit 8400A is one example of the signal processing unit, a carrier recovery unit 8403 is one example the second carrier signal generation unit for generating a carrier signal for demodulation, and a frequency mixing unit 8402 is one example of the second frequency conversion unit for frequency-converting the received transmission signal with a carrier signal for demodulation generated by the second carrier signal generation unit (carrier recovery unit 8403). The second set value processing unit 7200J inputs a set value for defining a shift amount of the frequency of the carrier signal from the band center of the transmission characteristic to the demodulation function unit 8400 (specifically, the carrier recovery unit 8403) that is one example of the signal processing unit. The second set value processing unit 7200J employs the second basic configuration, but may include a second set value determination unit 7210 in place of the second I/O interface unit 7270, as in the first basic configuration. In embodiment 10, the receiving side (i.e., the demodulation function unit 8400A) employs a locking detection scheme. The receiving side may use the locking detection scheme as a basic scheme or may use injection locking.

Further, in this example, the set value processing unit is provided in both the transmission side and the receiving side so that both the carrier signal for modulation and the carrier signal for demodulation can be set to be shifted from a band center of a transmission characteristic between transmission and reception (i.e., so that the second frequency shift scheme can be applied), but this is not essential. At least one of the carrier signal for modulation and the carrier signal for demodulation may be set to be shifted from the band center of the transmission characteristic between transmission and reception. When the first frequency shift scheme is applied, a center of one of the Tx band and the Rx band is caused to coincide with the carrier frequency, and only the other of the Tx band and the Rx band may be shifted from the carrier frequency. For example, when only the Tx band is shifted from the carrier frequency, only the first set value processing unit 7100J may be provided, and when only the Rx band is shifted from the carrier frequency, only the second set value processing unit 7200J may be provided.

In the case of radio transmission within a device or between devices using a millimeter wave band or a wavelength band before or after the millimeter wave band, for example, since, even when there is a reflection, it is a fixed reflection, a comprehensive transmission characteristic including a reception band (a band of a demodulation frequency characteristic) and a transmission band (a band of a modulation frequency characteristic), a transmission characteristic of the amplifiers of the transmission side and the receiving side, and a transmission characteristic of the transmission space may be treated to be fixed. Accordingly, in the transmission characteristic between transmission and reception with the same bandwidth as the case in which embodiment 10 is not applied, when the carrier frequency is shifted from a center of the band according to the transmission characteristic, a shift amount (one example of the set value) can be fixed in advance.

When the shift amount of the carrier frequency is set (determined), for example, a simulation analysis result may be referenced. In the simulation, first, for each of a transmission chip (the semiconductor chip 103 at the transmission side) and a reception chip (the semiconductor chip 203 at the receiving side), a frequency characteristic is obtained from measurement data for an amplitude characteristic. For example, a modulation frequency characteristic is measured as a frequency characteristic of the transmission chip.

Specifically, a measurement point is an output terminal of the amplification unit 8117, a modulation signal is modulated with a carrier at a unique carrier frequency, and a frequency characteristic of a ratio of an output signal to the carrier (conversion gain=output signal/carrier [dB]) is measured so that influence of the millimeter wave signal transmission path 9 can be ignored, that is, so that a characteristic of a single transmission chip can be recognized. Further, the modulation signal (transmission target signal) may be supplied from a preceding stage (e.g., the LSI function unit 104 shown in, for example, FIG. 1) of the parallel-serial conversion unit 8114.

As a frequency characteristic of the reception chip, the frequency characteristic of the conversion gain is measured. Specifically, an input point of a millimeter wave signal (non-modulated wave=RF input) is an input terminal of the amplification unit 8224, a millimeter wave signal is demodulated with the recovered carrier of the unique carrier frequency, and a frequency characteristic of a ratio of the demodulation output to an RF input (conversion gain=demodulation output/RF input [dB]) is measured so that the influence of the millimeter wave signal transmission path 9 can be ignored, that is, so that a characteristic of the single reception chip can be recognized. Further, the measurement point may be, for example, an output terminal of the filtering processing unit 8410 so that influence of a DC component or a harmonic component contained in the demodulation output is easily excluded.

A data point resulting from synthesis (Tx value and Rx value) of the obtained frequency characteristics of both of the chips is approximated and extrapolated by a quadratic function or a cubic function to obtain (approximate) a comprehensive frequency characteristic. When the frequency characteristic of the millimeter wave signal transmission path 9 is assumed to be flat and lossless in a transmission band range, the obtained comprehensive frequency characteristic can be considered a comprehensive frequency specifying from the signal input terminal (LSI function unit 104) of the receiving system the signal output terminal (LSI function unit 204) of the transmission system. Then, the approximated comprehensive frequency characteristic is shifted by a carrier frequency toward the baseband. In this state, impulse responses of an I-axis component (in-phase component) and a Q-axis component (orthogonal component) are simulated and data transmission capability is considered from the simulation result. In addition, a condition of high speed of transmission data may be considered from a relationship between the asymmetry of the frequency characteristic and the impulse response to determine a frequency shift amount. In order to perform high-speed communication, a broad band is necessary, but it may be difficult to obtain the broad band. Even in this case, since the frequency shift of embodiment 10 does not substantively broaden the bandwidth, effects are excellent. The comprehensive frequency characteristic in this case is shown by "Tx value and Rx value" and does not reflect the transmission characteristic of the millimeter wave signal transmission path 9, but, in fact, since the characteristic is also affected, the synthesis of the overall frequency characteristic may be shown by "Tx value, Rx value and TRx value" when the transmission characteristic of the millimeter wave signal transmission path 9 is shown by a TRx value.

For example, as shown in FIG. 37(A), the comparative example is an example in which a carrier frequency is set at a center of a reception band (a band of the demodulation frequency characteristic) and a transmission band (a band of a modulation frequency characteristic), similar to a normal case in which amplitude is modulated (e.g., see Patent Application No. 2005-513866). In this case, a broad frequency band is necessary in order to perform high-speed communication. However, there is a limit in broadening each frequency band of the transmission system, the transmission path (corresponding to the millimeter wave signal transmission path 9), and the receiving system. Even when a use band of a carrier frequency is set to a band with a shorter wavelength, for example, when a sub-millimeter wave band is used in place of the millimeter wave band in order to cope with high speed of transmission data, it is difficult to infinitely cope and the device configuration is limited.

Meanwhile, since a first basic example of embodiment 10 shown in FIG. 37(B) is an example in which the first frequency shift scheme is applied, a center of the Rx band is caused to be coincident with the carrier frequency $\omega c$ and only the Tx band is shifted upward from the carrier frequency $\omega c$. Although not shown, a center of the Rx band may be caused to be coincident with the carrier frequency we and only the Tx band may be shifted downward from the carrier frequency $\omega c$. In addition, although not shown, the center of the Tx band may be caused to be coincident with the carrier frequency $\omega c$ and only the Rx band may be shifted upward or downward from the carrier frequency $\omega c$. In setting of an actual frequency arrangement, setting of the carrier frequency used by the transmission-side local oscillation unit 8304 may be shifted from a center of the transmission band (the band of the modulation frequency characteristic) obtained, for example, by measurement.

Since a second basic example of embodiment 10 shown in FIG. 37(C) is an example in which the second frequency shift scheme is applied, both the Tx band and the Rx band are shifted upward from the carrier frequency $\omega c$. Although not shown, both the Tx band and the Rx band may be shifted downward from the carrier frequency $\omega c$. Further, a direction of the shift of the Tx band and the Rx band from the carrier frequency we needs to be the same. When the Tx band and the Rx band are shifted in reverse directions, there are (mostly) no effects. In setting of an actual frequency arrangement, setting of the recovered carrier frequency used by the reception-side local oscillation unit 8404 (i.e., the carrier frequency used by the transmission-side local oscillation unit 8304) may be shifted from a center of the reception band (the band of the demodulation frequency characteristic) obtained, for example, by measurement.

Operation and Effects of Embodiment 10

The broadband transmission becomes possible by applying the first frequency shift scheme or the second frequency shift scheme of embodiment 10 and shifting the Tx band or the Rx band from the center of the carrier frequency, for the following. When the frequency shift of embodiment 10 is applied, an imaginary axis component is greatly demodulated due to the asymmetry, but influence of this imaginary axis component can be suppressed by a baseband through locking detection. From a frequency axis relationship, a substantive transmission band of each of the transmission system Tx and the receiving system Rx is not broadened, but a comprehensive frequency band resulting from the synthesis of both is extended due to so-called folding in appearance. From an impulse response relationship, since a pulse width of an impulse response of the imaginary axis component (impulse responses at different phases) becomes narrow, higher speed transmission can be realized. As the frequency characteristic of the transmission system Tx and the receiving system Rx is shifted from the carrier, broadband transmission becomes possible without broadening the substantive transmission band of each of the transmission system Tx and the receiving system Rx. However, an imaginary axis component for the carrier frequency for locking detection (local oscillation frequency) is great. That is, when the asymmetric frequency characteristic is used, as in the first basic example shown in FIG. 37(B) or the second basic example shown in FIG. 37(C), the impulse width becomes narrow and high-speed data can be transmitted, but it is sensitive to the phase shift of the recovered carrier (so-called local oscillation wave) output from the local oscillator for locking detection (the carrier recovery unit 8403).

Comparison with Reference Example

In the field of radio communication, achieving compatibility of high speed signal transmission and (reduction of) a corresponding occupied frequency band becomes a condition necessary for efficient device building. For example, for a frequency spectrum of the amplitude modulation, a spectrum of the transmission target signal is reserved in both sidebands with respect to the carrier frequency as a center. A scheme of directly transmitting double sidebands while suppressing a carrier component is DSB (Double Sideband-Suppressed Carrier: double sideband) transmission, and a scheme of transmitting any one of an upper sideband and a lower sideband is SSB (Single Sideband-Suppressed Carrier: single sideband) transmission. The DSB transmission suppresses the carrier and then performs transmission and has good power efficiency. However, in the DSB transmission, an ideal band pass filter for suppressing the carrier is necessary, and it is difficult to transmit a DC component or a low frequency component near a DC. Normal AM modulation can cope with this, but a broad occupied frequency band is necessary. In addition, the DSB transmission requires a bandwidth that is twice the bandwidth of a transmission target signal, similar to normal AM modulation. The SSB transmission suppresses a carrier and then performs transmission and has good power efficiency, similar to the DSB. In addition, the SSB transmission may use the same bandwidth as a bandwidth of the transmission target signal, but an ideal band pass filter for one sideband is necessary.

Meanwhile, as a scheme falling between the DSB transmission and the SSB transmission, there is VSB (Vestigial Sideband) transmission. In the VSB transmission, a VSB signal in which a spectrum of an eliminated sideband in an AM-modulated high frequency signal is caused to slightly remain through a filter having a smooth cutoff characteristic near a carrier frequency by smoothing a cutoff frequency characteristic of the filter, which is necessary for the SSB transmission, is transmitted. At the receiving side, the signal is received using a VSB filter exhibiting a point-symmetrical cutoff characteristic in a portion of the carrier frequency. Demodulation is performed as in the SSB scheme, but when a phase characteristic of the VSB filter is straight, a left component of the carrier is folded and superimposed on the right and accordingly a demodulated signal has a flat characteristic such that a correct signal can be recovered from the reception signal. The VSB transmission refers to a scheme for making DC component transmission and the relatively narrow occupied frequency band compatible.

Here, a frequency arrangement in the frequency shift scheme of embodiment 10 may seem similar to the frequency arrangement in the VSB transmission, at first glance. However, the VSB transmission requires a specific filter at both the transmission side and the receiving side while the frequency shift scheme of embodiment 10 does not use such a filter. This is based on the fact that, in embodiment 10, a process equivalent to the filtering process in transmission and reception in the VSB transmission is performed by setting (frequency shift) of use bands of the amplification unit 8117 of the transmission side or the amplification unit 8224 of the receiving side. In addition, the VSB transmission has an object of assuring transmission of information near DC while increasing frequency use efficiency. One entire sideband and a portion (at the carrier side) of the other sideband with respect to the carrier are used. On the other hand, the frequency shift scheme of embodiment 10 makes high-speed transmission possible by shifting the carrier frequency from the center of the band (specifically, the transmission band between transmission and reception: the band of the comprehensive frequency characteristic in the previous example), and there also is a difference in operation and effects. In the VSB transmission and the frequency shift scheme of embodiment 10, the frequency arrangement is only shown as being the same in appearance, and there is, in the VSB transmission, a technical idea used in the frequency shift scheme of embodiment 10 that "a carrier frequency is shifted from a center of a transmission band between transmission and reception."

Embodiment 11

Embodiment 11 is an example in which fixing of parameter setting in each of the above-described embodiments is applied to an electronic device. Hereinafter, three representative examples are shown.

First Example

FIG. 38 is a diagram illustrating a first example of an electronic device of embodiment 11. The first example is an application example in which radio signal transmission is performed in a housing of one electronic device. The first example is an example of an application to an imaging device in which a solid-state imaging device is mounted as an electronic device. This type of imaging device is commercially available, for example, as a digital camera or a video camera (camcorder) or a camera (web camera) of a computer device.

A first communication device (corresponding to the communication device 2) is mounted to a main substrate to which a control circuit or an image processing circuit is mounted, and a second communication device (corresponding to the communication device 2) is mounted to an imaging substrate (camera substrate) to which a solid-state imaging device is mounted.

An imaging substrate 502 and a main substrate 602 are arranged in a housing 590 of an imaging device 500. A solid-state imaging device 505 is mounted on the imaging substrate 502. For example, the solid-state imaging device 505 is a CCD (Charge Coupled Device), in which a driving unit (a horizontal driver or a vertical driver) of the solid-state imaging device 505 is mounted on the imaging substrate 502, or is a CMOS (Complementary Metal-Oxide Semiconductor) sensor.

A semiconductor chip 103 functioning as a first communication device is mounted on the main substrate 602, and a semiconductor chip 203 functioning as a second communication device is mounted on the imaging substrate 502. Although not shown, a peripheral circuit such as an imaging driving unit is mounted on the imaging substrate 502, in addition to the solid-state imaging device 505, and an image processing engine, a manipulation unit, various sensors, and the like are mounted on the main substrate 602.

The semiconductor chip 103 and the semiconductor chip 203 has a function as a reference signal transmission device 5 and a function as a reference signal receiving device 7, respectively. In addition, the semiconductor chip 103 and the semiconductor chip 203 have the same functions as the transmission chip 8001 and the reception chip 8002, respectively. Both the functions of the transmission chip 8001 and the reception chip 8002 make coping with bidirectional communication possible. The same applies to other application examples that will be described later.

The solid-state imaging device 505 or the imaging driving unit corresponds to an application function unit of the LSI function unit of the first communication device. The signal generation unit at a transmission side is connected to the LSI function unit, and is connected with the antenna 236 via the transmission path connection unit. The signal generation unit or the transmission path connection unit is accommodated in the semiconductor chip 203 separate from the solid-state imaging device 505 and mounted on the imaging substrate 502.

The image processing engine, the manipulation unit, the various sensors and the like correspond to application function units of the LSI function unit of the second communication device, and an image processing unit for processing an imaging signal acquired by the solid-state imaging device 505 is accommodated. A signal generation unit at a receiving side is connected to the LSI function unit and connected with the antenna 136 via the transmission path connection unit. The signal generation unit or the transmission path connection unit is accommodated in the semiconductor chip 103 separate from the image processing engine and mounted on the main substrate 602.

The signal generation unit at a transmission side includes, for example, a multiplexing processing unit, a parallel-serial conversion unit, a modulation unit, a frequency conversion unit, an amplification unit, and the like, and the signal generation unit at a receiving side includes, for example, an amplification unit, a frequency conversion unit, a demodulation unit, a serial-parallel conversion unit, a unification processing unit, and the like. The same applies to another application example that will be described later.

Radio communication between the antenna 136 and the antenna 236 is performed such that the image signal acquired by the solid-state imaging device 505 is transmitted to the main substrate 602 via the radio signal transmission path 9 between the antennas. The configuration may be formed for the bidirectional communication. In this case, for example, a reference clock or various control signals for controlling the solid-state imaging device 505 are transmitted to the imaging substrate 502 via the radio signal transmission path 9 between the antennas.

In either of FIGS. 38(A) and 38(B), two systems of millimeter wave signal transmission paths 9 are provided. Similar to a second example that will be described later, the millimeter wave signal transmission path 9 may be of one system. In FIG. 38(A), the transmission path is the free space transmission path 9B. In FIG. 38(B), the transmission path is a hollow waveguide 9L. The hollow waveguide 9L may have a structure in which the surroundings are surrounded by a shield and the inside is hollow. For example, the surroundings are surrounded by a conductor MZ that is one example of the shield and the inside is hollow. For example, a fence of a conductor MZ is attached to a main substrate 602 to surround the antenna 136. A movement center of an antenna 236 at a side of an imaging substrate 502 is arranged in a position facing the antenna 136. Since the conductor MZ is hollow, it is unnecessary to use a dielectric material and it is possible to simply form the millimeter wave signal transmission path 9 at low cost.

In the first example, the semiconductor chip 103 and the semiconductor chip 203 are arranged in a housing, and in-device communication in which arrangement positions of the transmission unit and the reception unit are not changed is executed. Since an environment becomes an environment in which a transmission condition between transmission and reception is substantially not changed (i.e., is fixed), a transmission characteristic between a transmission unit and a reception unit can be recognized in advance. For example, parameter setting for defining a transmission and reception operation such as the amplitude adjustment of embodiment 1 is fixed (preset) based on the transmission characteristic.

Second Example

FIG. 39 is a diagram illustrating a second example of an electronic device of embodiment 11. The second example is an application example when radio signal transmission between electronic devices in a state in which a plurality of electronic devices are integral is performed. In particular, it is an application to signal transmission between two electronic devices when one electronic device is mounted in the other electronic device.

For example, a card type information processing device whose representative example is a so-called IC card or memory card in which a central processing unit (CPU), a nonvolatile storage device (e.g., a flash memory), or the like is embedded can be (detachably) mounted in an electronic device at a side of a main body. The card type information processing device that is one example of one (first) electronic device is hereinafter referred to as a "card type device." The other (second) electronic device, which is a main body side, is hereinafter referred simply to as an electronic device.

A structure example (a plan perspective view and a cross-sectional perspective view) of a memory card 201B is shown in FIG. 39(A). A structure example (a plan perspective view and a cross-sectional perspective view) of an electronic device 101B is shown in FIG. 39(B). A structure example (a cross-sectional perspective view) when the memory card 201B is inserted into a slot structure 4 (particularly, an opening 192) of the electronic device 101B is shown in FIG. 39(C).

The slot structure 4 is formed so that (a housing 290 of) the memory card 201B can be inserted from an opening 192 and fixed to the housing 190 of the electronic device 101B. A reception-side connector 180 is provided in a contact position with a terminal of the memory card 201B, of the slot structure 4. For a signal replaced for radio transmission, connector terminals (connector pins) are unnecessary.

As shown in FIG. 39(A), a concave cylindrical configuration (cavity) 298 is provided in the housing 290 of the memory card 201B. As shown in FIG. 39(B), a convex cylindrical configuration (protrusion) 198 is provided in a housing 190 of an electronic device 101B. The memory card 201B includes a semiconductor chip 203 in one surface of a substrate 202, and an antenna 236 is formed in the surface of a substrate 202. In the housing 290, the concave configuration 298 is formed in the same surface as the antenna 236, and a portion of the concave configuration 298 is formed of dielectric resin including a dielectric material capable of radio signal transmission.

At one side of the substrate 202, connection terminals 280 for connection with the electronic device 101B are provided in positions that can be determined by the housing 290. The memory card 201B is for low speed and small capacity signals or power supply, and includes existing terminal structures in portions thereof. Terminals that may be targets of signal transmission in a millimeter wave are separated, as indicated by dotted lines in FIG. 39.

As shown in FIG. 39(B), the electronic device 101B includes a semiconductor chip 103 in a surface at a side of the opening 192 of the substrate 102, and an antenna 136 is formed in one surface of the substrate 102. The housing 190 has a slot structure 4, and the opening 192 from which the memory card 201B is inserted is formed. In the housing 190, the convex configuration 198 having a millimeter wave confining structure (waveguide structure) is formed in a portion corresponding to a position of the concave configuration 298 when the memory card 201B is inserted into the opening 192, resulting in the dielectric body transmission path 9A.

As shown in FIG. 39(C), the housing 190 of the slot structure 4 has a mechanical structure so that the convex configuration 198 (the dielectric body transmission path 9A) and the concave configuration 298 contact each other in a concave and convex form for insertion of the memory card 201B from the opening 192. When the concave and convex structures are fitted, the antenna 136 faces the antenna 236, and a dielectric body transmission path 9A is arranged as the radio signal transmission path 9 between the antenna 136 and the antenna 236. In the memory card 201B, the housing 290 is interposed between the dielectric body transmission path 9A and the antenna 236, but the housing 290 does not have a great influence on the radio transmission in a millimeter wave band since the portion of the concave configuration 298 is formed of a dielectric material.

While in the second example, the semiconductor chip 103 and the semiconductor chip 203 are arranged in separate housings, even in this case, when the memory card 201B is mounted to the slot structure 4 and used, radio communication is executed in a state in which the arrangement positions of the transmission unit and the reception unit are prescribed. Similar to the first example, since an environment is the environment in which a transmission condition between transmission and reception is not substantially changed (i.e., is fixed), a transmission characteristic between a transmission unit and a reception unit can be recognized in advance. Based on the transmission characteristic, for example, parameter setting for defining a transmission and reception operation such as the amplitude adjustment of embodiment 1 is fixed (preset).

Third Example

FIG. 40 is a diagram illustrating a third example of an electronic device of embodiment 11. A signal transmission device 1 includes a portable image reproduction device 201K as one example of a first electronic device, and includes an image acquisition device 101K as one example of a second (main body side) electronic device in which the image reproduction device 201K is mounted. In the image acquisition device 101K, a mounting base 5K in which the image reproduction device 201K is mounted is provided in a portion of the housing 190. Alternatively, a slot structure 4 may be used as in the second example, in place of the mounting base 5K. The third example is the same as the second example in that signal transmission is wirelessly performed between two electronic devices when one electronic device is mounted to the other electronic device. Hereinafter, differences between the third example and the second example will be described.

The image acquisition device 101K has a substantially rectangular parallelepiped (box) shape, and may not be said to be of a card type. The image acquisition device 101K may acquire, for example, video data and corresponds to, for example, a digital recording and reproducing apparatus or a terrestrial television receiver. The image reproduction device 201K includes, as application function units, a storage device for storing video data transmitted from the image acquisition device 101K or a functional unit for reading the video data from the storage device and displaying a video on a display unit (e.g., a liquid crystal display device or an organic EL display device). In terms of a structure, the memory card 201B may be considered to be replaced with the image reproduction device 201K and the electronic device 101B may be considered to be replaced with the image acquisition device 101K.

A semiconductor chip 103 is accommodated in a housing 190 below the mounting base 5K, for example, as in the second example (FIG. 39), and an antenna 136 is provided in a certain position. In a portion of the housing 190 facing the antenna 136, a dielectric body transmission path 9A is formed, as the radio signal transmission path 9, of a dielectric material. A semiconductor chip 203 is accommodated in the housing 290 of the image reproduction device 201K mounted in the mounting base 5K, for example, as in the second example (FIG. 39), and an antenna 236 is provided in a certain position. In a portion of the housing 290 facing the antenna 236, a radio signal transmission path 9 (dielectric body transmission path 9A) is formed of a dielectric material. This is the same as in the second example described above.

The third example employs a wall contacting scheme rather than a fitting structure. Since the antenna 136 faces the antenna 236 when the image acquisition device 101K is placed to contact a corner 101a of the mounting base 5K, influence of misalignment can be entirely eliminated. Such a configuration enables alignment of the image reproduction device 201K for the radio signal transmission to be performed when the image reproduction device 201K is mounted on the mounting base 5K. The housing 190 and the housing 290 are interposed between the antenna 136 and the antenna 236, but since the dielectric material is used, it does not have a great influence on the radio transmission in the millimeter wave band.

In the third example, the semiconductor chip 103 and the semiconductor chip 203 are arranged in the separate housings, similar to the second example, but even in this case, when the image acquisition device 101K is mounted on the mounting base 5K and then used, radio communication is executed in a state in which the arrangement positions of the transmission unit and the reception unit are prescribed. Since an environment is an environment in which a transmission condition between transmission and reception is substantially changed (i.e., is fixed), the transmission characteristic between the transmission unit and the reception unit can be recognized in advance, similar to the first example or the second example. Based on the transmission characteristic, parameter setting for defining a transmission and reception operation such as the amplitude adjustment of embodiment 1 is fixed (preset).

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

1 . . . wireless transmission device, 2 . . . communication device, 3 . . . reference signal transmission device, 5 . . . reference signal transmission device, 7 . . . reference signal receiving device, 8 . . . communication device, 7100 . . . first set value processing unit, 7110 . . . first set value determination unit, 7130 . . . first set value storage unit, 7150 . . . first operation control unit, 7170 . . . first I/O interface unit, 7200 . . . second set value processing unit, 7120 . . . second set value determination unit, 7230 . . . second set value storage unit, 7250 . . . second operation control unit, 7270 . . . second I/O interface unit, 8000,8001,8002 . . . communication chip, 8300 . . . modulation function unit, 8302 . . . frequency mixing unit, 8304 . . . transmission-side local oscillation unit, 8400 . . . demodulation function unit, 8402 . . . frequency mixing unit, 8404 . . . receiving-side local oscillation unit

The invention claimed is:

1. A signal transmission device comprising:
at least one of a transmission unit for transmitting a signal-processed signal for a transmission target signal as a radio signal and a reception unit for receiving the radio signal transmitted from the transmission unit, wherein a transmission characteristic between the transmission unit and the reception unit is known,
the signal transmission device further comprises:
a signal processing unit for performing prescribed signal processing based on a set value; and
a set value processing unit for inputting the set value for prescribed signal processing to the signal processing unit, and
the signal processing unit and the set value processing unit are provided in at least one of a preceding stage of the transmission unit and a subsequent stage of the reception unit.

2. The signal transmission device according to claim 1, wherein the set value processing unit inputs the set value for prescribed signal processing corresponding to the transmission characteristic between the transmission unit and the reception unit to the signal processing unit.

3. The signal transmission device according to claim 1, wherein:
the set value processing unit comprises:
a set value determination unit for determining a set value;
a storage unit for storing the set value determined by the set value determination unit; and
an operation control unit for operating the signal processing unit based on the set value read from the storage unit.

4. The signal transmission device according to claim 1, wherein:
the set value processing unit comprises:
a set value receiving unit for receiving a set value from the outside;
a storage unit for storing the set value received by the set value receiving unit; and
an operation control unit for operating the signal processing unit based on the set value read from the storage unit.

5. The signal transmission device according to claim 1, wherein:
the signal processing unit comprises an amplitude adjustment unit for performing signal processing to adjust a size of an input signal and output the adjusted signal, and
the set value processing unit inputs a set value for adjusting the size of the input signal to the amplitude adjustment unit.

6. The signal transmission device according to claim 1, wherein:
the signal processing unit comprises a phase adjustment unit for performing signal processing to adjust a phase of an input signal and output the adjusted signal, and
the set value processing unit inputs a set value for adjusting the phase of the input signal to the phase adjustment unit.

7. The signal transmission device according to claim 1, wherein:
the signal processing unit comprises a frequency characteristic correction processing unit for correcting a frequency characteristic of an input signal and outputting the corrected signal, and
the set value processing unit inputs a set value for correcting the frequency characteristic of the input signal to the frequency characteristic correction processing unit.

8. The signal transmission device according to claim 1, wherein:
the signal processing unit comprises an echo suppression unit for suppressing an echo component contained in an input side among signals output from a transmission side, and
the set value processing unit inputs a set value for suppressing the echo component to the echo suppression unit.

9. The signal transmission device according to claim 1, wherein:
the transmission unit and the reception unit each comprise a plurality of antennas, and perform spatial multiplexing communication between transmission and reception,
the signal processing unit includes a matrix operation processing unit for performing a matrix operation based on a channel matrix having a transfer function of each antenna pair between transmission and reception as an element, and
the set value processing unit inputs a set value for performing the matrix operation to the matrix operation processing unit.

10. The signal transmission device according to claim 1, wherein:
a signal processing unit for transmission includes a first carrier signal generation unit for generating a carrier signal for modulation, and a first frequency conversion unit for frequency-converting a transmission target signal with the carrier signal for modulation generated by the first carrier signal generation unit to generate a modulation signal, and transmits the modulation signal to a radio signal transmission path, a signal processing unit for reception includes a second carrier signal generation unit for generating a carrier signal for demodulation synchronized to the carrier signal for modulation generated by the first carrier signal generation unit as a signal received via the radio signal transmission path is injected, and a second frequency conversion unit for frequency-converting the modulation signal received via the radio signal transmission path with the carrier signal for demodulation generated by the second carrier signal generation unit, and the set value processing unit inputs a set value for performing injection locking to the signal processing unit for transmission and/or the signal processing unit for reception.

11. The signal transmission device according to claim 1, further comprising:

a reference signal output unit for outputting a reference signal; and a clock generation unit for generating a clock signal for signal processing for a radio communication process of a spreading code scheme in synchronization with the reference signal output from the reference signal output unit based on the reference signal, wherein the clock generation unit includes a phase correction unit for performing phase correction according to a set value, the signal processing unit performs signal processing based on the clock signal subjected to phase correction by the phase correction unit, and the set value processing unit inputs a set value for performing the phase correction to the phase correction unit.

12. The signal transmission device according to claim 1, wherein:

the signal processing unit includes a first carrier signal generation unit for generating a carrier signal for modulation, and a first frequency conversion unit for frequency-converting a transmission target signal with the carrier signal for modulation generated by the first carrier signal generation unit to generate a transmission signal, and/or, includes a second carrier signal generation unit for generating a carrier signal for demodulation, and a second frequency conversion unit for frequency-converting the received transmission signal with the carrier signal for demodulation generated by the second carrier signal generation unit, and at least one of the carrier signal for modulation and the carrier signal for demodulation can be set to be shifted from a band center of a transmission characteristic between transmission and reception, and the set value processing unit inputs a set value for defining a shift amount of the frequency of the carrier signal from the band center of the transmission characteristic to the signal processing unit.

13. An electronic device, wherein:

a transmission unit for transmitting a signal-processed signal for a transmission target signal as a radio signal, a reception unit for receiving the radio signal transmitted from the transmission unit, and a radio signal transmission path for enabling radio transmission between the transmission unit and the reception unit are arranged in prescribed positions in one housing, a transmission characteristic between a transmission unit and a reception unit is known, and a signal processing unit for performing prescribed signal processing based on a set value, and a set value processing unit for inputting the set value for prescribed signal processing to the signal processing unit are included in at least one of a preceding stage of the transmission unit and a subsequent stage of the reception unit.

14. An electronic device comprising:

a first electronic device in which a transmission unit for transmitting a signal-processed signal for a transmission target signal as a radio signal is arranged in a prescribed transmission position in one housing; and a second electronic device in which a reception unit for receiving the radio signal transmitted from the transmission unit is arranged in a prescribed reception position in one housing, wherein, when the first electronic device and the second electronic device are arranged in determined positions, a radio signal transmission path enabling radio transmission between the transmission unit and the reception unit is formed, a transmission characteristic between the transmission unit and the reception unit is known, and a signal processing unit for performing prescribed signal processing based on a set value and a set value processing unit for inputting the set value for prescribed signal processing to the signal processing unit are included in at least one of a preceding stage of the transmission unit and a subsequent stage of the reception unit.

15. A signal transmission method, wherein:

when transmitting a signal-processed signal for a transmission target signal as a radio signal from a transmission unit and receiving the radio signal transmitted from the transmission unit by a reception unit, a transmission characteristic between a transmission unit and a reception unit is known, the method comprising:

inputting a set value for prescribed signal processing to a signal processing unit; and performing, by the signal processing unit, the prescribed signal processing based on the input set value in at least one of a preceding stage of the transmission unit and a subsequent stage of the reception unit.

* * * * *